United States Patent [19]
Breese et al.

[11] Patent Number: 6,018,738
[45] Date of Patent: Jan. 25, 2000

[54] METHODS AND APPARATUS FOR MATCHING ENTITIES AND FOR PREDICTING AN ATTRIBUTE OF AN ENTITY BASED ON AN ATTRIBUTE FREQUENCY VALUE

[75] Inventors: John S. Breese, Mercer Island; Carl M. Kadie, Bellevue, both of Wash.

[73] Assignee: Microsft Corporation, Redmond, Wash.

[21] Appl. No.: 09/010,824

[22] Filed: Jan. 22, 1998

[51] Int. Cl.[7] .................................................. G06F 17/30
[52] U.S. Cl. ......................... 707/100; 345/327; 345/356; 706/11; 707/5; 707/104; 707/500; 707/501
[58] Field of Search .................... 707/5, 3, 100, 707/102, 500, 501, 1, 6, 103, 104; 706/11; 345/327, 356

[56] References Cited

U.S. PATENT DOCUMENTS

| | | | |
|---|---|---|---|
| 4,613,946 | 9/1986 | Forman | 345/356 |
| 4,870,575 | 9/1989 | Rutenberg | 364/300 |
| 4,996,642 | 2/1991 | Hey | 364/419 |
| 5,167,011 | 11/1992 | Priest | 708/62 |
| 5,265,065 | 11/1993 | Turtle | 707/4 |
| 5,724,567 | 3/1998 | Rose et al. | 707/2 |
| 5,758,026 | 5/1998 | Lobley et al. | 706/11 |
| 5,826,265 | 10/1998 | Van Huben et al. | 707/8 |
| 5,832,212 | 11/1998 | Cragun et al. | 395/188.01 |
| 5,832,494 | 11/1998 | Egger et al. | 707/102 |
| 5,835,087 | 11/1998 | Herz et al. | 345/327 |
| 5,838,965 | 11/1998 | Kavanagh et al. | 707/103 |
| 5,848,396 | 12/1998 | Gerace | 705/10 |
| 5,867,799 | 2/1999 | Lang et al. | 707/1 |

OTHER PUBLICATIONS

G. Salton et al., Automatic Structuring and Retrieval of Large Text Files, *Communication of the ACM,* vol. 37, No. 2 (Feb, 1994).
P. Resnick et al., "GroupLens: An Open Architecture for Collaborative Filtering of Netnews", downloaded from *http://ccs.mit.edu/CCSWP165.html* on Mar. 28, 1997, reprinted from Proceedings of ACM 1999 Conference on Computer Supported Cooperative Work, pp. 175–186.

*Primary Examiner*—Wayne Amsbury
*Assistant Examiner*—Shahid Alam
*Attorney, Agent, or Firm*—Michaelson & Wallace; Peter L. Michaelson

[57] ABSTRACT

Matching (e.g., via correlation or similarity process) entities having attributes, some of which have associated values. The values of the attributes may be adjusted based on number of entities that have values for a particular attribute so that the values decrease as the number increases. The attributes of the entities may be harmonized and provided with default values so that entities being matched have common attributes defined by the union of the attributes of the entities being matched. The attributes of the entities may be expanded and provided with default values so that the entities being matched have attributes that neither had originally. The match values may be normalized to provide a weight value which may be used to predict an attribute value of a new entity based on known attribute values of known entities. The weight values may be tuned such that relatively high weights are amplified and relatively low weights are suppressed.

67 Claims, 31 Drawing Sheets

| ATTRIBUTE | ATTRIBUTE FREQUENCY |
|---|---|
| 1 | 1 |
| 2 | 2 |
| 3 | 3 |
| 4 | 4 |

FIGURE 7A

| ADJUSTED ATTRIBUTE VALUES | | | | |
|---|---|---|---|---|
|  | ATTRIBUTE$_1$ | ATTRIBUTE$_2$ | ATTRIBUTE$_3$ | ATTRIBUTE$_4$ |
| USER$_1$ |  | 0.5 |  | 0.25 |
| USER$_2$ |  |  |  | 0.25 |
| USER$_3$ |  |  |  | 0.25 |
| USER$_4$ |  |  |  | 0.25 |
| USER$_5$ |  | 0.5 |  |  |
| USER$_6$ | 1 |  | 1 |  |

FIGURE 7B

| | ATTRIBUTE MATCH VALUES | | | | TOTAL MATCH VALUES |
|---|---|---|---|---|---|
| | ATTRIBUTE$_1$ | ATTRIBUTE$_2$ | ATTRIBUTE$_3$ | ATTRIBUTE$_4$ | |
| USER$_1$ | | | | 0.25 | 0.25 |
| USER$_2$ | | | | 0.25 | 0.25 |
| USER$_3$ | | | | 0.25 | 0.25 |
| USER$_4$ | | | | 0.25 | 0.25 |
| USER$_5$ | | | | | 0.0 |
| USER$_6$ | | | 1 | | 1 |

FIGURE 8

| | ATTRIBUTE$_1$ | ATTRIBUTE$_2$ | ATTRIBUTE$_3$ | ATTRIBUTE$_4$ |
|---|---|---|---|---|
| USER$_1$ | | 0.5 * 0.25 | | 0.25 * 0.25 |
| USER$_2$ | | | | 0.25 * 0.25 |
| USER$_3$ | | | | 0.25 * 0.25 |
| USER$_4$ | | | | 0.25 * 0.25 |
| USER$_5$ | | 0.5 * 0 | | |
| USER$_6$ | 1 * 1 | | 1 * 1 | |

| NEW USER | 1 | 0.125 | 1 | 0.25 |
|---|---|---|---|---|

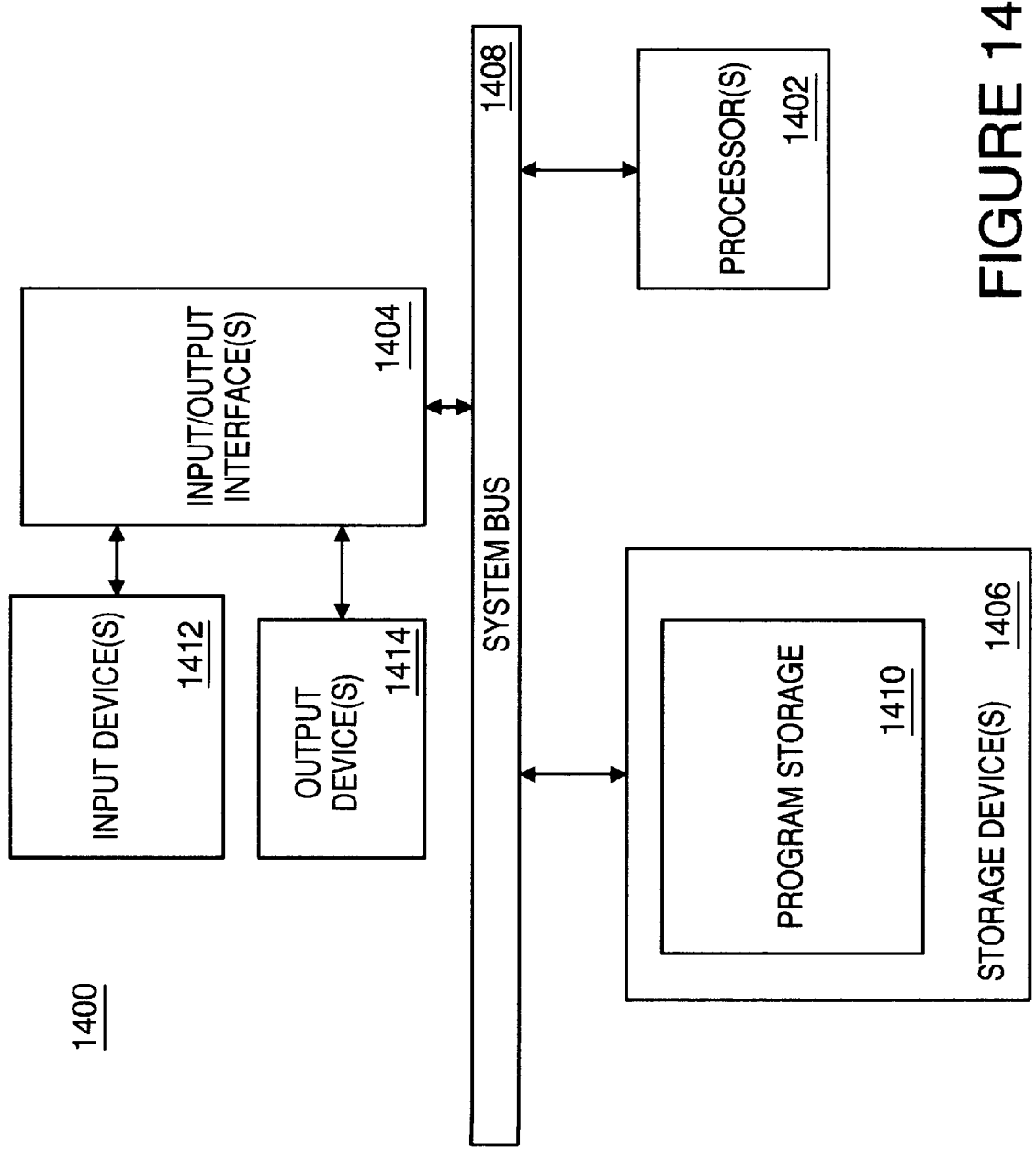

|    | D1 | D2 | D3 | D4 | D5 | D6 |
|----|----|----|----|----|----|----|
| C1 | 2  | ?  | ?  | ?  | 4  | ?  |
| C2 | ?  | 4  | 1  | 3  | 1  | 2  |
| C3 | 3  | 2  | 2  | ?  | 5  | 2  |
| C4 | 2  | ?  | 1  | 1  | ?  | 1  |
| C5 | 1  | 3  | ?  | 3  | 1  | 3  |
| C6 | 4  | ?  | ?  | 4  | 0  | 4  |

FIGURE 17A

Total Users  6
Users for each item  5  3  4  5  5  5

| IDFed DB users | D1 | D2 | D3 | D4 | D5 | D6 | Sum of Sq |
|---|---|---|---|---|---|---|---|
| C1 | 0.365 | 0.000 | 0.000 | 0.000 | 0.729 | 0.000 | 0.664823 |
| C2 | 0.000 | 2.773 | 0.693 | 1.216 | 0.182 | 0.365 | 9.813525 |
| C3 | 0.547 | 1.386 | 1.386 | 0.000 | 0.912 | 0.365 | 5.106788 |
| C4 | 0.365 | 0.000 | 0.693 | 0.405 | 0.000 | 0.182 | 0.811061 |
| C5 | 0.182 | 2.079 | 0.000 | 1.216 | 0.182 | 0.547 | 6.169347 |
| C6 | 0.729 | 0.000 | 0.000 | 1.622 | 0.000 | 0.729 | 3.694148 |

FIGURE 17D

New User  4  3  3  ?  ?  ?

FIGURE 17E

Effective User  0.7292862  2.07944154  2.07944415  0  0  0

FIGURE 17F

Effective User  [Effective User]  3.0298536

FIGURE 17G

Normalized User  0.2407002  0.6863175  0  0  0  0.6863175

FIGURE 17H

| | SXY | Case Weight |
|---|---|---|
| C1 | 0.088 | 0.107644.38 |
| C2 | 2.379 | 0.75929062 |
| C3 | 2.035 | 0.90030639 |
| C4 | 0.563 | 0.62568901 |
| C5 | 1.471 | 0.59225052 |
| C6 | 0.176 | 0.09133079 |
| Total Case Weight | | 3.07651171 |

FIGURE 17I

| | | | | | | |
|---|---|---|---|---|---|---|
| P(New\|c1) | 0.2152888 | 0 | 0 | 0 | 0.4305775 | 0 |
| P(New\|c1) | 0 | 3.03716248 | 0.7592906 | 2.2778719 | 0.7592906 | 1.5185812 |
| P(New\|c1) | 2.7009192 | 1.80061277 | 1.8006128 | 0 | 4.501319 | 1.8006128 |
| P(New\|c1) | 1.251378 | 0 | 0.625689 | 0.625689 | 0 | 0.625689 |
| P(New\|c1) | 0.5922505 | 1.77675155 | 0 | 1.7767515 | 0.5922505 | 1.7767515 |
| P(New\|c1) | 0.3653232 | 0 | 0 | 0.3653232 | 0 | 0.3653232 |
| Total | 5.1251596 | 6.6145268 | 3.1855924 | 5.0456356 | 6.2836506 | 6.0869577 |

FIGURE 17J

Final Scores    Given    Given    Given    1.6400508    2.0424595    1.9785258

FIGURE 17K

| MASH | CBS NEWS | 60 MINUTES |
|---|---|---|
| 100 | 17 | 18 |

| MASH | CBS NEWS | X-FILES |
|---|---|---|
| 20 | 16 | 15 |

— 1904

| MASH | CBS NEWS | 60 MINUTES | X-FILES |
|---|---|---|---|
| 100 | 17 | 18 | 1 |

| MASH | CBS NEWS | 60 MINUTES | X-FILES |
|---|---|---|---|
| 20 | 16 | 1 | 15 |

| MASH | CBS NEWS | 60 MINUTES | X-FILES | $FILLER_1$ | . . . | $FILLER_{N2}$ |
|---|---|---|---|---|---|---|
| 100 | 17 | 18 | 1 | 1 | . . . | 1 |

— 1902"

| MASH | CBS NEWS | 60 MINUTES | X-FILES | $FILLER_1$ | . . . | $FILLER_{N2}$ |
|---|---|---|---|---|---|---|
| 20 | 16 | 1 | 15 | 1 | . . . | 1 |

— 1904"

METHODS AND APPARATUS FOR MATCHING ENTITIES AND FOR PREDICTING AN ATTRIBUTE OF AN ENTITY BASED ON AN ATTRIBUTE FREQUENCY VALUE

BACKGROUND OF THE INVENTION a. Field of the Invention

The present invention concerns matching entities based on attributes of the entities and predicting an attribute of an entity based on attributes of the entity and other entities. More specifically, the present invention concerns "collaborative filtering" which may be used, for example, to suggest content of interest to a client entity on a network (e.g., the Internet).

b. Related Art

In the past five to ten years, computers have become interconnected by networks by an ever increasing extent via the Internet. The proliferation of networks, in conjunction with the increased availability of inexpensive data storage means, has afforded computer users unprecedented access to a wealth of data. Unfortunately, however, the very vastness of available data can overwhelm a user. Desired data can become difficult to find and search heuristics employed to locate desired data often return unwanted data.

Various concepts have been employed to help users locate desired data. In the context of the Internet for example, some services have organized content based on a hierarchy of categories. A user may then navigate through a series of hierarchical menus to find content that may be of interest to them. An example of such a service is the YAHOO™ World Wide Web site on the Internet. Unfortunately, content, in the form of Internet "web sites" for example, must be organized by the service and users must navigate through menus. If a user mistakenly believes that a category will be of interest or include what they were looking for, but the category turns out to be irrelevant, the user must backtrack through one or more hierarchical levels of categories. Moreover, such services which provide hierarchical menus of categories are passive. That is, a user must actively navigate through the hierarchical menus of categories.

Again in the context of the Internet for example, some services provide "search engines" which search databased content or "web sites" pursuant to a user query. In response to a user's query, a rank ordered list, which includes brief descriptions of the uncovered content, as well as hypertext links (text, having associated Internet address information, which, when activated, commands a computer to retrieve content from the associated Internet address) to the uncovered content is returned. The rank ordering of the list is typically based on a match between words appearing in the query and words appearing in the content. Unfortunately, however, present limitations of search heuristics often cause irrelevant content to be returned in response to a query. Again, unfortunately, the very wealth of available content impairs the efficacy of these search engines since it is difficult to separate irrelevant content from relevant content. Moreover, as was the case with services which provide hierarchical menus of categories, search engines are passive. That is, a user must actively submit a query.

The two above mentioned content search concepts are categorized as "pull" processes because the user must explicitly direct these processes to find the content and pull it to them (i.e., to their computer).

In view of the drawbacks of the above discussed data location concepts, "collaborative filtering" systems have been developed. Collaborative filtering systems predict the preferences of a user based on known attributes of the user, as well as known attributes of other users. Some collaborative filter systems require that a user fill out a survey of their interests and use the submitted survey as a query. Hence, such collaborative filter systems may be classified as "pull" processes. Other collaborative filter systems are categorized as "push" processes because they use content previously "consumed" (e.g., requested, downloaded, rendered, etc.) by a user to proactively predict content which may appeal to that user. Such collaborative filter systems then present (or "push") the content, or information identifying the content, to the user.

Basically, collaborative filtering uses known attributes (e.g., explicitly entered votes) of a new user (referred to as "the active case") and known attributes of other users to predict values of unknown attributes of the new user (e.g., attributes not yet entered by the new user). The mean vote ($\overline{v_i}$) for an entity may be defined as:

$$\overline{v_i} = \frac{1}{m_i} \sum_{j \in I_i} v_{i,j} \quad (1)$$

where $V_{i,j}$=A value of attribute j of entity i. Typically, an integer value.

m=The number of attributes (e.g., in a database).

$I_i$=A set of attribute indexes for which entity i has known values (e.g., based on an explicitly entered vote). For example, $I_2=\{3,4\}$ means that entity 2 has values (e.g., has voted) for attributes 3 and 4.

$m_i$=The number of attributes for which entity i has known values—the number of elements in $I_i$.

Denoting parameters for the active case (i.e., new entity) with subscript a, a prediction $p_{a,j}$ of active case attribute values (e.g., votes) for attributes without known values (i.e., attributes not in $I_a$) can be defined as:

$$p_{a,j} = \overline{v_a} + \sum_{i=1,n} (v_{i,j} - \overline{v_i}) w_{a,i} \quad (2)$$

where n=The number of entities (e.g., in a database).

$w_{a,i}$=The estimated weight (or alternatively match) between entity i and entity a.

$p_{i,j}$=The predicted value of attribute j of entity i.

Hence, a predicted attribute value (e.g., vote) is calculated from a weighted sum of the attribute values (e.g., votes) of each other user. The appearance of mean values in the formula merely serves to express values in terms of deviation from the mean value (i.e., defines a reference) and has no other significant impact.

An example of a proposed collaborative filtering system is discussed in the article, Resnick et al., "GroupLens: An Open Architecture for Collaborative Filtering of Netnews," *Proceedings of the Association for Computer Machinery 1994 Conference on Computer Supported Cooperative Work*, Chapel Hill, N.C., pp. 175–186 (1994) (hereafter referred to as "the Resnick article"). In the system discussed in the Resnick article (hereafter referred to as "the Grouplens system"), users rate articles which they have read. Rating servers, called Better Bit Bureaus, gather and disseminate the ratings. More specifically, the Better Bit Bureaus package one or more ratings into a news article. The rating servers predict scores based on a heuristic that people who agreed in the past will probably agree again. More specifically, the GroupLens system first correlates ratings to determine the similarity of a user's ratings with the ratings of other users. Correlation coefficients or weights between −1 and 1 are computed and indicate how much a particular user tended to agree with other users. The GroupLens system then predicts how much the user will like a new article based on ratings from similar users. More specifically, the ratings of the other users are weighted based on the correlation coefficients determined above and the weighted ratings are combined to form a prediction.

Unfortunately, the GroupLens system has a number of problems. First, users must explicitly enter ratings. Some users find it difficult to judge articles or other content. In this regard, it is expected that predictions made by the GroupLens system will improve as correlation or weight determinations improve. It is further expected that the correlation and weight determinations made by the GroupLens system will improve as more ratings are entered. Unfortunately, many users may become frustrated by poor predictions and/or with entering ratings before enough ratings are gathered to make the correlation and weight determinations made by the GroupLens system good. Thus, the GroupLens system has a bootstrapping problem. Many users will become frustrated with the predictions made by the GroupLens system, due, in part, to an initial scarcity of ratings. As a result of user frustration with initially poor predictions, such users may stop entering ratings. If this occurs, the predictions made by the GroupLens system will probably not improve because users will not provide it with enough ratings information.

Moreover, the correlation strategy used in the GroupLens system apparently does not consider the distinctness of the ratings. For example, the fact that two users might like a popular article is apparently not weighted less than the fact that two users might like an very unpopular article. Furthermore, the GroupLens system apparently does not consider non-data, or the absence of ratings by users.

Thus, improved content location methods and apparatus are needed. Since burdens formerly placed on the entity (e.g., a computer user) should be eliminated to the extent possible, such methods and apparatus (i) should be useable in content push systems, such as collaborative filter systems for example, and (ii) should use entity attributes which may be explicitly and/or implicitly determined. Since the content should be only the most relevant or most likely to be of interest to the entity, such methods and apparatus should accurately match entities based on attributes of the entities and should accurately predict attributes of (e.g., content of interest to) an entity based on attributes of the entity and other entities. Finally, the methods and apparatus should be able to operate on a distributed environment, such as a networked environment including clients and servers.

SUMMARY OF THE INVENTION

The present invention provides various ways to enhance collaborative filtering processes, for example, by enhancing processes for matching entities. More specifically, a first way of enhancing a process for matching entities in accordance with the present invention is to adjust the value ($V_{i,j}$) of an attribute of an entity based on the number of entities that have a value for (e.g., have voted on) that particular attribute. In general, the value ($V_{i,j}$) of the attribute of an entity will be decreased as the number of entities that have a value of the attribute increases. Referred to as "inverse attribute frequency", this aspect of the present invention lowers the effect of more common attributes in generating recommendations. The present invention can operate with many types of entities (e.g., a computer, a local area network, a business, etc.) and many different attributes (e.g., age, sex, weight, favorite food, television shows viewed, money spent on movie rentals, etc.).

In a second way of enhancing a process for matching entities in accordance with the present invention, a match of entities is based on a union of all attributes for which either entity has a value, rather than only attributes for which both entities have values. This aspect of the present invention is referred to below as "attribute set harmonization". Default values may be provided to attributes without values. Such values may be referred to as "default" or "implicit" values.

In a similar concept, still another aspect of the present invention improves a process for matching entities by determining a match of entities based on attributes for which neither entity has values. Referred to as "attribute expansion", this aspect of the present invention is useful when most attributes can be assumed to have little relevance to most entities. As with "attribute set harmonization", default values may be provided to attributes without values.

In a way of enhancing a process for collaborative filtering in accordance with yet another aspect of the present invention, the weights used for collaborative filtering prediction (e.g., the basic collaborative filtering prediction formula discussed above) are tuned to emphasize relatively high weights and to suppress relatively low weights. This aspect of the present invention is referred to below as "tuning" or "amplification".

A tuned weight W' may be defined as:

$w' = w^p$ if $w \geq 0$ $w' = -(-w^p)$ if $w < 0$ where p≡A tunable parameter, typically greater than 1.

The aspects of the present invention may be used in content push systems, such as certain collaborative filter systems for example, so that burdens on a user are minimized. Also, the aspects of the present invention may operate on a distributed environment, such as a networked environment including clients and servers. More specifically, in the context of the Internet, the present invention may be employed to predict Internet locations or content that may be of interest to an end user. The present invention may operate (a) locally, at a client, (b) remotely, at a server, or (c) at a location remote from the client and the server (e.g., a separate server). Finally, particular functions of the present invention may be distributed at one or more of the above devices (or locations).

BRIEF DESCRIPTION OF THE DRAWINGS

FIGS. 7A and 7B are tables which illustrate intermediate values which result when the illustrative attribute (or content) adjustment process of FIGS. 3 and 4 operates on the exemplary data of FIG. 1B.

FIG. 8 is a table which illustrates intermediate values which result when the illustrative entity matching process of FIGS. 3 and 5 operates on the exemplary data of FIG. 1B.

FIG. 9 is a table which illustrates intermediate and final values which result when the illustrative attribute (or desired content) prediction process of FIGS. 3 and 6 operates on the exemplary data of FIG. 1B.

FIG. 14 is a high level block diagram of an apparatus for implementing the present invention.

FIGS. 17A through 17K illustrate an exemplary input, intermediate results, and an output of data processed by the alternative collaborative filtering process illustrated in FIG. 15.

FIG. 19A depicts exemplary input records used for illustrating steps of the processes of FIG. 18.

FIG. 19B depicts intermediate record data which illustrates the record attribute harmonization and default attribute value addition steps of FIG. 18.

FIG. 19C depicts intermediate record data which illustrates the record expansion and default attribute value addition steps of FIG. 18.

DETAILED DESCRIPTION

Definitions

Figure 1A:
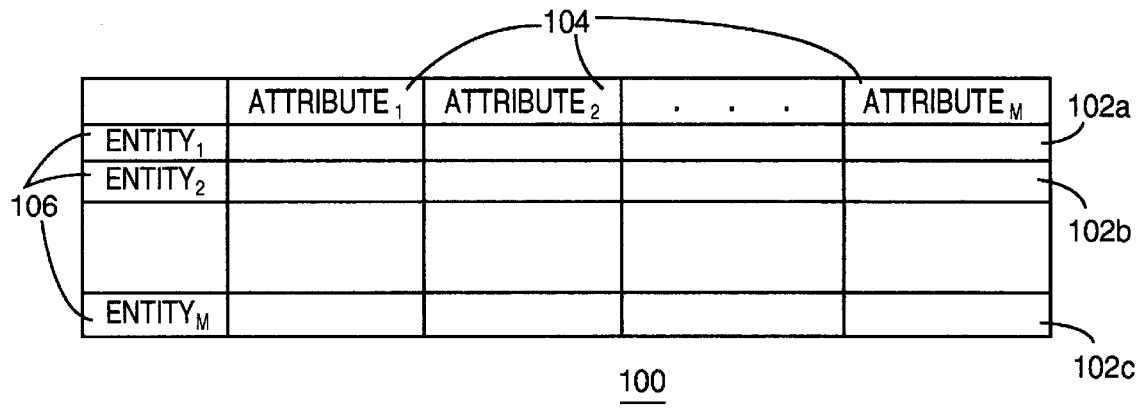
FIG. 1A is a table which illustrates a data structure of records for organizing data which may be used by methods and apparatus of the present invention.

In the following, the term "data" may include information representing text (e.g., a word processor document), audio, images, pictures (e.g., a JPEG file), video (e.g., an MPEG-2 file), or any other information which, by itself, or as output by appropriate means, can be sensed. Such data may also be referred to as "content."

The term "entity" may include a computer, a computer user, or a logical grouping of people such as people working at a particular company, people sharing a particular local area network (or "LAN"), a network browser, an internetwork browser, etc. An entity may include certain "attributes". If, for example, an "entity" is a computer user, that user may have "attributes" such as age, sex, education level, residence, a computer network address, food preferences, movie preferences, etc.

An attribute may reflect a set which the entity is either in or not in (e.g., "Male?", "over 60 years old?", "rented a video tape within the last week?", etc.) so that the attribute value is a qualitative binary (e.g., YES/NO, ON/OFF, TRUE/FALSE) value. Such an attribute may be referred to as a "qualitative attribute". On the other hand, an attribute may reflect a set of values so that the attribute value is a value within the set (e.g., "57 years" is a value within an "age" set, "red" is a value within a "favorite color" set, "7" is a value within a "number of video tapes rented in march" set, etc.). Such an attribute may be referred to as a "value attribute". "Value attributes" may be expressed as a group "qualitative attributes" associated with each value of a set (e.g., "rented 1 video tape?", "rented 2 video tapes?", etc.).

The present invention concerns novel methods and apparatus for matching entities based on attributes of the entities and for predicting an attribute of (or content of interest to) an entity based on attributes of the entity and other entities. The following description is presented to enable one skilled in the art to make and use the invention, and is provided in the context of a particular application and its requirements. Various modifications to the illustrated embodiment(s) will be apparent to those skilled in the art, and the general principles set forth below may be applied to other embodiments and applications. Thus, the present invention is not intended to be limited to the embodiment(s) shown.

The present invention provides various ways to enhance collaborative filtering processes, for example, by enhancing processes for matching entities. More specifically, a first way of enhancing a process for matching entities in accordance with the present invention is to adjust the value ($V_{i,j}$) of an attribute of an entity based on the number of entities that have a value for (e.g., have voted on) that particular attribute. In general, the value ($V_{i,j}$) of the attribute of an entity will be decreased as the number of entities that have a value of the attribute increases. Referred to below as "inverse attribute frequency", this aspect of the present invention lowers the effect of more common attributes in generating recommendations.

In a second way of enhancing a process for matching entities in accordance with the present invention, a match of entities is based on a union of all attributes for which either entity has a value, rather than only attributes for which both entities have values. This aspect of the present invention is referred to below as "attribute set harmonization". Default values may be provided to attributes without values.

In a similar concept, still another aspect of the present invention improves a process for matching entities by determining a match of entities based on attributes for which neither entity has values. Referred to below as "attribute expansion", this aspect of the present invention is useful when most attributes can be assumed to have little relevance to most entities. As with "attribute set harmonization", default values may be provided to attributes without values.

In a way of enhancing a process for collaborative filtering in accordance with yet another aspect of the present invention, the weights used for collaborative filtering prediction (e.g., the basic collaborative filtering prediction formula discussed above) are tuned to emphasize relatively high weights and to suppress relatively low weights. This aspect of the present invention is referred to below as "tuning" or "amplification".

In the following, first the basic functions and general concepts of the various aspects of the present invention will be disclosed. Next, a generic apparatus for practicing the present invention (with reference to FIGS. 2 and 14) will be disclosed. Thereafter, the operation of the inverse attribute frequency aspect of the present invention with respect to a simple matching process (with reference to FIGS. 3 through 6) will be disclosed and an example of the operation (with reference to FIGS. 3 through 9) will be provided. Next, the operation of the inverse attribute frequency aspect of the present invention with respect to a collaborative filtering processes which uses a similarity-type matching process will be disclosed (with reference to FIGS. 15 and 16A through 16G) and an example of the operation of the collaborative filtering process (with reference to FIGS. 17A through 17K) will be provided. Thereafter, the operation of the inverse attribute frequency, attribute set harmonization (with default values), attribute expansion (with default values), and tuning aspects of the present invention with respect to a collaborative filtering process which uses a correlation matching processes will be disclosed with reference to FIGS. 18 and 19A through 19C. Then, an architecture for practicing the present invention on a network having a client and a server (with reference to FIGS. 10 and 11) will be disclosed. Finally, the processing and data flow within the networked architecture (with reference to FIGS. 10–13C) will be disclosed.

§1 FUNCTIONS PERFORMED BY THE METHODS AND APPARATUS

The present invention operates to better "match" entities based on attributes of the entities and/or to better predict an attribute of (e.g., content of interest to) an entity based on attributes of the entity and other entities.

§1.1 Inverse Attribute Frequency Matching

Conceptually, the inverse attribute frequency aspect of the present invention discounts more common entity attributes and emphasizes more rare entity attributes when matching entities and when predicting unknown attribute values. For example, suppose that the entities are television viewers and the relevant attribute is their favorite television program. Many television viewers watch a sporting event such as the SuperBowl™ on the FOX network, while many fewer television viewers watch a sporting event such as the NCAA Division III Women's Field Hockey Finals on the ESPN network. Thus, the present invention is based, in part, on the assumption that two viewers who watched the field hockey finals "match" to a greater degree than two viewers who watched the SuperBowl™. The present invention is based, in part, on the further assumption that the two viewers who watched the field hockey finals may have other common television viewing preferences, and in any event, more so than two viewers who watched the SuperBowl™.

In the above example, the entities were television viewers and the attribute was favorite television program. The present invention can operate with many types of entities (e.g., a computer, a local area network, a business, etc.) and many different attributes (e.g., age, sex, weight, favorite food, television shows viewed, money spent on movie rentals, etc.).

A similar concept has been employed in document retrieval systems so that larger weights are assigned to terms that occur frequently in particular documents, but rarely in other documents, since such terms can distinguish the documents in which they occur from other documents. (See, e.g., the article: Salton et al., "Automatic Structuring and Retrieval of Large Text Files," *Communications of the ACM*, Vol. 37, No. 2, pp. 97–108 (February 1994) (hereafter referred to as "the Salton article").) This weighting is used either (a) to retrieve a document in response to an explicitly entered query, or (b) to determine the similarity of documents. This concept, however, has not been used in collaborative filtering applications to predict attributes of one entity (or content which the entity might want) based on other entities. That is, the words in one document are not used to predict other words that the document might contain based on the words found in documents with similar words; such an operation would be absurd in the document retrieval process. Moreover, the documents are limited to one attribute type; namely words or terms. Furthermore, the words found in a document are inherently and objectively based on the content of the document itself; they are not implicitly determined or subjectively determined.

§1.2 Attribute Set Harmonization (With Default Values) for Use With Matching Processes When determining a degree to which two (2) entities "match", known matching and collaborative filtering processes consider only attributes for which both of the entities have values. For example, in the GroupLens system discussed above, only documents on which both the active user and another user have voted are considered. Thus, if $I_1$ represents a set of documents that a first user has voted on and $I_2$ represents a set of documents that second user has voted on, when determining a degree to which the first and second users "match", only the values of documents of a set defined by an intersection of documents voted on by each user (i.e., $I_1 \cap I_2$) are considered.

The inventors of the present invention have found that in certain applications, harmonizing the sets of the attributes considered in a matching process, such that they include all attributes for which either of the entities have values, provides a better match determination, particularly for purposes of collaborative filtering to predict content of interest to an Internet computer user. Thus, in accordance with the attribute set harmonization aspect of the present invention, when determining a degree to which the first and second entities "match", the values of attributes of a set defined by a union of attributes, having values, of each entity (i.e., $I_1 \cup I_2$) are considered. A default value may then be assigned to attributes without values, of an entity. Such values may be referred to as "default" or "implicit" values.

§1.3 Attribute Expansion (With Default Values) for Use With Matching Processes When determining a degree to which two (2) entities "match", the inventors of the present invention have further found that, in certain applications, attributes for which neither of the two (2) entities have values should be considered. Like the aspect of attribute set harmonization discussed above, attribute expansion may assign default values to the attributes, having no value, of an entity. In an application in which the entities are computer users and the attributes are content requested, downloaded, or rendered by such users, this aspect of the present invention was found to improve matching determinations, and collaborative filtering, particularly when it can be assumed that most users will not want to request, download, or render most content.

§1.4 Tuning

Recall that a basic collaborative filtering method predicted attributes of an active (or new) entity based, in part, on an estimated weight between the active entity and other entities. The present inventors have found that it is useful to tune such weights by emphasizing relatively high weights and suppressing relatively low weights. As discussed, a tuned weight W' may be defined as:

$$w' = w^p \text{ if } w \geq 0$$
$$w' = -(-w^p) \text{ if } w < 0 \quad (3)$$

where p=A tunable parameter, typically greater than 1.

The aspects of the present invention may be used in content push systems, such as certain collaborative filter systems for example, so that burdens on a user are minimized. Also, the aspects of the present invention may operate on a distributed environment, such as a networked environment including clients and servers. More specifically, in the context of the Internet, the present invention may be employed to predict Internet locations or content that may be of interest to an end user. The present invention may operate (a) locally, at a client, (b) remotely, at a server, or (c) at a location remote from the client and the server (e.g., a separate server). Finally, particular functions of the present invention may be distributed at one or more of the above devices (or locations).

§2 HIGH LEVEL STRUCTURE OF AN APPARATUS

FIG. 2

Figure 2:
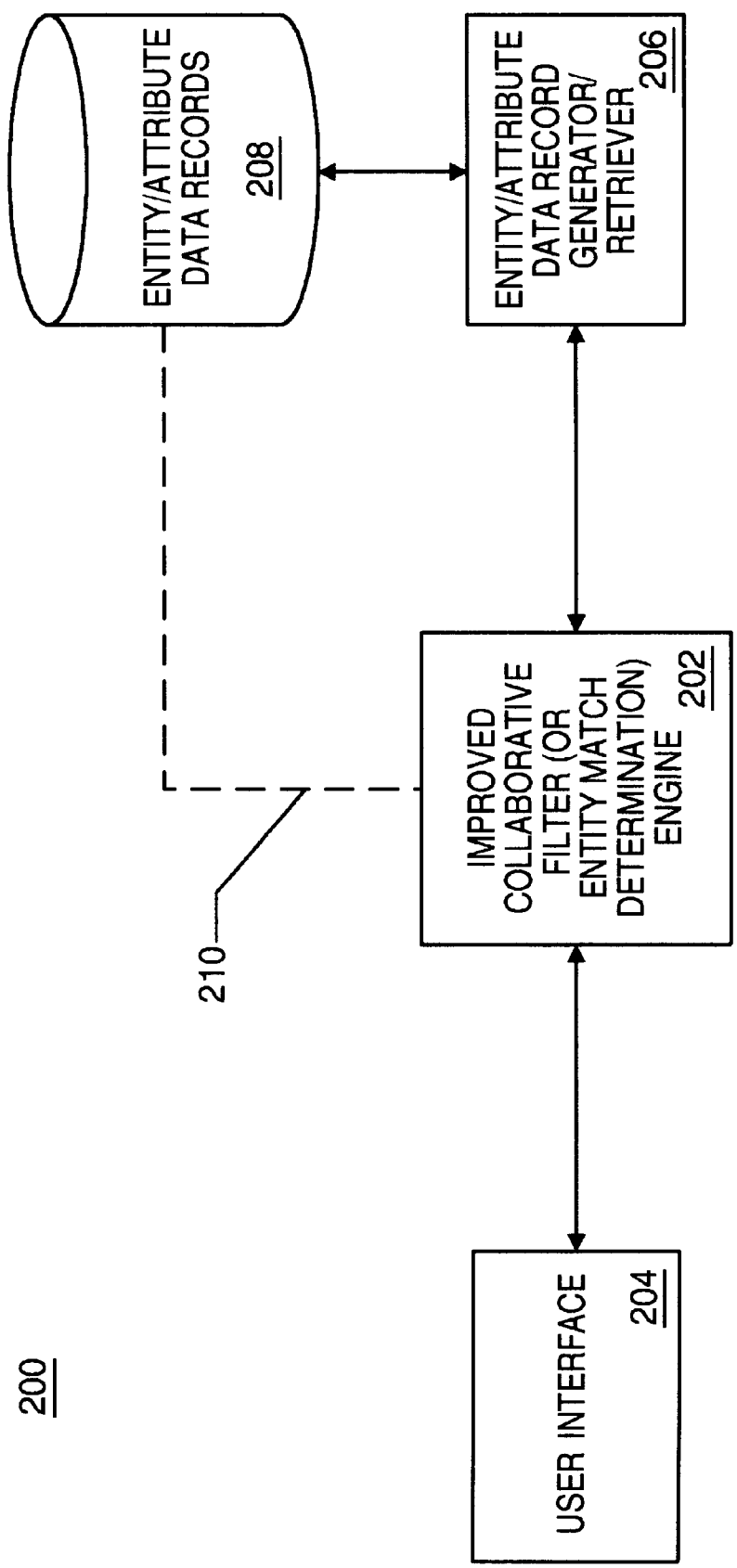
FIG. 2 is a high level block diagram of an illustrative embodiment of an apparatus of the present invention.

FIG. 2 is a high level block diagram of an illustrative embodiment of an apparatus 200 of the present invention. The apparatus 200 includes an improved collaborative filter (or an improved entity match determination) engine 202. As alluded to above, the improved collaborative filter (or entity match determination) engine 202 operates to accurately determine the degree to which entities "match" based on attributes of the entities and/or to accurately predict attributes of (e.g., content of interest to) an entity based on attributes of the entity and of other entities.

The improved collaborative filter (or entity match determination) engine 202 may employ the above described inverse attribute frequency aspect of the present invention to discount more common entity attributes and emphasize more rare entity attributes. Further, the improved collaborative filter (or entity match determination) engine 202 may employ the attribute set harmonization (with default values), attribute expansion (with default values) and/or tuning aspects of the present invention described above.

Various structures for embodying the improved collaborative filter (or entity match determination) engine 202 will become apparent to those skilled in the art, particular after reviewing details of the operations performed by the improved collaborative filter (or entity match determination) engine 202 discussed in detail below. In any event, referring to FIG. 14, the improved collaborative filter (or entity match determination) engine 202 may include a computer based system 1400 including a processor(s) 1402, an input/output interface(s) 1404, and a storage device(s) 1406, all of which may share a system bus 1408. The storage device(s) 1406 may include a program storage device or area 1410 for storing a program which, when executed by the processor 1402, effects the operations described below. The input/output interface(s) 1404 permits the computer based system 1400 to accept data or commands from an input device(s) 1412 (e.g., a keyboard, mouse, and/or other man-machine interface) and to provide data or commands to an output device(s) 1414 (e.g., a video display unit, and/or an audio unit).

Referring again to FIG. 2, the improved collaborative filter (or entity match determination) engine 202 may communicate with a user interface (e.g., the input device(s) 1412 and output device(s) 1414) 204. In this way, the improved collaborative filter (or entity match determination) engine 202 may, for example, accept entity attributes and provide suggestions. The improved collaborative filter (or entity match determination) engine 202 may also communicate with an entity/attribute data record generator/retriever 206. The entity/attribute data record generator/retriever 206 may (i) accept entity/attribute information from the improved collaborative filter (or entity match determination) engine (or alternatively, directly from the user interface 204 or an external source), (ii) form and/or update entity/attribute record(s) and (iii) store such records to the storage device 208. The entity/attribute data record generator/retriever 206 may also (i) retrieve entity/attribute records from the storage device 208, and (ii) forward the retrieved records to the improved collaborative filter (or entity match determination) engine.

The system 200 does not require its own entity/attribute record generator 206. In this case, the entity/attribute data record generator/retriever will not generate entity/attribute records, but rather, will merely retrieve entity/attribute data records from a pre-existing database. That is, a third party may sell entity/attribute data records or sell access thereto.

§3 OPERATION OF APPARATUS/METHODS

§3.1 First Illustrative Embodiment

FIGS. 3–9

Figure 3A:
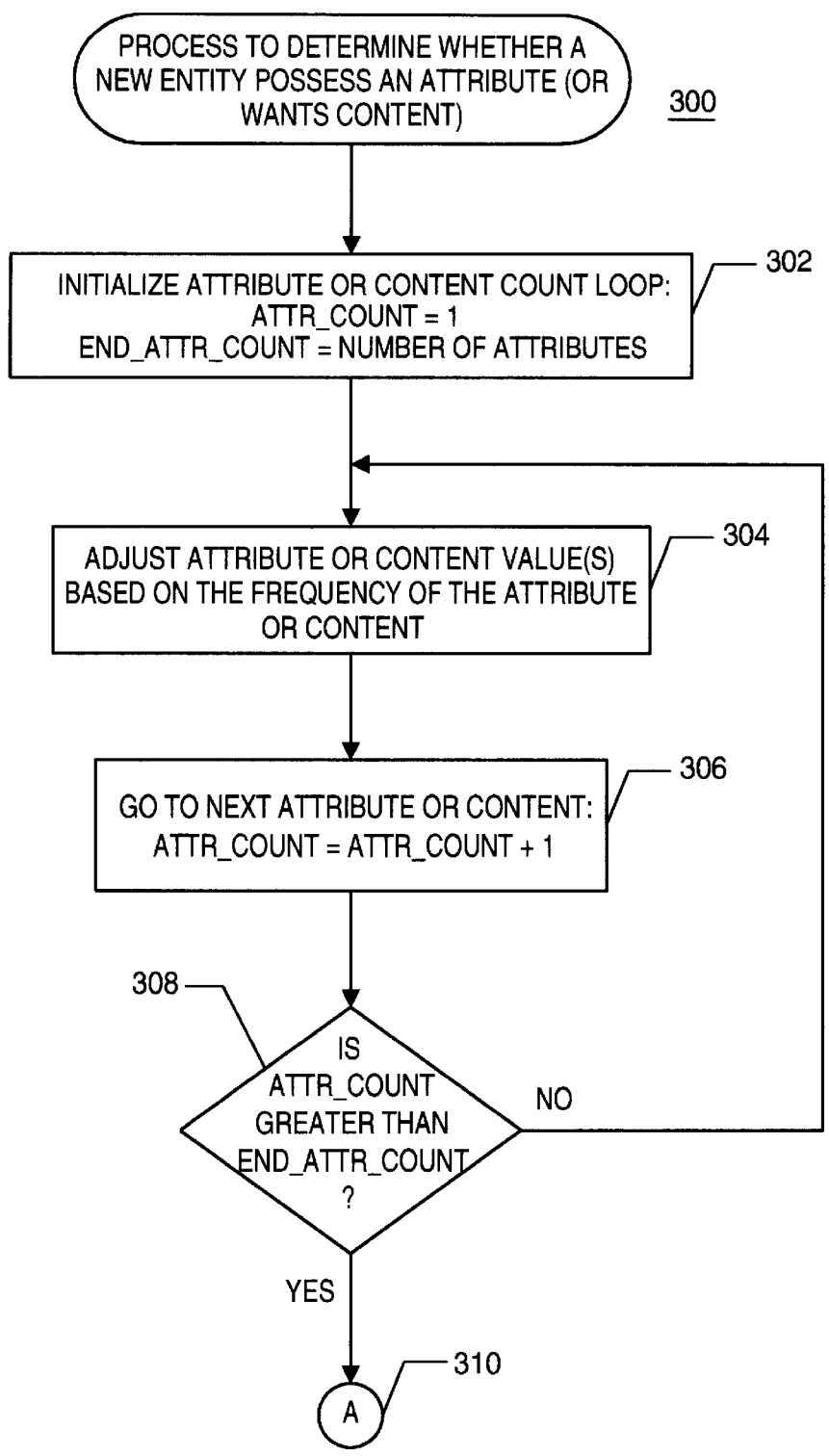
FIGS. 3A–C is a high level flow diagram of an illustrative process which implements a method of the present invention.
Figure 3:
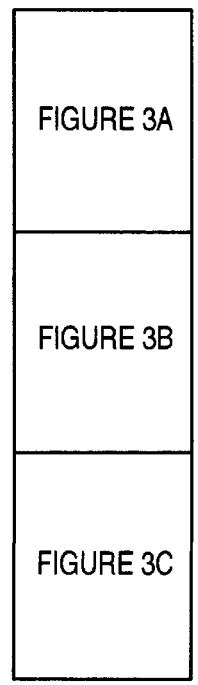
Figure 3B:
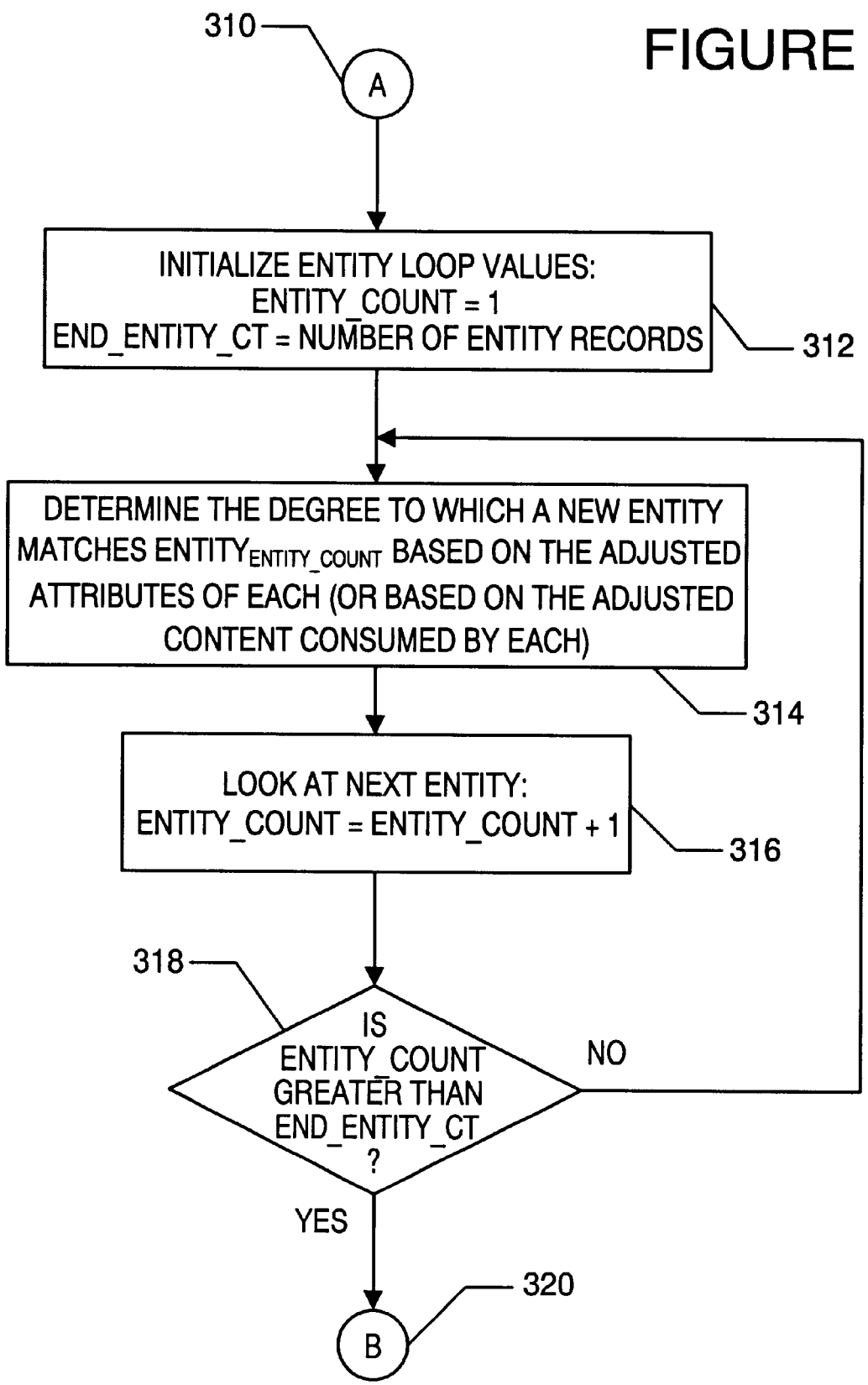
Figure 3C:
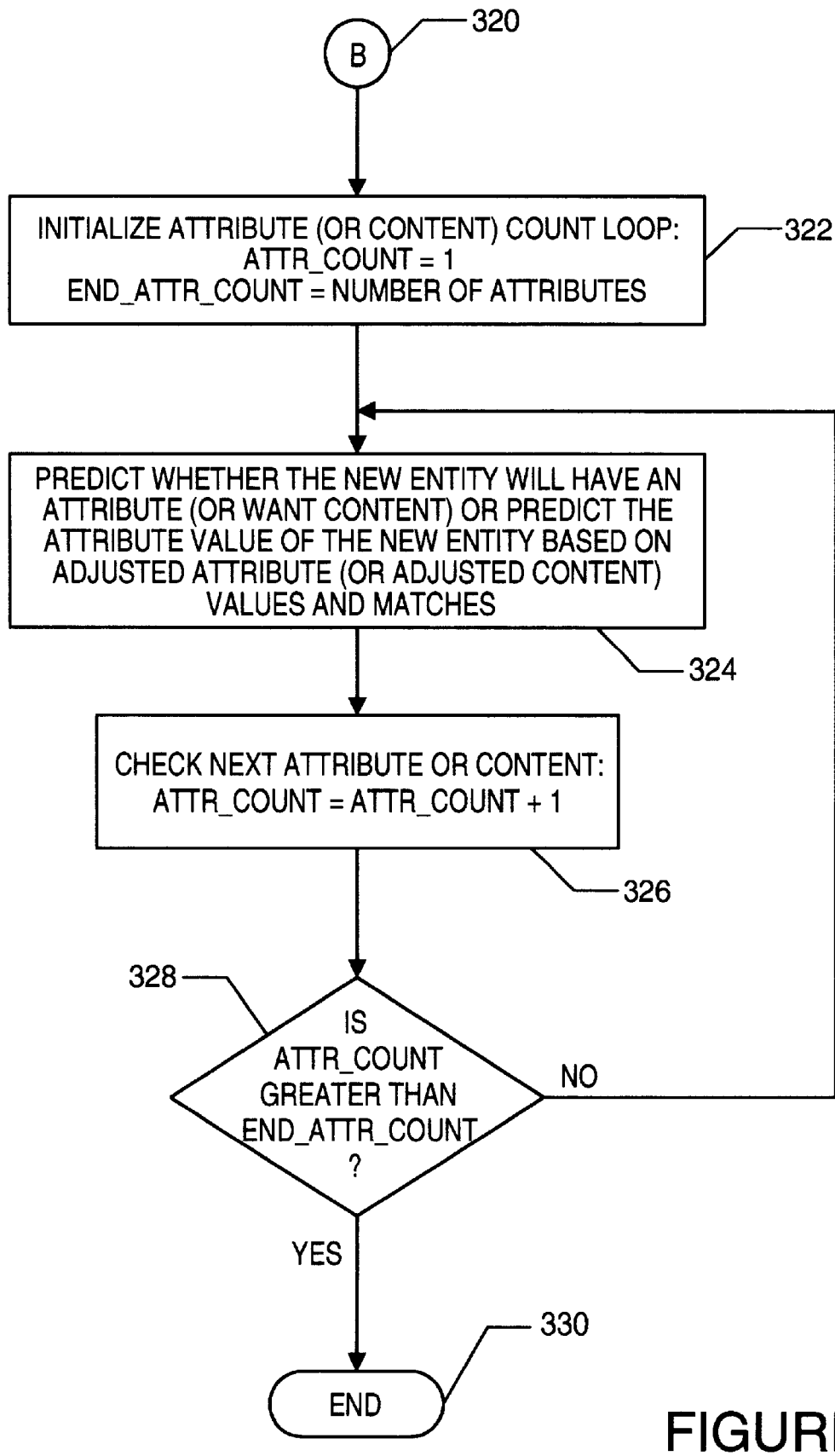

Inverse Attribute Frequency and Attribute Set Harmonization (with Default Voting) Applied to a Simple Entity Match Determination Process and to a Collaborative Filter Process Referring now to FIG. 3, which consists of FIGS. 3A through 3C, the operation of a simple entity match determination process and a collaborative filter process, each of which employ the inverse attribute frequency aspect of the present invention, will be disclosed. More specifically, FIG. 3 is a high level flow diagram of an illustrative process 300 for determining an attribute value of a new entity, which employs the inverse attribute frequency aspect of the present invention. In the following, it will be assumed that "content" is an "attribute", and the terms "content" and "attribute" may be used interchangeably for purposes of disclosing the present invention.

The following description assumes a preexisting entity/attribute database. Referring to FIG. 1A, recall that an entity (e.g., a computer user, television viewer, business group, etc.) 106 has one or more associated attributes (e.g., age, sex, favorite television show, favorite food, network topology, industry group, gross sales, etc.) 104. Thus, an entity/attribute database 100 may be formed of entity/attribute(s) records 102. Note that the database 100 may be a so-called "sparse" database in that many fields of the entity/attribute records 102 may be blank (e.g., a particular attribute (e.g., age) of a particular entity (e.g., a computer user) may not be known). In one embodiment of the process 300, record fields with unknown data are left blank (i.e., no attribute set harmonization). In an alternative embodiment of the present invention, blank record fields are filled in for example, with default attribute values (i.e., attribute set harmonization with default values).

Referring back to FIG. 3A, a process to determine whether a new entity possess an attribute (or wants content) 300 first adjusts all attribute value(s) based on attribute frequency information. Initially, as shown in FIG. 3A, all attribute values are adjusted in accordance with the inverse attribute frequency aspect of the present invention. First, as shown in step 302, an attribute or content count loop is initialized. More specifically, an attribute counter (ATTR_COUNT) is set to 1 and an attribute count terminator (END_ATTR_COUNT) is set to the number (e.g., N in FIG. 1A) of attributes. Next, as shown in steps 304, 306, and 308, for each attribute, the attribute value(s) are adjusted based on the frequency of the attribute(s) throughout all of the entities. The step 304 is described in greater detail later with reference to FIG. 4. As shown in step 306, after an attribute is adjusted for all entities, a new attribute is processed (ATTR_COUNT=ATTR_COUNT+1). As shown in step 308, subsequent attributes are adjusted until all of the attributes are processed (ATTR_COUNT>END_ATTR_COUNT). After each of the attributes is adjusted, processing continues, via node 310, to step 312.

Next, referring to FIG. 3B, a match between a new (or active) entity and other entities is determined. Processing continues, via node 310, and as shown in step 312, entity loop values are initialized. More specifically, an entity counter (ENTITY_COUNT) is set to 1 and an entity count terminator (END_ENTITY_CT) is set to the number (see, e.g., M of FIG. 1A) of entity records 102 in the entity/attribute database 100. Next, as shown in steps 314, 316, and 318, for entity record 102, the degree to which a new entity "matches" each existing entity is determined based on the adjusted attributes of each. The step 314 is described in greater detail later with reference to FIG. 5. As shown in step 316, after the degree to which the new entity matches an existing entity is determined, a degree to which the new entity matches a next entity is determined (ENTITY_COUNT=ENTITY_COUNT+1). As shown in step 318, the degrees to which other subsequent entities match the new entity are determined until the degree of match between the new entity and a last entity has been determined (ENTITY_COUNT>END_ENTITY_CT). After the degree of match between the new entity and each of the entities has been determined, processing continues, via node 320, to step 322.

Referring now to FIG. 3C, values of attributes, not having a value, of the new entity are determined. Processing continues, via node 320, and as shown in step 322, attribute loop values are initialized. More specifically, an attribute counter (ATTR_COUNT) is set to 1 and an attribute count terminator (END_ATTR_COUNT) is set to the number (see, e.g., N of FIG. 1A) of attributes 104 for an entity 106 of the entity/attribute database 100. Next, as shown in steps 324, 326, and 328, for an each attribute 104, it is determined (predicted) whether the new entity will have the attribute. Alternatively, for each attribute 104, the attribute value of the new entity is predicted. If the attribute is content, this determination will predict whether or not (or the degree to which) the new entity will want the content. The step 324 is described in greater detail later with reference to FIG. 6. As shown in step 326, after it is determined (predicted) whether the new entity has the attribute (or desires the content), a next attribute is processed to determine whether the new entity has the attribute (or wants the content) (ATTR_COUNT=ATTR_COUNT+1). As shown in step 328, the determination (prediction) of whether or not the new entity has an attribute (or wants content) continues for each subsequent attribute until the last attribute is processed (ATTR_COUNT>END_ATTR_COUNT). Thereafter, processing ends at node 330.

Figures 4, 4A:
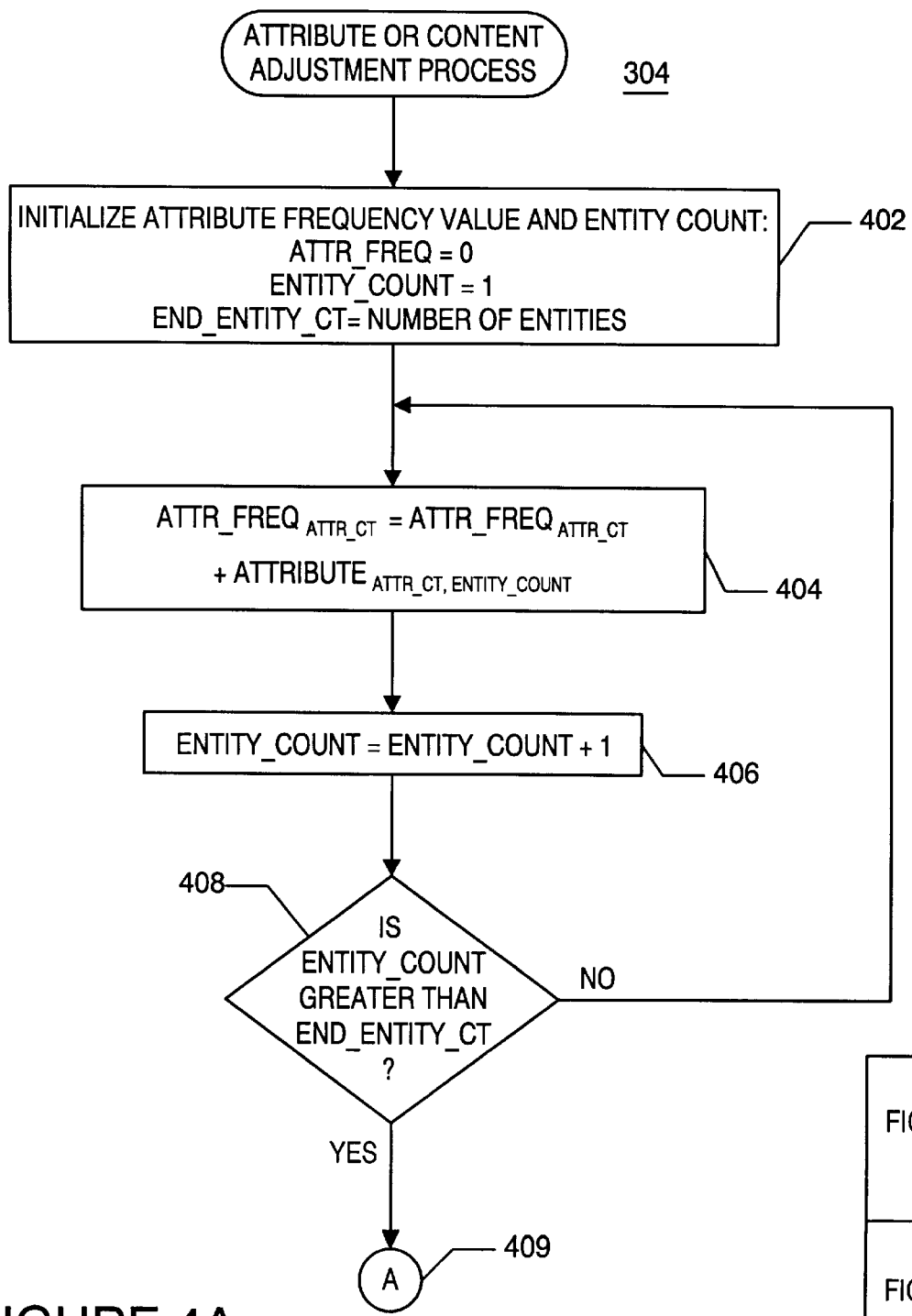
FIGS. 4A–B is a flow diagram of an illustrative attribute (or content) adjustment process used in the process of FIG. 3.
Figure 4B:
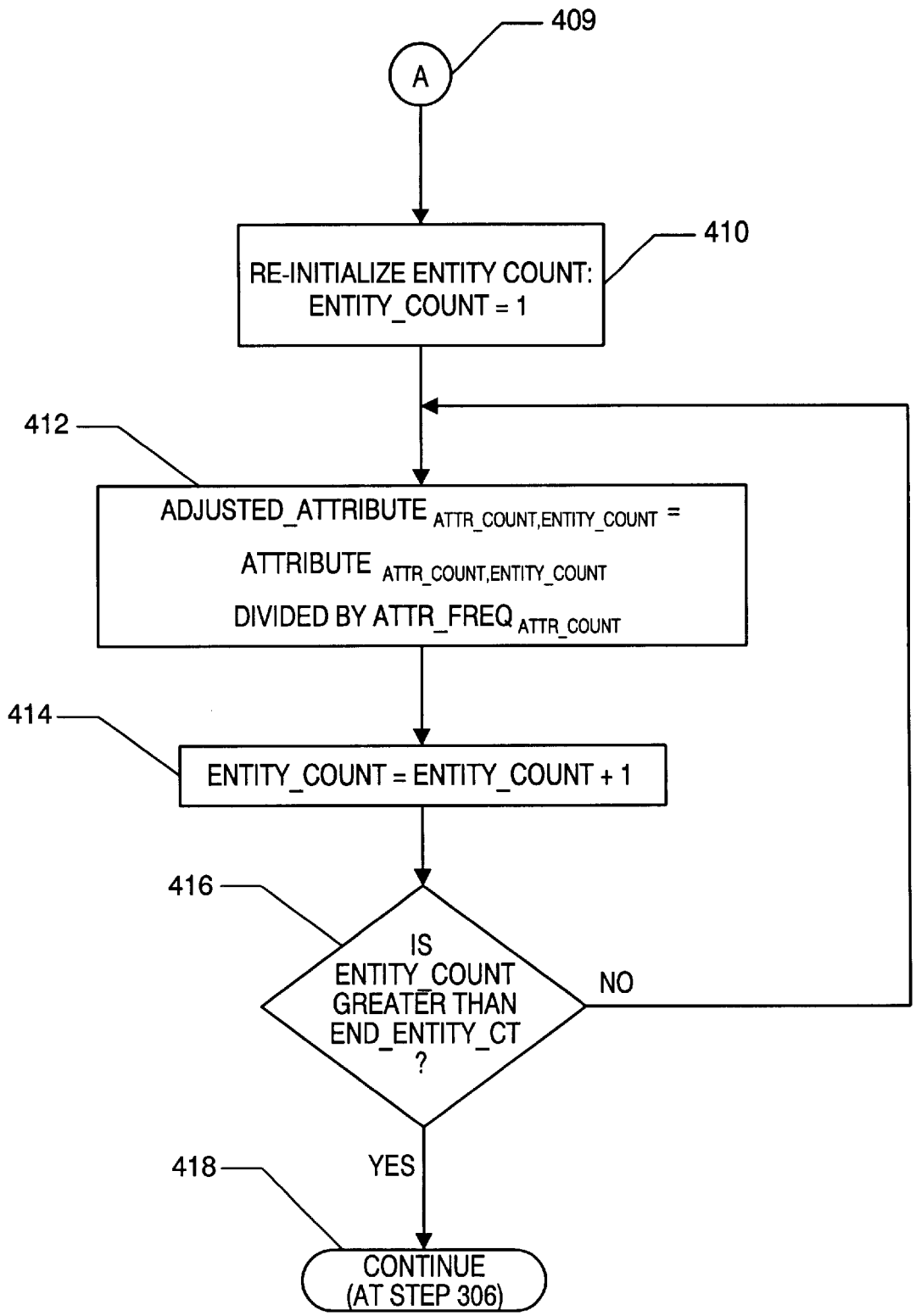

FIG. 4, which consists of FIGS. 4A and 4B, is a flow diagram of a part 304 of an illustrative attribute (or content) adjustment process used in the process 300 of FIG. 3. First, as shown in step 402 of FIG. 4A, an attribute frequency value and an entity count are initialized. More specifically the attribute frequency value (ATTR_FREQ) is set to 0, the entity count (ENTITY_COUNT) is set to 1, and the entity count terminator (END_ENTITY_CT) is set to the number (e.g., M in FIG. 1A) of entities 106. Next, as shown in steps 404, 406, and 408, the frequency of an attribute over all entities is determined. As shown in step 404, a running sum of the attribute frequency value (ATTR_FREQ) is formed by adding new attribute values (ATTRIBUTE$_{ATTR\_COUNT, ENTITY\_COUNT}$). Other ways of determining an adjusted attribute value are also possible. Basically, the adjusted attribute value is a function of the attribute value and the attribute frequency, and the adjusted attribute value decreases as the attribute frequency increases. This summing is most appropriate for "qualitative attributes" but may also be appropriate for "value attributes" having a numerical value. Alternatively, a running sum of the attribute frequency value (ATTR_FREQ) may be formed by incrementing the attribute frequency value when the entity has a value, e.g., a value above a certain threshold or a certain value, for the attribute. As shown in steps 406 and 408, this running sum is maintained as the attribute values of subsequent entities (ENTITY_COUNT=ENTITY_COUNT+1) are added until the last entity (ENTITY COUNT>END_ENTITY_CT). Processing continues, via node 409, at step 410.

Then, as shown in steps 410, 412, 414, 416, and 418, of FIG. 4B an adjusted attribute is determined for each attribute of each entity by dividing the attribute value by the attribute frequency. More specifically, step 410 re-initializes an entity count (ENTITY_COUNT=1) as was the case in step 402 (but the attribute frequency is not re-initialized). Next, as shown in step 412, an adjusted attribute value for each entity (ADJUSTED_ATTRIBUTE$_{ATTR\_COUNT, ENTITY\_COUNT}$) is determined by dividing the attribute value for that entity (ATTRIBUTE$_{ATTR\_COUNT, ENTITY\_COUNT}$) by the attribute frequency for the attribute over all entities (ATTR_FREQ$_{ATTR\_COUNT}$). Other ways of determining an adjusted attribute value are also possible. Basically, the adjusted attribute value is a function of the attribute value and the attribute frequency, and the adjusted attribute value decreases as the attribute frequency increases. As shown in steps 414 and 416, which correspond to steps 406 and 408, respectively, adjusted attributes are determined for an attribute for each entity. Then, as shown at node 418, processing continues (e.g., at step 306). Since the process 304 of FIG. 4 is nested in a loop through attributes (recall steps 302, 304, 306 and 308), adjusted attributes for all entities and all attributes are determined.

Figure 5:
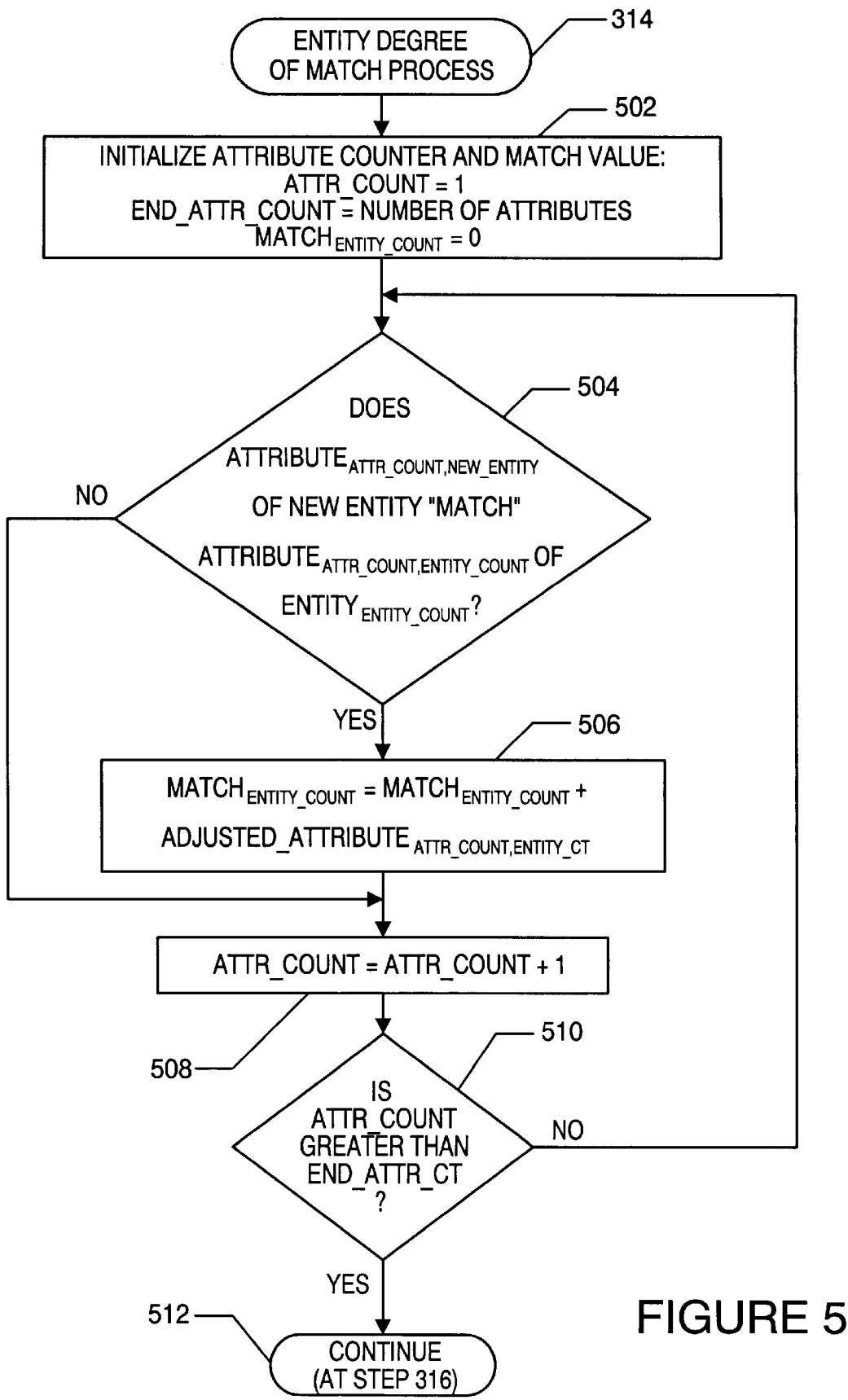
FIG. 5 is a flow diagram of an illustrative entity matching process used in the process of FIG. 3.

FIG. 5 is a flow diagram of a part 314 of an illustrative entity match determination process used in the process of FIG. 3. First, as shown in step 502, an attribute counter and an entity match value are initialized. More specifically, the attribute counter (ATTR_COUNT) is set to 1, a attribute count terminator (END_ATTR_COUNT) is set to the number (e.g., N of FIG. 1A) of attributes, and a match value between a new entity and an entity 106 (MATCH$_{ENTITY\_COUNT}$) is set to zero (0). Next, if, as shown in step 504, for a given attribute, that attribute of the new entity (ATTRIBUTE$_{ATTR\_COUNT, NEW\_ENTITY}$) "matches" the attribute of a particular entity (ATTRIBUTE$_{ATTR\_COUNT, ENTITY\_COUNT}$), then, as shown in step 506, the match between the new entity and the particular entity (MATCH$_{ENTITY\_COUNT}$) is incremented by the adjusted attribute count for the particular attribute and entity (ADJUSTED_ATTRIBUTE$_{ATTR\_COUNT, ENTITY\_COUNT}$). "Attribute matching" (not to be confused with the degree to which entities match) is easily determined if the attribute at issue is a YES/NO attribute. However, attributes may be considered to "match" if both are within a certain numerical range (e.g., age 40 to 49) or logical grouping (e.g., favorite pastimes of football, baseball, hockey, and tennis may be grouped as "sports" or tennis, squash, and racquetball may be grouped as "racket sports"). If, on the other hand, the attributes do not "match", as shown in steps 504 and 508, the match value is not changed, and processing continues for subsequent attributes.

The above steps are performed for all subsequent attributes as shown by steps 508 and 510. More specifically, step 508 looks at the next attribute of the particular entity (ATTR_COUNT=ATTR_COUNT+1). Step 510 ends this section of the processing when the last attribute of the particular entity is considered (ATTR_COUNT>END_ATTR_CT). Finally, as shown at node 512, processing continues (e.g., at step 316). Since the process 314 of FIG. 5 is nested in a loop through entities (recall steps 312, 314, 316 and 318), matches between the new entity and each of the entities are determined.

Figure 6:
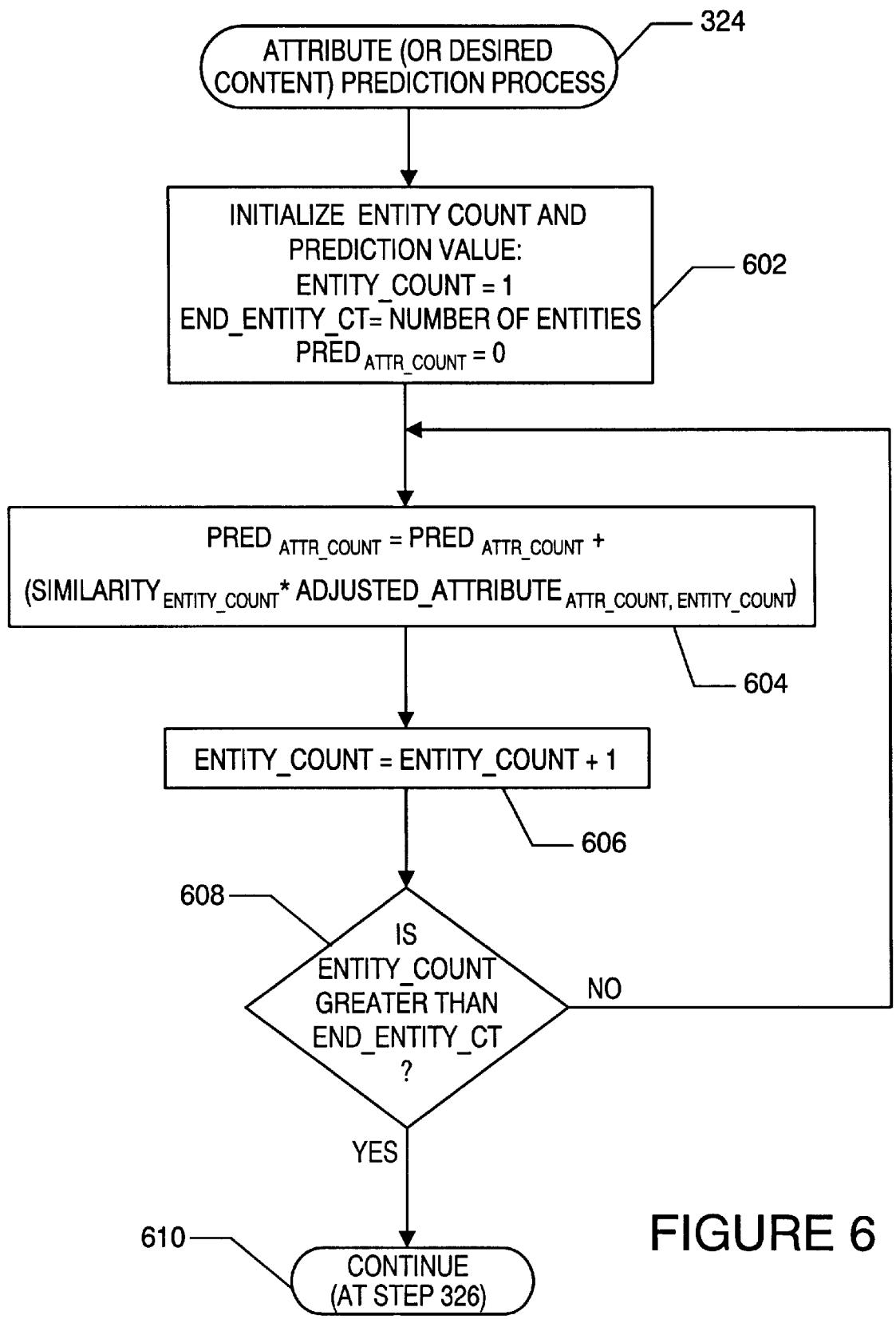
FIG. 6 is a flow diagram of an illustrative attribute or desired content prediction process used in the process of FIG. 3.

FIG. 6 is a flow diagram of a part 324 of an illustrative attribute (or desired content) prediction process used in the process 300 of FIG. 3. First, as shown in step 602, an entity counter and a prediction of whether the new entity includes an attribute (or wants content) are initialized. More specifically, the entity counter (ENTITY_COUNT) is set to 1, an entity count terminator (END_ENTITY_CT) is set to the number (see, e.g., M of FIG. 1A) of entities, and a prediction value of whether the new entity includes an attribute (or wants content) (PRED$_{ATTR\_COUNT}$) is set to zero (0). Next, as shown in steps 604, 606 and 608, a prediction is formed for whether the new entity will have an attribute (or want content) based on adjusted attribute values and match values between the new entity and all other entities. More specifically, as shown in steps 604 and 606, a running sum of a prediction is maintained by adding the product of a match value between the new entity and a particular entity (MATCH$_{ENTITY\_COUNT}$) and an adjusted attribute of the entity (ADJUSTED_ATTRIBUTE$_{ATTR\_COUNT, ENTITY\_COUNT}$) while the entities are incremented. As shown in steps 606 and 608, this continues until the prediction is updated based on (i) the match value between the new entity and the last entity and (ii) the adjusted attribute of the last entity (ENTITY_COUNT>END_ENTITY_CT).

After the prediction is updated based on the match value between the new entity and the last entity and based on the adjusted attribute of the last entity (ENTITY_COUNT>END_ENTITY_CT), as shown at node 610, processing continues (e.g., at step 326). Since the process 324 of FIG. 6 is nested in a loop through attributes (recall steps 322, 324, 326 and 328), predictions for all attributes (or desired content) for the new entity are determined.

Though the process 324 of FIG. 6 was described as predicting whether or not an entity has an attribute, it may also be used to predict the value of attributes of the entity.

Figure 1B:
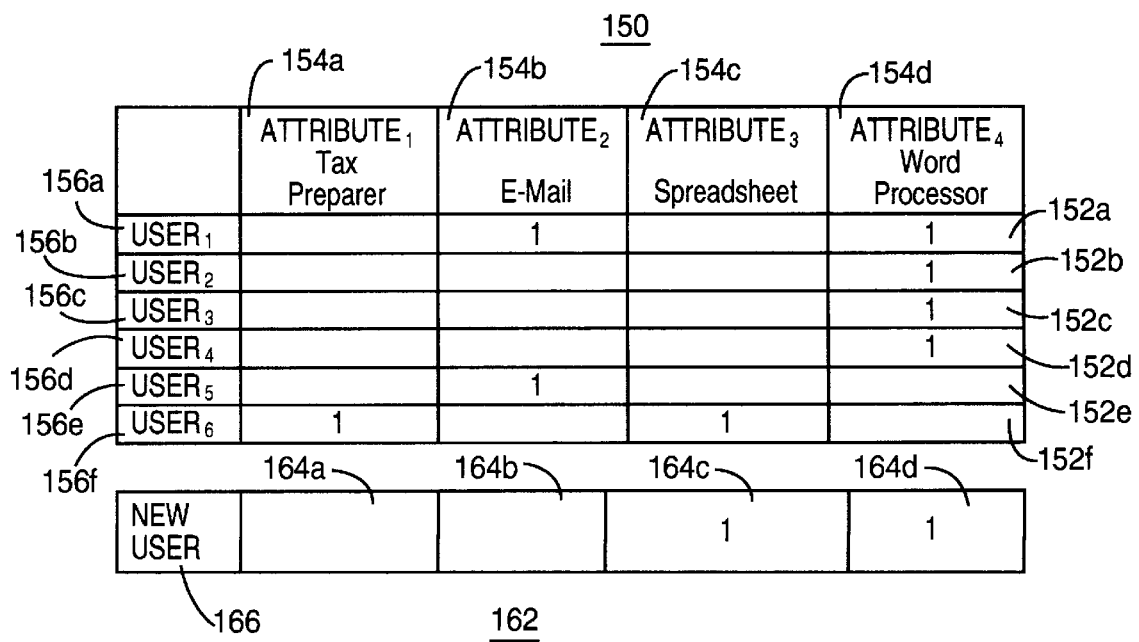
FIG. 1B is a table of exemplary data which is used to illustrate the problems of the prior art and the operation of the methods and apparatus of the present invention.

A simple example is set forth below to further teach the operation of the present invention. Referring first to FIG. 1B, a database 150 includes entity/attribute records 152 for six (6) entities 156. Each record includes four (4) attributes 154. A new entity 166 is represented by record 162, and has four (4) attributes 164 as well. This example may serve to illustrate the use of the present invention to suggest Internet pages authored in the hypertext mark-up language (or "HTML pages") within an Internet site to a computer user visiting the Internet site. For example, suppose that the attributes 154 correspond to whether or not a computer user has visited a particular HTML page of the Internet site of a computer software company within the past week. Attribute$_1$ 154a can correspond to whether or not a computer user visited an HTML page which has information regarding the computer software company's tax preparation product, attribute$_2$ 154b can correspond to whether or not a computer user visited an HTML page which has information regarding the computer software company's e-mail product, attribute$_3$ 154c can correspond to whether or not a computer user visited an HTML page which has information regarding the computer software company's spreadsheet product, and attribute$_4$ 154d can correspond to whether or not a computer user visited an HTML page which has information regarding the computer software company's word processing product.

Referring to FIG. 1B, a first entity (users) 156a has attribute$_2$ 154b and attribute$_4$ 154d. That is, the first entity (user$_1$) 156a has visited the e-mail and word processing HTML pages of the computer software company's Internet site within the last week. The second, third, and fourth entities (users$_{2-4}$) 156b–156d, each has attribute$_4$ 154d. That is, these entities (users$_{2-4}$) 156b–156d have visited the word processing HTML page of the computer software company's Internet site within the last week. A fifth entity (user$_5$) 156e has attribute$_2$ 154b. That is, the fifth entity (user$_5$) 156e has visited the e-mail HTML page of the computer software company's Internet site within the last week. Finally, the sixth entity (user$_6$) 156f has attribute$_1$ 154a and attribute$_3$ 154c. That is, the sixth entity (user$_6$) 156f has visited the tax preparation and spreadsheet HTML pages of the computer software company's Internet site within the last week.

The new user 166 enters the Internet site of the computer software company and visits the spreadsheet and word processor HTML pages. As will become apparent in the following discussion, the present invention can predict other HTML pages of the computer software company's Internet site that the new user 166 may want to visit. As will be discussed later, these predictions may be presented to the new user 166 in the form of suggested sites.

Recall from steps 402, 404, 406, and 408 of FIG. 4A, that an attribute frequency is determined for each attribute. As shown in FIG. 7A, attribute$_1$ 154a has a frequency of one (1) across all entities because only user$_6$ 156f has visited the tax preparation HTML page of the computer software company's Internet site within the last week. Attribute$_2$ 154b has a frequency of two (2) across all entities because user$_1$ 156a and user$_5$ 156e have visited the e-mail HTML page of the computer software company's Internet site within the last week. Attribute$_3$ 154c has a frequency of one (1) across all entities because only user$_6$ 156f has visited the spreadsheet HTML page of the computer software company's Internet site within the last week. Finally, attribute$_4$ 156d has a frequency of 4 across all entities because users$_{1-4}$ 156a–156d have all visited the word processor HTML page of the computer software company's Internet site within the last week.

Recall from steps 410, 412, 414, and 416 of FIG. 4B that all attributes are adjusted by dividing them by their attribute frequency value. Thus, as shown in FIG. 7B, the value of attribute$_1$ 154a is divided by one (1) for each entity, the value of attribute$_2$ 154b is divided by two (2) for each entity, the value of attribute$_3$ 154c is divided by one (1) for each entity, and the value of attribute$_4$ 154d is divided by four (4) for each entity. As a result, the values of attribute$_{1\ and\ 3}$ 154a and 154c remain at one (1) at the associated entities, the values of attribute$_2$ 154b have a value of 0.5 at the associated entities, and the values of attribute$_4$ 154d have a value of 0.25 at the associated entities.

Recall from steps 502, 504, 506, 508, and 510 of FIG. 5 that the degree to which each entity 156 and the new entity 166 match is based on a sum of adjusted attributes for "matching" attributes. Referring now to FIG. 1B, the new user 166 has visited the HTML pages of the computer software company's Internet site related to spreadsheets 154c and word processing 154d. Thus, the new user 166 will match, to some degree, users$_{1-4}$ and user$_6$ since these users have also visited the HTML page of the computer software company's Internet site related to spreadsheets 154c or the HTML page of the computer software company's Internet site related to word processors 154d. As shown in FIG. 8, the total match value between the new user 166 and user$_6$ 156f is one (1) because there is a "match" at attribute$_3$ and the adjusted attribute value for attribute$_3$ is one (1). The total match value between the new user 166 and each of users$_{1-4}$ 156a–156d is 0.25 because there is a "match", in each case, at attribute$_4$ and the adjusted attribute value for attribute$_4$ is 0.25. Since there are no "matches" between the new user 166 and users 156e, the total match value in this case is zero (0).

Finally, recall from steps 602, 604, 606, and 608 of FIG. 6 that a prediction that the new user 166 will have a particular attribute 154 (or want to visit a particular HTML page) is determined by summing products of entity match values (see, e.g., FIG. 8) and adjusted attributes (see, e.g., FIG. 7B) for all entities 156. Referring now to FIG. 9, the adjusted entries correspond to the adjusted attribute entries found in FIG. 7B multiplied by the total match value found in FIG. 8. A prediction record 900 of the new user 166 is presented as the summed products of match value and adjusted attributes over all entities 156. Since the new user 166 already had attributes$_{3\ and\ 4}$—that is, the new user 166 has already visited the spreadsheet HTML page 154c and the word processing HTML page 154d of the computer software company's Internet site—those predictions are ignored.

Interestingly, the present invention predicts that the new user is eight (8) times more likely to want to visit the tax preparation HTML page 154a of the computer software company's Internet site (prediction value of 1) than the e-mail HTML page 154b of the computer software company's Internet site (prediction value of 0.125). Referring back to FIG. 1B, this is because, the HTML spreadsheet page 154c of the computer software company's Internet site that the new user 166 had in common with user$_6$ was, in general, over all users 156, less popular that the HTML word processing page 154d of the computer software company's Internet site that the new user 166 had in common with users$_{1-4}$. In the above example, one can speculate that many different users use word processing applications while mostly accountants use spreadsheet and tax preparation applications. To reiterate, the present invention weights distinct attributes more heavily when determining similarities between entities, as was illustrated in the foregoing example.

§3.2 Second Illustrative Embodiment
Similarity—Type Matching Process and Collaborative Filtering Process using (FIGS. 15–17) the Inverse Attribute Frequency Aspect of the Present Invention.

Similarity-type matching and collaborative filtering applications which employ the inverse attribute frequency aspect of the present invention will be described with reference to FIG. 15. Thereafter, the operation of the collaborative filtering application (and its underlying similarity-type matching process) on exemplary data will be illustrated with reference to FIGS. 16A through 16G and 17A through 17K.

In a similarity-type matching process for determining a similarity between two entities, each entity may be thought of as a vector in z-dimensional space (where z is a number of attributes) and the similarity between the two entities may be thought of as a ("cosine-product" or "dot-product") distance between the two vectors. First, the values ($V_{i,j}$) of the attributes are normalized to provide normalized attribute values ($q_{i,j}$) as follows:

$$q_{i,j} = \frac{v_{i,j}}{\sqrt{\sum_{k \in I_i} (v_{i,k})^2}} \quad (4)$$

The similarity between the first and second entities can be defined as:

$$s_{1,2} = \sum_j q_{1,j} q_{2,j} \quad (5)$$

where:
$v_{i,j}$=The value of the $j^{th}$ attribute of entity i.
$q_{i,j}$=The normalized value of the $j^{th}$ attribute of entity i.
$I_i$=The set of attribute indexes, having values, for entity i.
A normalized weight value ($w_{1,2}$) can be determined from the similarity values as follows:

$$w_{1,2} = \frac{s_{1,2}}{\sum_{j=1,n} s_{1,j}} \quad (6)$$

Figure 15:
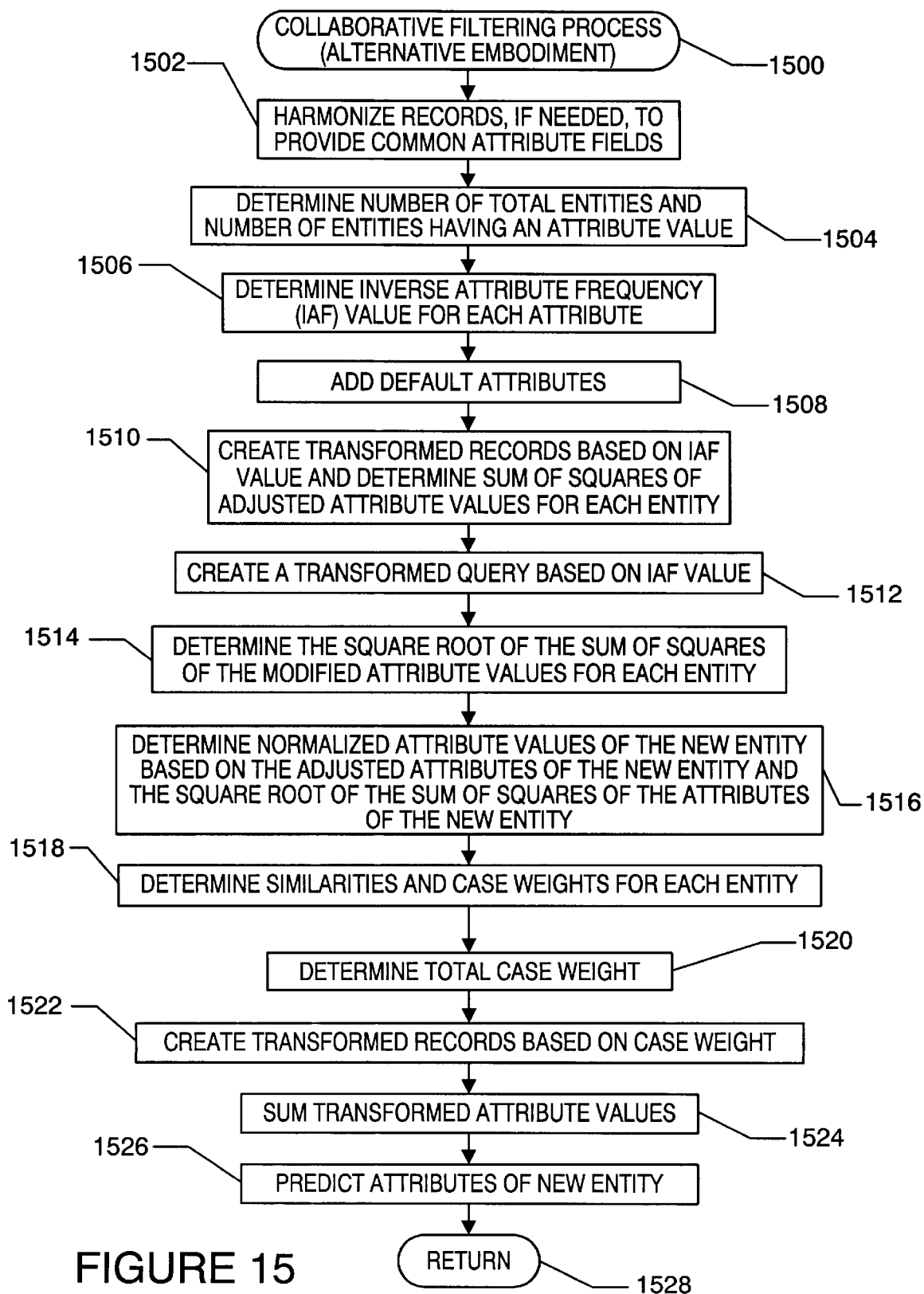
FIG. 15 is a high level flow diagram of an alternative collaborative filtering process.

FIG. 15 is a high level flow diagram of the collaborative filtering process 1500 (and underlying similarity-type matching process) which employs the inverse attribute frequency aspect of the present invention. In the following discussion, it is assumed that certain entities having certain attributes, and a new entity having certain attributes, are available for processing. Certain preliminary steps are first described with reference to steps 1502 and 1504. First, as shown in step 1502 entity records are harmonized, if necessary, to provide common attribute fields. Referring back to FIG. 1B, for example, user$_1$ only visited the E-mail web page and the Word Processor web page while user$_6$ only visited the Tax Preparer web page and the Spreadsheet web page. In a database, the records for these users would be harmonized so that they include all four web page attribute fields. Next, as shown in step 1504, the number of total entities and the number of entities having an attribute value (or an attribute value above a threshold) for an attribute field are determined. The details of this determination are discussed in more detail with reference to FIG. 16A below.

Once the preliminary steps are complete, an inverse attribute frequency (or "IAF") value is determined for each attribute as shown in step 1506. The IAF value for an attribute is defined as the natural log (LN) of the result of the total number of entities divided by the number of entities having an attribute value in an attribute field (excluding default values). This step 1506 is described in more detail with reference to FIG. 16B below. Other inverse attribute functions, based on the number of entities having an attribute value in an attribute field, and which decrease as the number of entities having an attribute value in an attribute field increase, may also be used.

Next, as shown in optional step 1508, default attributes are added. More specifically, if an entity does not have a value in an attribute field, a default value may be added.

Thereafter, as shown in step 1510, the entity records are transformed based on the IAF values to provide adjusted attribute values (e.g., $V_{i,j}=V_{i,j} \log (n/n_j)$ where n is the number entities and $n_j$ is the number of entities having a value for attribute$_j$), and the sum of squares of the adjusted attribute values $$\left(e.g., \sqrt{\sum_{k \in I_i} (v_{i,k})^2}\right)$$

is determined for each entity. More specifically, the adjusted attribute values are determined by multiplying the original attribute values by the IAF value for the particular attribute. This step 1510 is described in more detail with reference to FIG. 16C below.

The new entity having certain attributes is now processed. Since the collaborative filtering process 1500 predicts the existence or values of certain attributes of the new entity, the new entity may be referred to as a "query". As shown in step 1512, the new entity (or query) is transformed based on the IAF values. That is, each attribute of the new entity is multiplied by the corresponding IAF value. Next, as shown in step 1514, the sum of the squares of the adjusted attribute values of the new entity is also determined. The square root of the sum of squares is then determined. These steps 1512 and 1514 are described in more detail with reference to FIG. 16D below.

As shown in step 1516, normalized entity attribute values of the new entity are then determined by dividing on the adjusted attributes of the new entity by the square root of the sum of squares of the attributes of the new entity.

$$\left(e.g., q_{new,j} = \frac{v'_{new,j}}{\sqrt{\sum_{k \in I_{new}} (v_{new,j})^2}}\right).$$

This step 1516 is described in more detail with reference to FIG. 16E below.

Next, as shown in step 1518, similarities between the new entity and each of the existing entities are determined (e.g., $S_{new,i} = \Sigma q_{new,j}' q_{i,j}'$) and case weights for each of the entities are determined $$\left(e.g., w_{new,i} = \frac{S_{new,i}}{\sum_{j=1,n} S_{new,j}}\right).$$

More specifically, a similarity value is determined as a sum of products of all adjusted attribute values for an entity and the normalized attribute values of the new entity. The case weight for an entity is defined as the similarity for that entity divided by the sum of squares of adjusted attribute values for that entity. Next, as shown in step 1520, a total case weight value is determined. The total case weight value is defined as the sum of the case weights for all of the entities. These steps 1518 and 1520 are described in more detail with reference to FIG. 16F below.

Next, as shown in step 1522, new attribute values for each entity are determined based on the original attribute values and the case weights for each entity. More specifically, a new attribute value is defined as the product of the original attribute value and the case weight of the entity. The new attribute values are summed over all entities, as shown in Figure 1524, to determine a total. Finally, as shown in step 1528, predicted attributes for the new entity are determined based on the total for the attribute and the total case weight. More specifically, the predicted attribute is defined as the total of that attribute divided by the total case weight. These steps 1522, 1524, and 1526 are described in more detail with reference to FIG. 16G below.

Having had described the operation of the collaborative filtering process 1500 of FIG. 15 at a high level, the operation of this process 1500 on exemplary entity records and a new entity is described with reference to FIGS. 16A through 16G and 17A through 17K. In the example set forth below, it is assumed that the entities are users, that the attributes are movies, and the attribute values are explicitly entered ratings between 0 and 5. Naturally, the entities and attribute values could represent other things. For example, the attribute values could be the number of times a user visited an Internet HTML page within the last week. FIG. 17A is a table which illustrates the attribute values for attributes D1 through D6 of entities (users) C1 through C6. If no attribute value is known, a question mark "?" is depicted. For example, in the context of movie ratings, user C4 did not see, or saw but did not vote on, movies D2 and D5. FIG. 17E depicts the attribute values of attributes of a new entity (user).

Recall from step 1502 of FIG. 15, that the entity records are harmonized, if necessary, to provide common attribute fields. In the context of the new user of FIG. 17E, attribute fields for attributes D4, D5, and D6 are added.

Figure 16A:
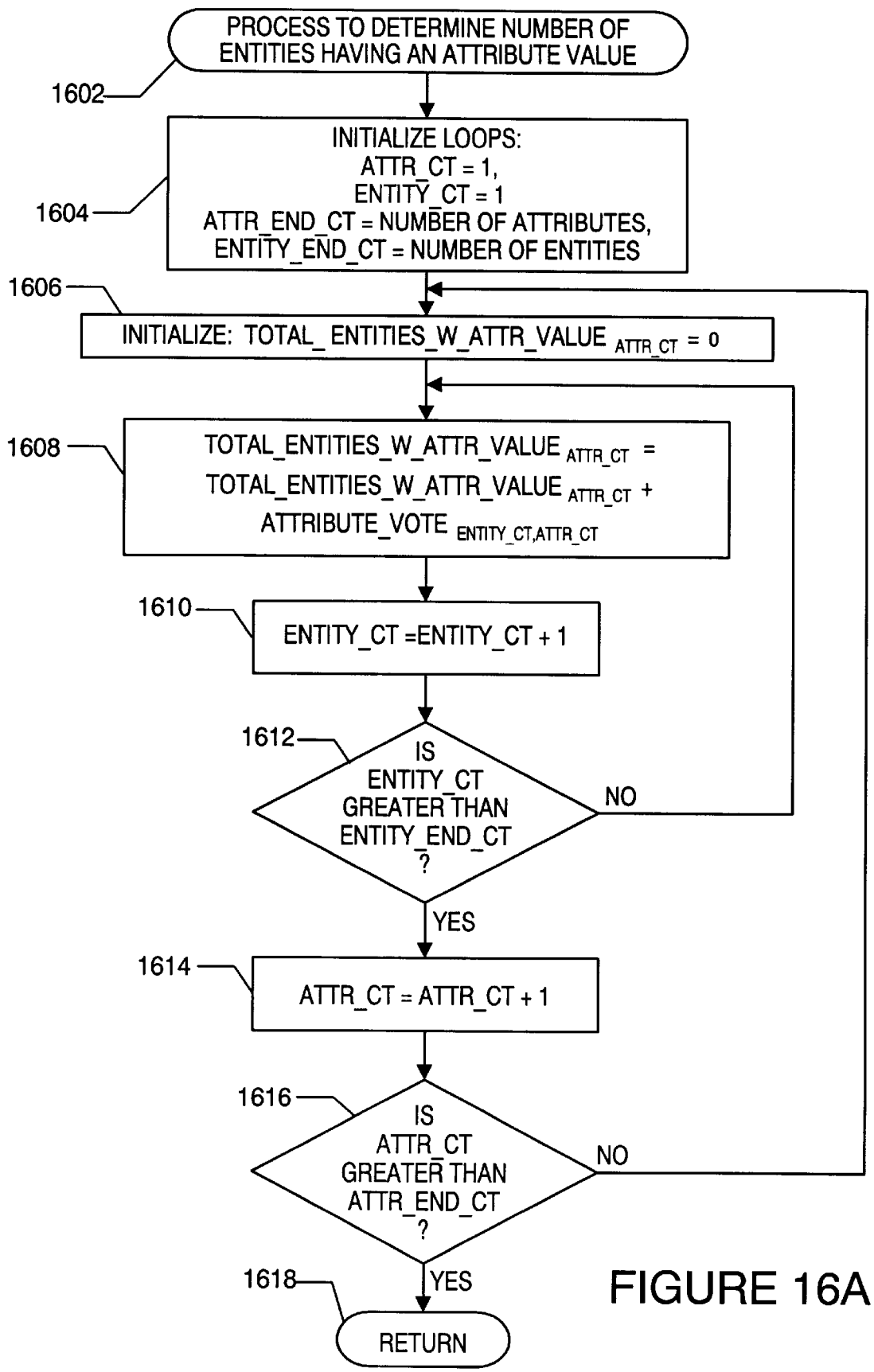
FIGS. 16A through 16G are flow diagrams which illustrate the processes carried out by the alternative collaborative filtering process illustrated in FIG. 15.

Referring to FIGS. 16A, 17A, and 17B, recall from step 1504 of FIG. 15 that the number of total entities and the number of entities having an attribute value for an attribute field are determined. More specifically, as shown in step 1604 of FIG. 16A, processing loops for processing each entity and each attribute are initialized. Referring to the table of FIG. 17A, an attribute count will loop from 1 to 6 and an entity count will also loop from 1 to 6. As shown in step 1606, a total entities with attribute value (TOTAL__ENTITIES_W_ATTR_VALUE) is initialized for a given attribute by setting it to zero (0). Next, as shown in steps 1608, 1610, and 1612, the total entities with attribute value for an attribute is determined over all entities by incrementing the value by an attribute value (ATTRIBUTE_VOTE) value. The attribute vote value (ATTRIBUTE_VOTE) is defined to be one (1) if the attribute of the entity has an attribute value and zero (0) if the attribute of the entity does not have an attribute value (i.e., "?"). As shown in steps 1614 and 1616, a total entities with attribute value (TOTAL__ENTITIES_W_ATTR_VALUE) is determined for each attribute.

The resulting total entities with attribute value (TOTAL__ENTITIES_W_ATTR_VALUE) for each attribute are depicted in FIG. 17B. For example, since entities (users) C1 and C3 through C6 have an attribute value (e.g., a vote) for attribute (e.g., movie) D1, the total entities with attribute value for D1 is 5. The total entities with attribute values for the other attributes are similarly determined as can be seen by reviewing FIGS. 17A and 17B.

Figure 16B:
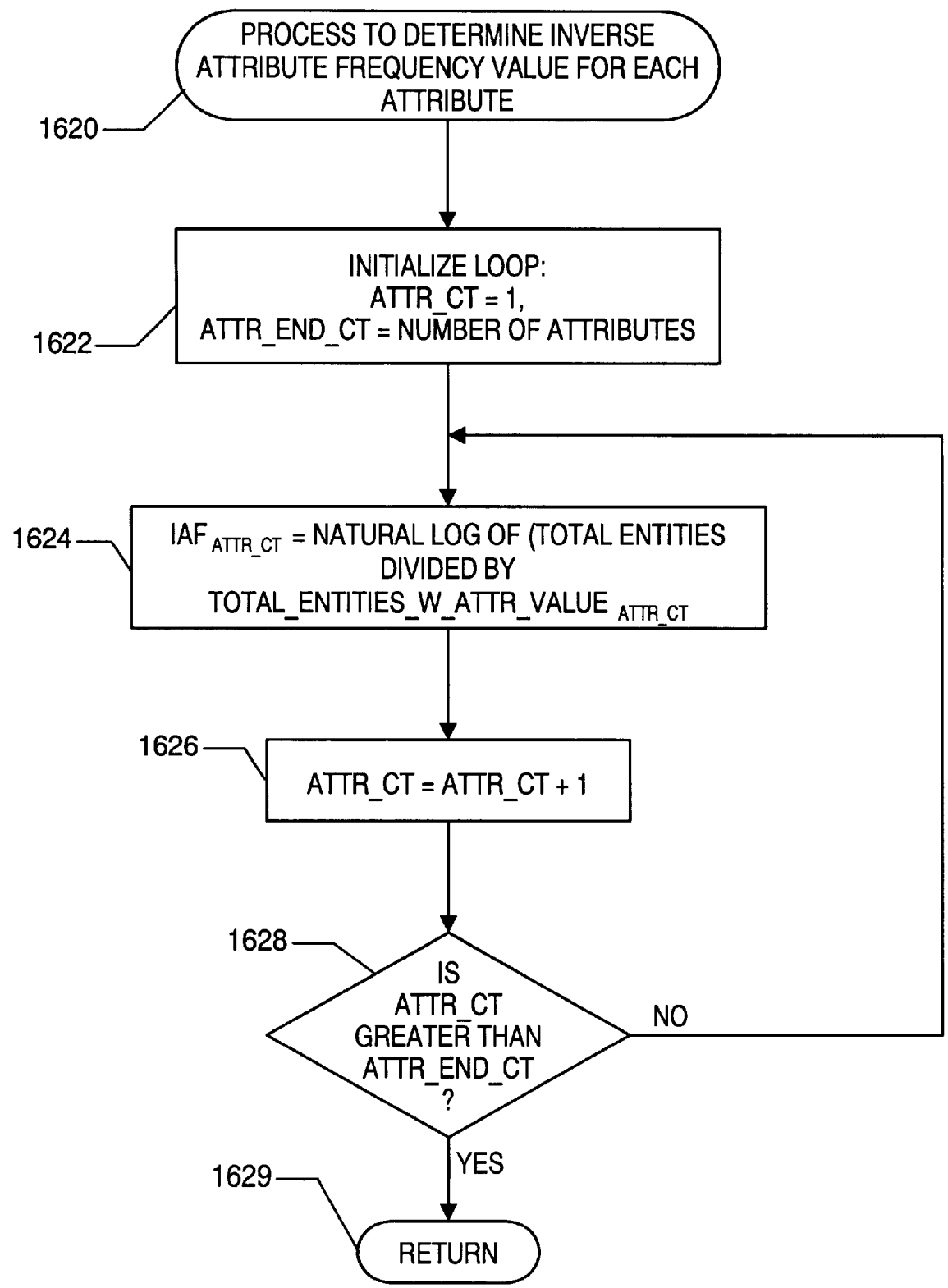
Figure 16C:
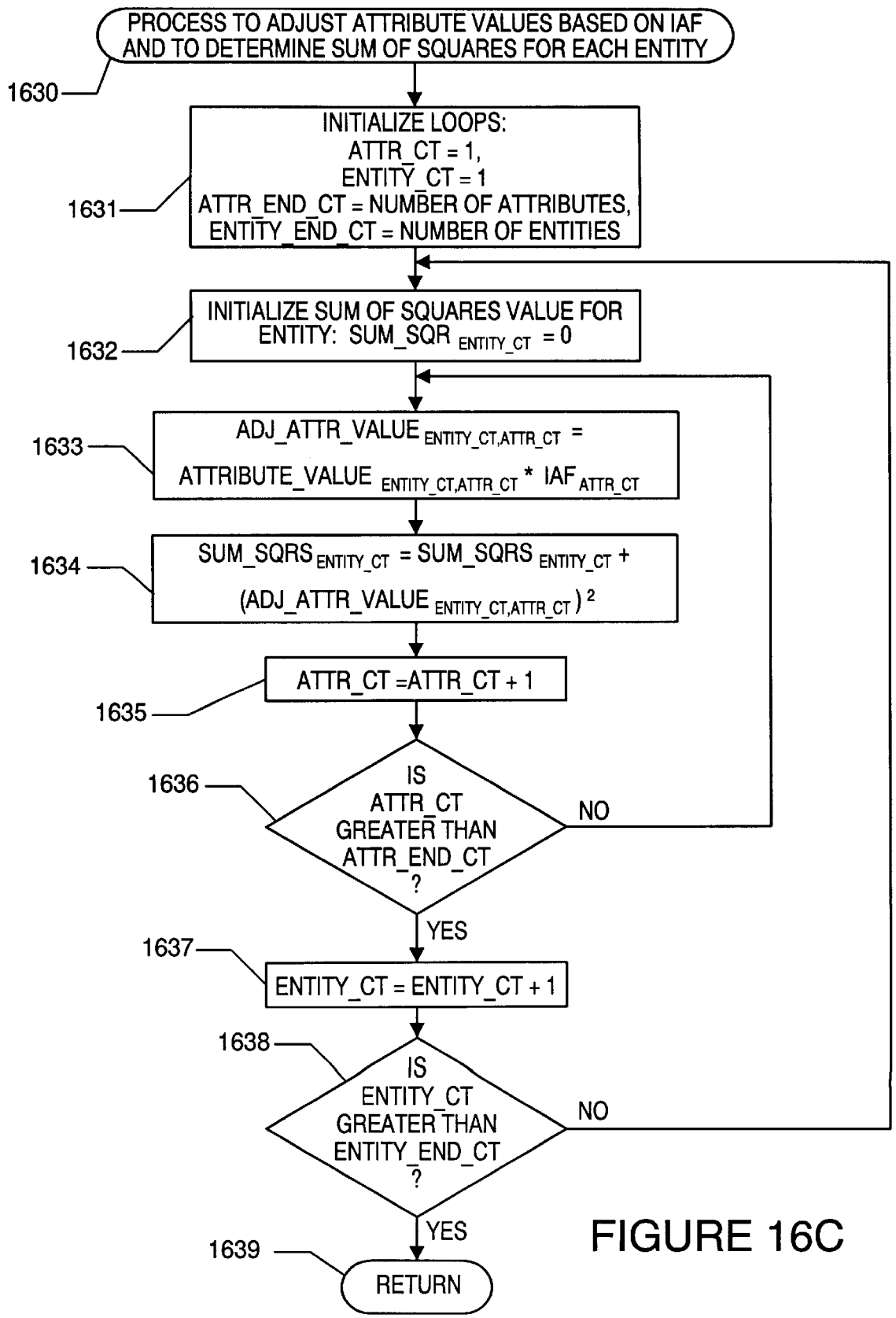
Figure 16D:
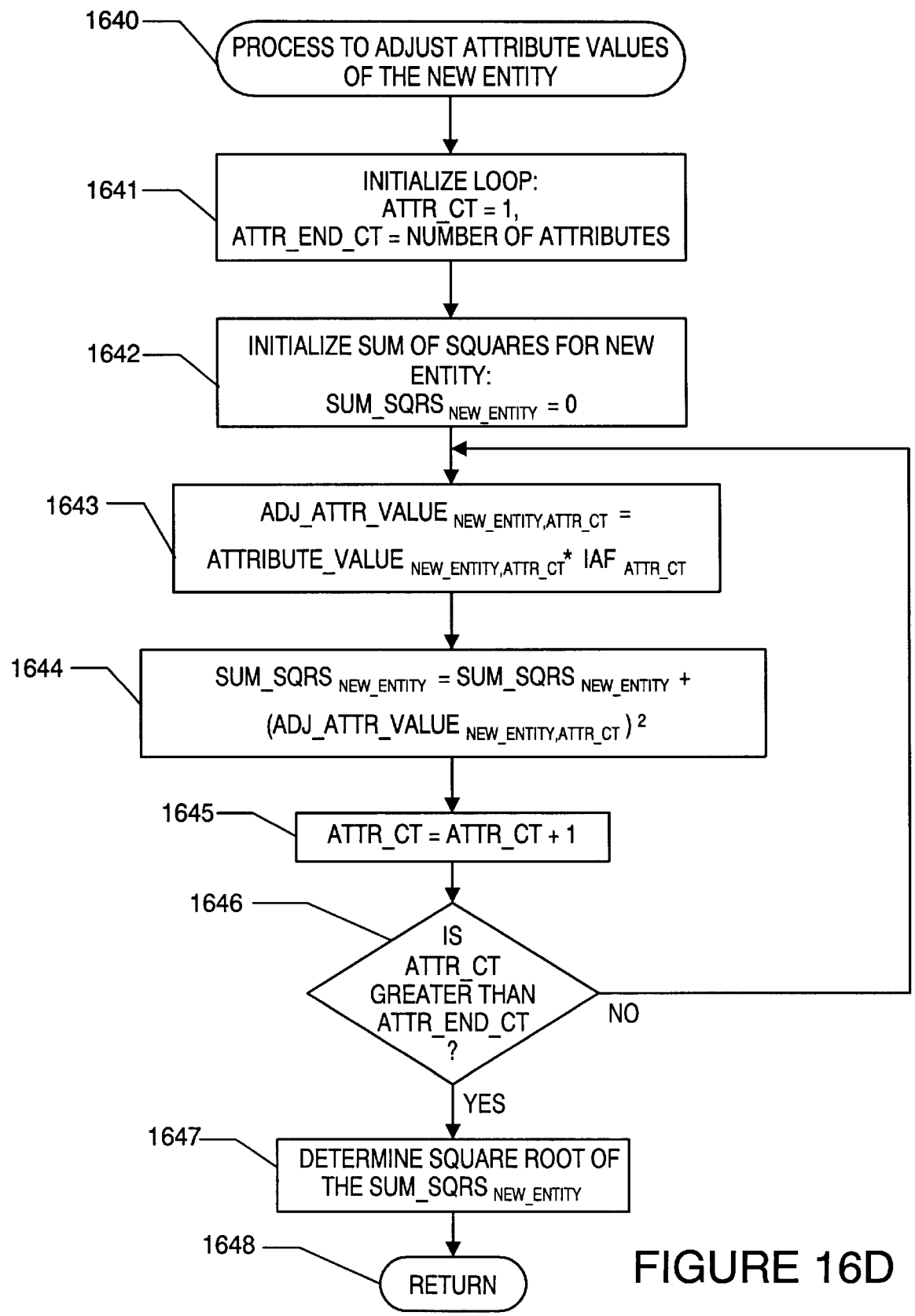
Figure 16E:
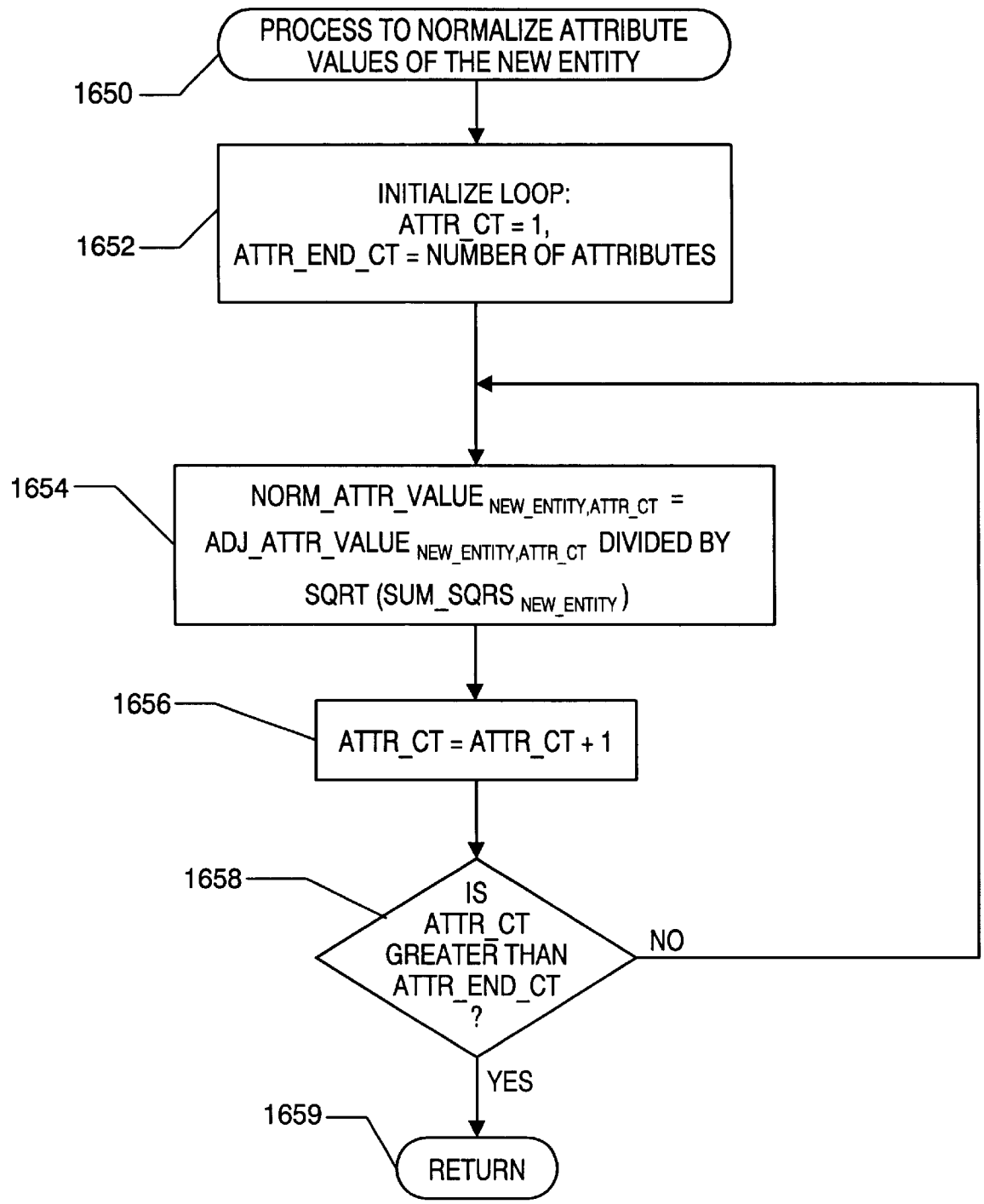
Figure 16F:
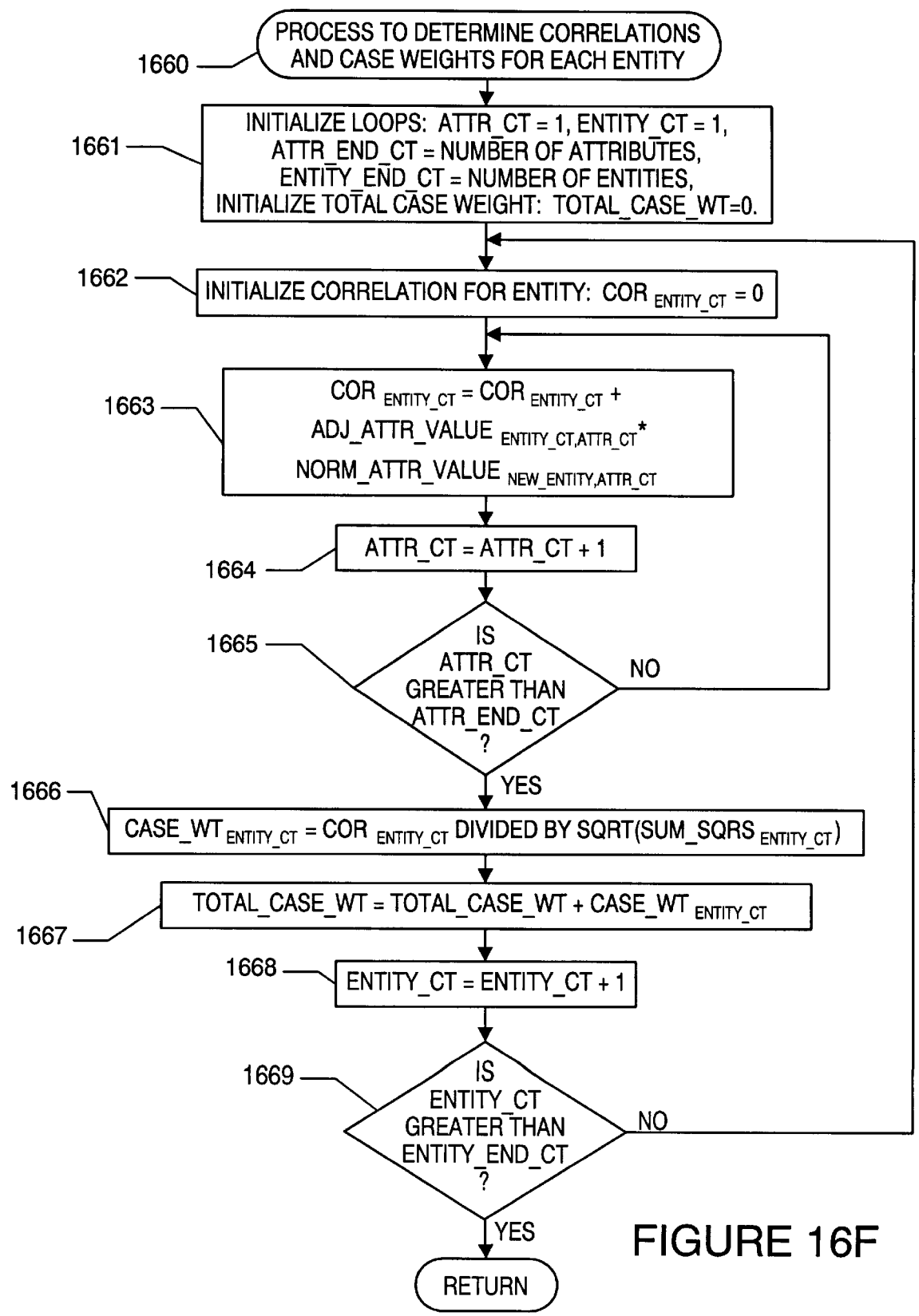
Figure 16G:
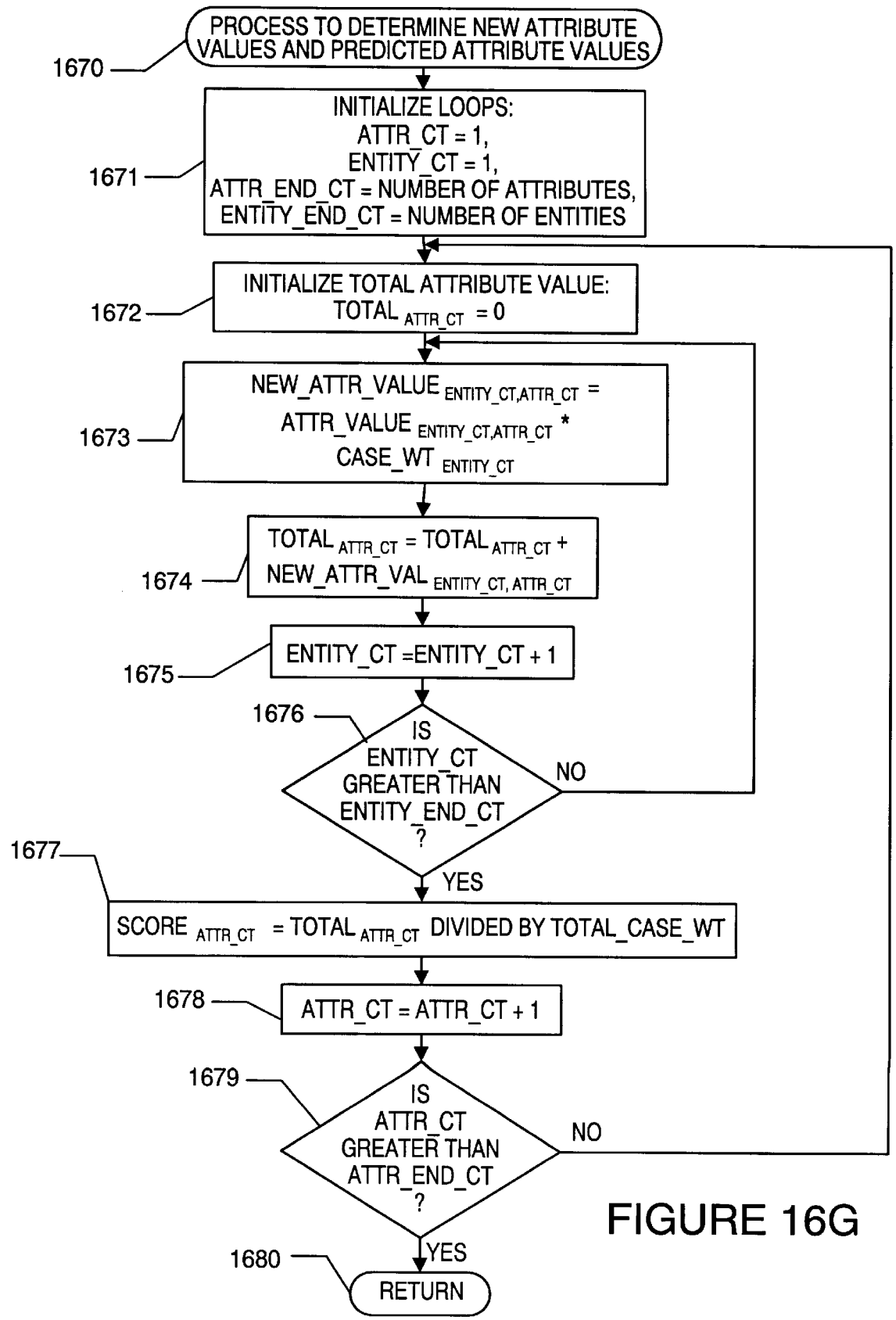

Referring to FIGS. 16B, 17B, and 17C, recall from step 1506 of FIG. 15 that the an inverse attribute frequency (IAF) value is determined for each attribute. As shown in step 1622 of FIG. 16B, an attribute count loop is initialized to count through attributes 1 through 6. As shown in step 1624, an inverse attribute frequency value (IAF) for a particular attribute is determined by taking the natural log of the result of dividing the total number of entities by the total entities with attribute value (TOTAL_ENTITIES_W_ATTR_VALUE) for that particular attribute. As shown by steps 1626 and 1628, step 1624 is repeated for each attribute. To reiterate, other functions for forming an inverse attribute frequency value may be used. Typically, the inverse attribute frequency value will decrease as the total entities with an attribute value increases.

The results of this processing are depicted in FIG. 17C. For example, the inverse attribute frequency value (IAF) for attribute D4 is 0.4054651 (=ln(6/4)). The inverse attribute frequency values for the other attributes is similarly determined as can be seen by reviewing FIGS. 17B and 17C.

Referring now to FIGS. 16C, 17A, 17C and 17D, recall from step 1510 of FIG. 15 that transformed records having adjusted attribute values are determined and sum of squares of the adjusted attribute values are determined for each entity. (See FIG. 17D.) More specifically, as shown in step 1631 of FIG. 16C, processing loops for processing each entity and each attribute are initialized; an attribute count will loop from 1 to 6 and an entity count will also loop from 1 to 6. Next, as shown in step 1632, a sum of squares value for an entity (SUM_SQR) is initialized by setting it to zero (0). Thereafter, as shown in steps 1633, 1635, and 1636, an adjusted attribute value (ADJ_ATT_VALUE) for all attributes of an entity is determined by multiplying the original attribute value (ATTRIBITE_VALUE) by the inverse attribute frequency value (IAF) for that attribute. Within the same loop of attributes, as shown in steps 1634, 1635, and 1636, a running set of sum of squares values (SUM_SQRS) is determined by adding the square of the adjusted attribute value (ADJ_ATTR_VALUE) to a previous sum of squares value (SUM_SQRS). At the end of the loop through the attributes, the last sum of the running sum of squares will be the final sum of squares (SUM_SQRS) for a particular entity. As shown in steps 1637, 1638, and 1632, the steps of determining adjusted attributes values (ADJ_ATT_VALUE) across all attributes of an entity (step 1633) and a final sum of squares value (SUM_SQRS) for the entity (step 1634), are repeated for each entity.

Given the original attribute values of FIG. 17A and the inverse attribute frequency values of FIG. 17C, the adjusted attribute values and sum of square values of FIG. 17D result (assuming unknown attribute values are assigned a default value of zero (0)). Take, for example, the entity C1; the adjusted attribute value for attribute D1 is 0.365 (=2*0.1823216), the adjusted attribute value for attribute D5 is 0.729 (=4*0.1823216) and the sum of squares value is 0.664823 (=0.365$^2$+0.729$^2$). The other adjusted attribute values and sum of squares of the adjusted attribute values of an entity are similarly determined as can be seen by reviewing FIGS. 17A, 17C, and 17D.

Referring now to FIGS. 16D, 17C, 17E, 17F, and 17G recall from steps 1512 and 1514 of FIG. 15 that the new entity having certain attributes is processed to generate a transformed record of adjusted attributes and the square root of the sum of the squares of the adjusted attribute values is determined. First, as shown in step 1641 of FIG. 16D, a loop to process each of the attributes of the new entity is initialized; an attribute count will loop from 1 to 6. Next, as shown in step 1642, a sum of squares value (SUM_SQRS) for the new entity is initialized by setting it to zero (0). Thereafter, as shown in steps 1643, 1645, and 1646, an adjusted attribute value (ADJ_ATT_VALUE) for all attributes of the new entity is determined by multiplying the original attribute value (ATTRIBITE_VALUE) by the inverse attribute frequency value (IAF) for that attribute. Within the same loop of attributes, as shown in steps 1644, 1645, and 1646, a running set of sum of squares values (SUM_SQRS) is determined by adding the square of the adjusted attribute value (ADJ_ATTR_VALUE) to a previous sum of squares value (SUM_SQRS). At the end of the loop through the attributes, the last sum of the running sum of squares will be the final sum of squares (SUM_SQRS) for the new entity and a square root of the sum of squares for the new entity is determined (step 1647).

Referring to FIGS. 17C, 17E, 17F, and 17G, take for example, the second attribute of the new entity; the adjusted attribute value of the second attribute is 2.07944154 (=3*0.69314718). The other adjusted attribute values of the new entity are similarly determined as can be seen by reviewing FIGS. 17C, 17E and 17F. The square root of the sum of squares is 3.0298536 (=SQRT (0.7292862$^2$+ 2.07944154$^2$+2.07944154$^2$).

Referring now to FIGS. 16E, 17F, 17G and 17H, recall from step 1516 of FIG. 15 that normalized attribute values of the new entity are determined by dividing the adjusted attribute values of the new entity by the square root of the sum of squares of adjusted attribute values of the new entity. More specifically, as shown in step 1652 of FIG. 16E, a loop to process each of the attributes is initialized; an attribute count will loop from 1 to 6. Next, as shown in step 1654, for each attribute, a normalized attribute value (NORM_ATTR_VALUE) of an attribute of the new entity is determined by dividing the adjusted attribute value (ADJ_ATTR_VALUE) of the attribute of the new entity by the square root of the sum of squares of the adjusted attributes of the new entity. As shown in steps 1656 and 1658, this determination is repeated for each attribute.

Referring to FIGS. 17F, 17G, and 17H, take for example, the first attribute of the new entity; the normalized attribute value is 0.2407002 (=0.7292862/3.0298536). Normalized values of the other attributes of the new entity are similarly determined as can be seen by reviewing FIGS. 17F, 17G, and 17H.

Referring now to FIGS. 16F, 17D, 17H and 17I, recall from step 1518 of FIG. 15 that similarities and case weights are determined for each entity. More specifically, as shown in step 1661 of FIG. 16F processing loops for processing each entity and each attribute are initialized; an attribute count will loop from 1 to 6 and an entity count will also loop from 1 to 6. Moreover, a total case weight value TOTAL_CASE_WT) is initialized by setting it to zero (0). Next, as shown in step 1662, a similarity value (SIM) between the new entity and an entity is initialized. Thereafter, as shown in steps 1663, 1664, and 1665, within a loop of attributes, a running set of similarities (SIM) is determined by adding the product of an adjusted attribute value (ADJ_ATTR_VALUE) of the attribute of the entity and the normalized attribute value (NORM_ATTR_VALUE) of the attribute of the new entity to a previous similarity value (SIM). As shown in steps 1666, 1668, and 1669, for each entity, a case weight (CASE_WT) is determined by dividing the final of the running set of sums of similarities (SIM) for the entity by the square root of the sum of squares of adjusted attribute values (SUM_SQRS) of the entity. Moreover, recall from step 1520 of FIG. 15 that a total case weight value is determined. As shown in steps 1667, 1668, and 1669, a running sum of a total case weight value (TOTAL_CASE_WT) is kept while looping through the entities. The total case weight (TOTAL_CASE_WT) is determined as the sum of the previous total case weight (TOTAL_CASE_WT) and the case weight (CASE_WT) of the current entity.

Referring to FIGS. 17D, 17H, and 17I, take, for example, the first entity C1; the similarity (SXY) between entity C1 and the new entity is 0.088 (=(0.365*0.2407002)+ (0.729*0)) and the case weight is 0.10764438 (=0.088/ SQRT (0.664823)). The similarities and case weights of the other entities are similarly determined as can be seen by reviewing FIGS. 17D, 17H, and 17I.

Referring now to FIGS. 16G, 17A, 17I, 17J, and 17K, recall from step 1522 of FIG. 15 that the attribute values of the original entity/attribute records are transformed to new attribute values based on the case weights. More specifically, as shown in step 1671 of FIG. 16G, processing loops for processing each entity and each attribute are initialized; an attribute count will loop from 1 to 6 and an entity count will also loop from 1 to 6. Moreover, recall from step 1524 of FIG. 15 that a sum of the new attribute values is determined. More specifically, as shown in step 1672, a total attribute value (TOTAL) of an attribute is initialized by setting it to zero (0). Next, as shown in steps 1673, 1675, and 1676, for each entity, a new attribute value (NEW_ATTR_VALUE) of an attribute is determined as the product of the original attribute value (ATTR_VALUE) and the case weight (CASE_WT) of the entity. Moreover, recall from step 1528 of FIG. 15 that predicted attributes of the new entity are determined. More specifically, as shown in steps 1674, 1675, and 1676, a running sum (TOTAL) of the new attribute values (NEW_ATTR_VAL) for a particular attribute is kept while looping through the entities. The total (TOTAL) is determined as the sum of the previous total (TOTAL) and the new attribute value (NEW_ATTR_VAL) of the current entity. Thereafter, as shown in steps 1676 and 1677, at the end of each entity loop, a predicted attribute value (SCORE) is determined for an attribute of the new entity by dividing the sum of the new attribute values (TOTAL) by the total case weight. As shown in steps 1678 and 1679, the loop through the entities during which new attribute values (NEW_ATTR_VALUE) and running totals are determined, and the predicted attribute value (SCORE) determination is repeated for each attribute.

Referring to FIG. 17A, 17I, 17J, and 17K, take attribute D5 for example. The new attribute D5 for the first entity C1 is 0.4305775 (=4*0.10764438), the attribute D5 for the second entity C2 is 0.7592906 (=1*0.75929062), the attribute D5 for the third entity C3 is 4.5015319 (=5*0.90030639), the attribute D5 for the fourth entity C4 is 0 (=0*0.62568901), the attribute D5 for the fifth entity C5 is 0.5922505 (=1*0.59225952), and the attribute D5 for the sixth entity C6 is 0 (=0*0.09133079). The other new attribute values are similarly determined as can be seen by reviewing FIGS. 17A, 17I, and 17J. The total of these new attribute values of attribute D5 over all entities is 6.2836506. The other new attribute value totals for all entities are similarly determined. Finally, the prediction of attribute D5 for the new entity is 2.0424595 (=6.2836506/3.07651171). The prediction of other attributes of the new entity are similarly determined as can be seen by reviewing FIGS. 17I, 17J, and 17K. However, since, as shown in FIG. 17E, the values of the attributes D1, D2, and D3 of the new entity were already known, the predictions of the attribute values for these attributes is either not made, or made and discarded. Such instances are depicted as "Given" in FIG. 17K.

Figure 18:
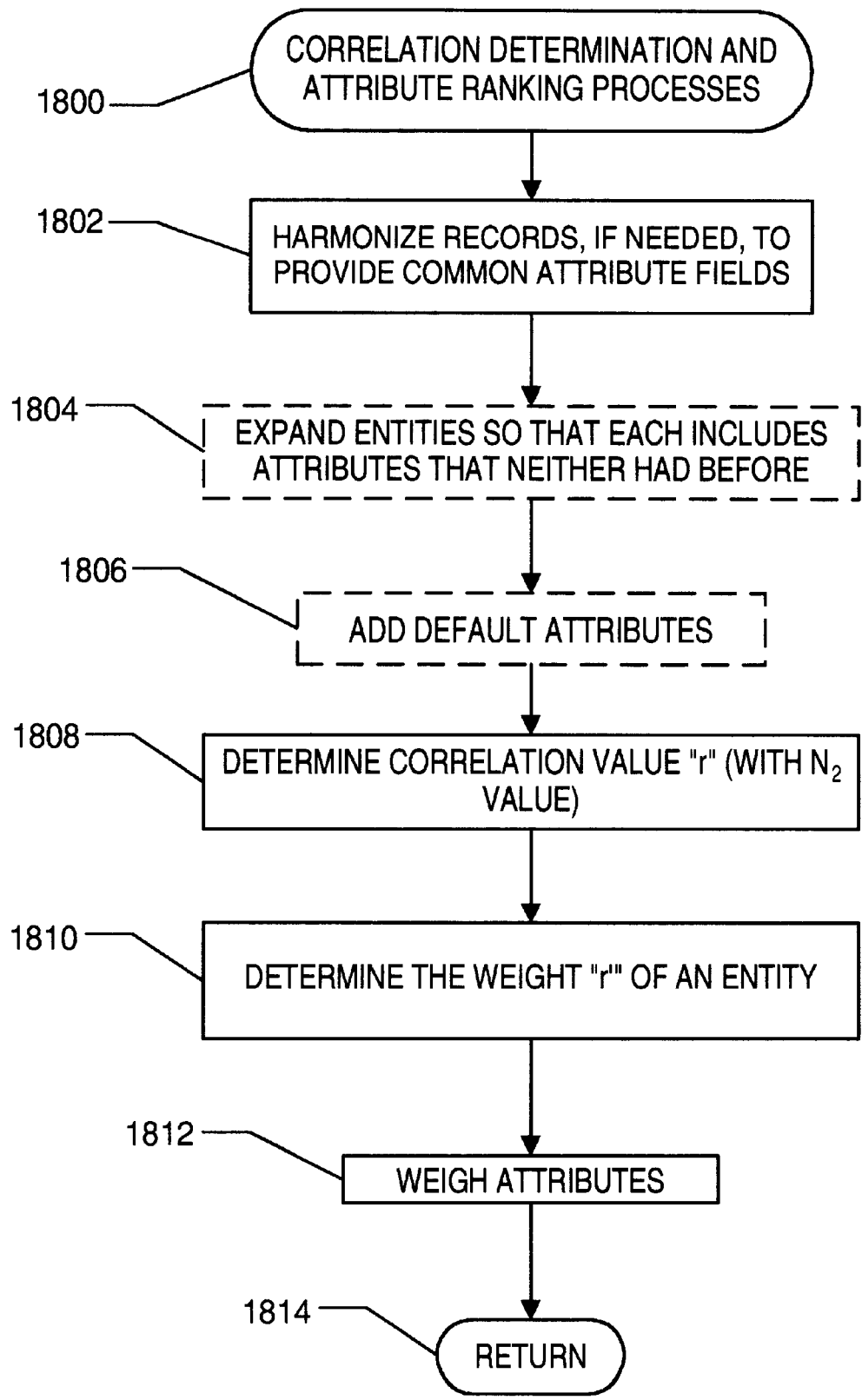
FIG. 18 is a high level flow diagram of correlation determination and attribute ranking process performed in accordance with the present invention.

§3.3 Third Illustrative Embodiment
Correlation—type Matching and Collaborative Filtering Processes using Inverse Attribute Frequency, Attribute Set Harmonization (with Default Voting), Attribute Expansion (with Default Voting), and Tuning Aspects of the Present Invention (FIGS. 18 and 19)

The following will describe (i) determining a correlation between entities, (ii) determining a correlation between entities with filler (i.e., harmonization and/or expansion) attributes, (iii) tuning (i.e., amplifying and/or suppressing) correlation determinations, and (iv) ranking attributes. FIG. 18 is a high level flow diagram of a process 1800 which includes each of the above mentioned procedures. FIGS. 19A through 19C provide an example for illustrating harmonizing entity/attribute records and for adding filler attributes to entity/attribute records.

§3.3.1 Determining Correlation Adjusted based on Inverse Attribute Frequency and Attribute Set Harmonization Aspects of the Invention FIG. 18 is a high level flow diagram of a correlation determination and attribute ranking processes 1800 which are carried out in accordance with the present invention. FIG. 19A illustrates an exemplary entity/attribute record of a new entity 1902 and an exemplary entity/attribute record of a databased entity 1904. In this example, the entities are television viewers, the attributes are television programs, and the attribute values are ratings entered by the user.

First, as shown in step 1802, the entity/attribute records 1902 and 1904 are harmonized, if necessary, so that the entity/attribute records 1902 and 1904 have common attribute fields. For example, referring to FIG. 19A, the entity/attribute record 1902 has a rating for 60 minutes but has no rating for X-Files, while the entity/attribute record 1904 has a rating for X-Files but has no rating for 60 minutes. FIG. 19B shows the harmonized entity/attribute records 1902' and 1904'. Note that a default rating value (in this case 1) is assigned to "extension attributes" added to the entity/attribute records.

Since steps 1804 and 1806 are optional (as indicated by the phantom lines), these steps will be described later. Assuming that the optional steps 1804 and 1806 are not performed, a correlation value "r" between an $a^{th}$ entity and an $i^{th}$ entity is determined as shown in step 1808. The correlation value "$r_{a,i}$" may be determined based on the following equation:

$$r_{a,i} = \frac{N \sum_j v_{a,j} v_{i,j} - \sum_j v_{a,j} \sum_j v_{i,j}}{\sqrt{\left(N \sum_j v_{a,j}^2 - \left(\sum_j v_{a,j}\right)^2\right)\left(N \sum_j v_{i,j}^2 - \left(\sum_j v_{i,j}\right)^2\right)}} \quad (7)$$

where:

$v_{a,j}$=The value of the $j^{th}$ attribute of the $a^{th}$ entity.

$v_{i,j}$=The value of the $j^{th}$ attribute of the $i^{th}$ entity.

N=The number of attributes with values in a set of common values between the $a^{th}$ and $i^{th}$ entities.

If the values $v_{a,j}$ and $v_{i,j}$ are adjusted based on the attribute frequency value as discussed above (i.e., such that they decrease as the number of entities having a value for the $j^{th}$ attribute increases), then the process for determining the correlation value $r_{a,i}$ will have used the inverse attribute frequency aspect of the invention.

The weight, a normalized version of the correlation value r, may be expressed as:

$$w_{a,i} = \frac{r_{a,i}}{\sum_{j=1,n} |r_{a,j}|} \quad (8)$$

§3.3.2 Determining Correlation with Default Filler Attributes Expansion Aspect of the Invention In the examples discussed above with reference to FIGS. 19A and 19B, "extension attributes" were added so that the entity/attribute records 1902 and 1904 would have a common set of attributes (e.g., Mash, CBS News, 60 Minutes and X-Files). As discussed above, the attribute expansion aspect of the present invention permits match (e.g., correlation) determinations to be made based on attributes ("filler attributes" or "expansion attributes") that neither entity/attribute record includes. A default attribute value (e.g., one (1)) is assigned to each of the filler attributes. Although basing a match (e.g., correlation) determination on "manufactured" information is counterintuitive, the present inventors have found that the use of such "filler attributes" aids correlation when most entities (or users) can be assumed to find most attributes (or content) not useful. Indeed, in the context of recommending content to a users, the present inventors have found that the use of such "filler attributes" often improves content recommendations, they believe, because the "filler attributes" provide a background or reference that, in effect, highlights "matching" attributes (e.g., votes).

As shown in step 1804 of FIG. 18, conceptually, entity/attribute records (e.g., 1902' and 1904') are expanded so that they include attributes that neither included before. Next, as shown in step 1806, default attribute values are added to the "filler attributes". Referring to FIGS. 19B and 19C, if $N_2$ filler attributes are added to the entity/attribute records 1902' and 1904' of FIG. 19B, and a default attribute value of one (1) is assigned to each of the filler attributes, the entity/attribute records 1902" and 1904" of FIG. 19C result.

The process of adding filler attributes having default attribute values to entity/attribute records can be used with any matching or collaborative filtering process. This process tends to reduce the number of explicitly matched attributes needed to predict an attribute (e.g., recommend content) because it tends to improve predictions (e.g., recommendations) when the number of explicitly matched attributes is small. Thus, this aspect of the present invention overcomes the bootstrapping problem of the GroupLens system discussed above; encouraged by good initial predictions or recommendations, users are more likely to explicitly enter attributes (e.g., ratings votes).

Although the process of adding filler attributes having default attribute values was described as altering entity/attribute records, this process can be effected without explicitly enumerating the additional attributes and modifying the entity/attribute records. More specifically, the process can be carried out by the following formula for determining the correlation "r" which equals:

$$\frac{\left(\left(\sum f + N_2\right)\left(N_2 d^2 + \sum fXY\right) - \left(N_2 d + \sum fX\right)\left(N_2 d + \sum fY\right)\right)}{\sqrt{\left(\left(\left(\sum f + N_2\right)\left(N_2 d^2 + \sum fX^2\right) - (N_2 d + \sum fX)^2\right)\left(\left(\sum f + N_2\right)\left(N_2 d^2 + \sum fY^2\right) - (N_2 d + \sum fY)^2\right)\right)}} \quad (9)$$

where:

X=A vector of attribute values (e.g., an array having values of 100, 17, 18, and 1) of the harmonized new entity/attribute record 1902'.

Y=A vector of attribute values (e.g., an array having values 20, 16, 1, 15) of the databased entity/attribute record 1904'.

f=A vector of inverse attribute frequency (IAF) values, the determination of which was described above with reference to FIG. 16B.

$N_2$=The number of filler attributes to be added (conceptually) to the entity/attribute records being correlated.

d=The value of the default vote.

The optimal value for $N_2$ depends on the particular application and can therefore be determined empirically. Typical values may be 100, 1000, or 10000. As expected, if $N_2$ is zero (0), the above equation reduces to a simple correlation equation. If the default value d is zero (0), the above equation can be reduced.

§3.3.3 Tuning (Amplifying) a Correlation Value

Although the present invention is useful for predicting an attribute of an entity, in one particular application, the present invention is used to suggest content (which is a type of attribute) which may be of interest to a user (which is a type of entity). In this context, the goal of the present invention is more to properly rank order content than to predict a user's rating of that content. The tuning aspect of the present invention employs a tuning parameter to "amplify" content likely to be of interest and to "suppress" content unlikely to be of interest. In the present invention, a tuned correlation value r' (or entity weight as shown in step 1810 of FIG. 18) is defined as follows:

$$r' = r^p \text{ if } r \geq 0$$

$$r' = -(-r)^p \text{ if } r < 0 \quad (10)$$

where p is tunable parameter.

The tunable parameter p is typically greater than 1. The optimal value for the tunable parameter p depends on the particular application and can therefore be determine empirically. A typical value for the tunable parameter p is 2.5.

§3.3.4 Comparative Analysis

An experiment was conducted to compare predictions (suggestions) made by in accordance with the present invention and those made in accordance with algorithms of the known GroupLens system. In the following experiment, the entities were Internet users (5000 (test set) uniformly, randomly selected users from 32711 (training set) uniformly, randomly selected users who visited the Internet site "www-.microsoft.com" within the seven (7) days from Feb. 26, 1997 to Mar. 24, 1997, inclusive), the attributes were Vroots (each "Vroot", or "Virtual Root" is a sub-area of the www-.microsoft.com website) of the web site visited, and the attribute values were 1 if the user visited only one page in a Vroot within a sample period and 2 if the user visited two or more pages within a Vroot within the sample period.

Suggestion accuracy was determined by: (i) going through the 5000 user/Vroot records and selecting one user at a time as a "new user"; (ii) randomly selecting one attribute to "hold back" from the selected new user; (iii) performing a collaborative filtering on the new user's other attributes to generate a set of recommendations; (iv) determining whether the attribute held back was on the list of recommendations; (v) estimating the probability that the new user would navigate far enough down through the suggested Vroot list to see the held-back attribute (where the probability was modeled as "half-life" decay with a 100% chance of seeing the first recommendation, 50% chance of seeing the $5^{th}$ recommendation, 25% change of seeing the $10_{th}$ recommendation, etc.); and (vi) averaging these probabilities over all 5000 users to determine an accuracy value.

The experiment was conducted without a popularity filtering process disclosed in U.S. patent application Ser. No. 08/807,566, filed on Feb. 28, 1997, and entitled "Methods and Apparatus for Retrieving and/or Processing Retrieved Information as a Function of a User's Estimated Knowledge", incorporated herein by reference. Popularity filtering basically performs post processing on the results of the present invention. The accuracies are normalized by dividing them by the accuracy of a "popularity list" (i.e., a list of all attributes ranked from most popular to least popular).

Without Popularity Filtering

| PROCESS | ACCURACY RELATIVE TO POPULARITY LIST |
|---|---|
| Correlation with Inverse Attribute Frequency, Attribute Expansion, Default Voting and Tuning (N2 = 10000, d = 0, p = 2.5) | 1.278 |
| Correlation with Attribute Expansion, Default Voting, and Tuning (N2 = 10000, d = 0, p = 2.5) | 1.249 |
| Similarity with Inverse Attribute Frequency | 1.240 |
| Correlation with Inverse Attribute Frequency, Attribute Expansion and Default Voting (N2 = 10000, d = 0, p = 1 | 1.222 |
| Similarity | 1.215 |
| Correlation with Attribute Expansion and Default Voting (N2 = 10000, d = 0, p = 1) | 1.205 |
| Popularity List | 1.000 |
| GroupLens | 0.053 |

As the above results show, when compared with the GroupLens process, the use of filler attributes and default votes substantially improves accuracy. This is apparently because the GroupLens process is not getting enough data (even with 5000 users) from the data set. Using the inverse attribute frequency and tuning aspects of the present invention, in addition to the use of filler or expansion attributes and default votes, further enhances accuracy.

§4 ARCHITECTURE OF NETWORK APPLICATION OF INVENTION

Figure 10:
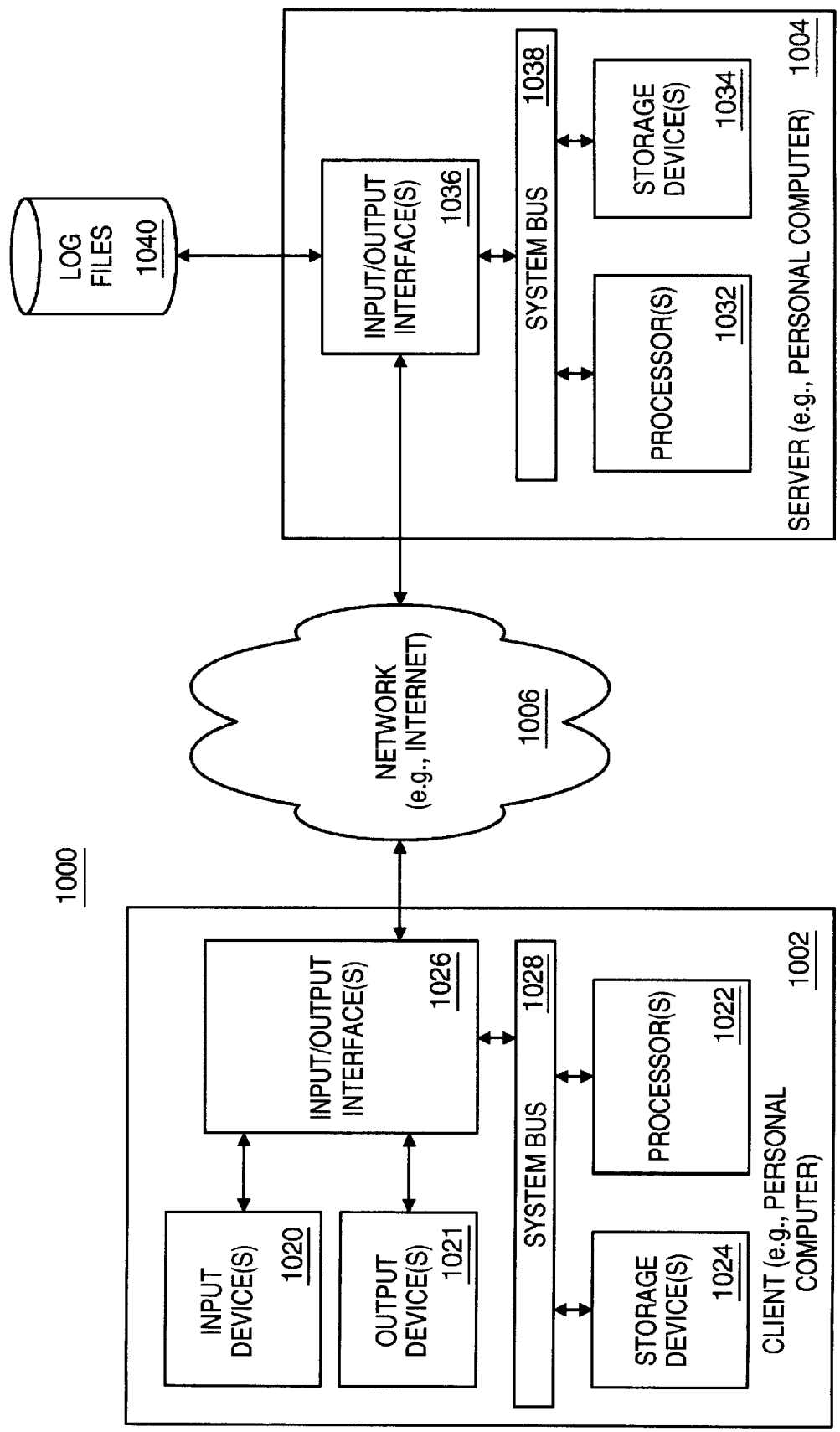
FIG. 10 is a high level block diagram of an a network environment in which the methods and apparatus of the present invention may operate.
Figure 11:
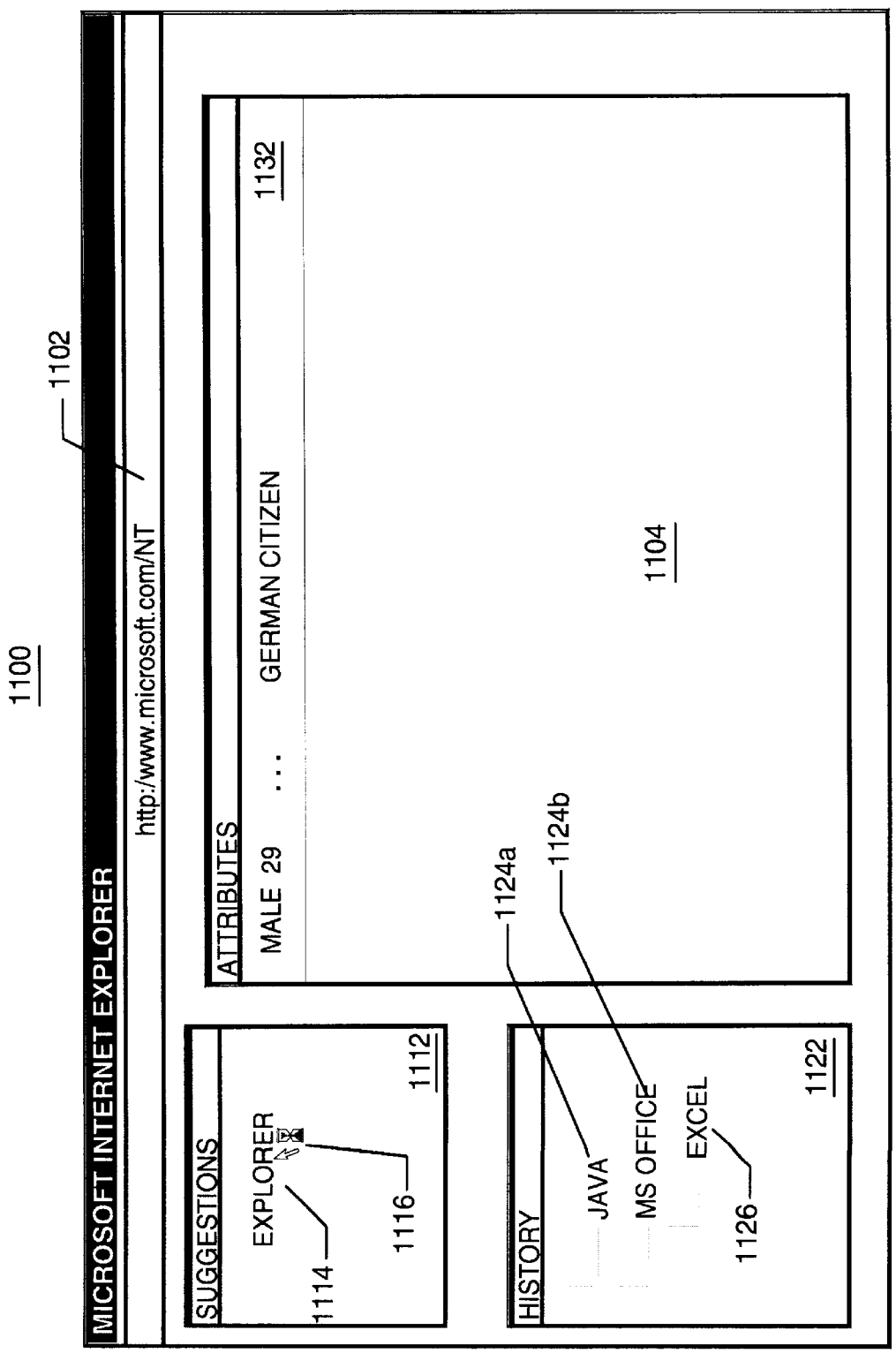
FIG. 11 illustrates an exemplary graphical user interface which may be used in the network environment of FIG. 10.

FIGS. 10 and 11

Figure 12:
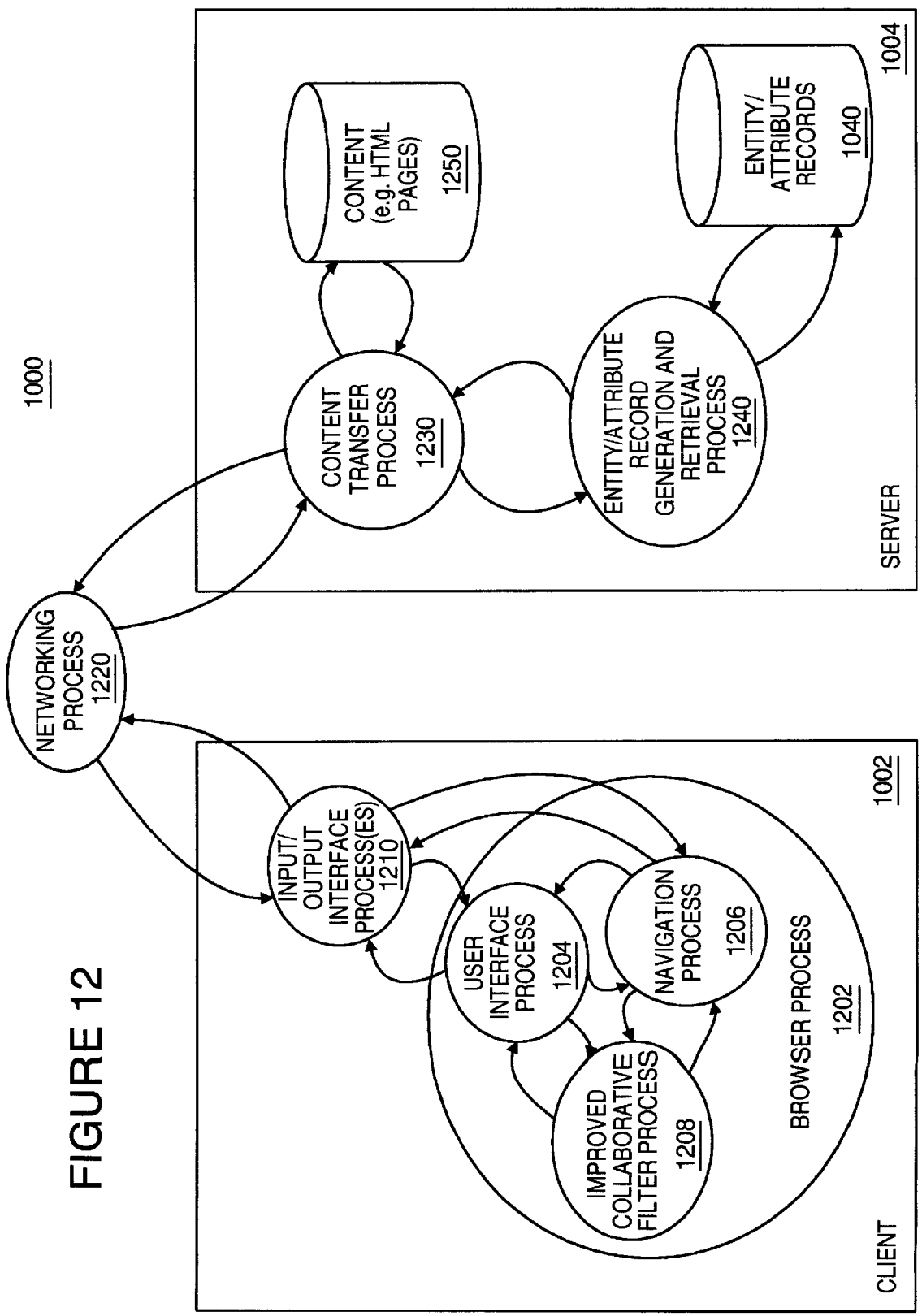
FIG. 12 is a process diagram which illustrates the operations of methods and apparatus of the present invention in the network environment of FIG. 10.
Figure 13A:
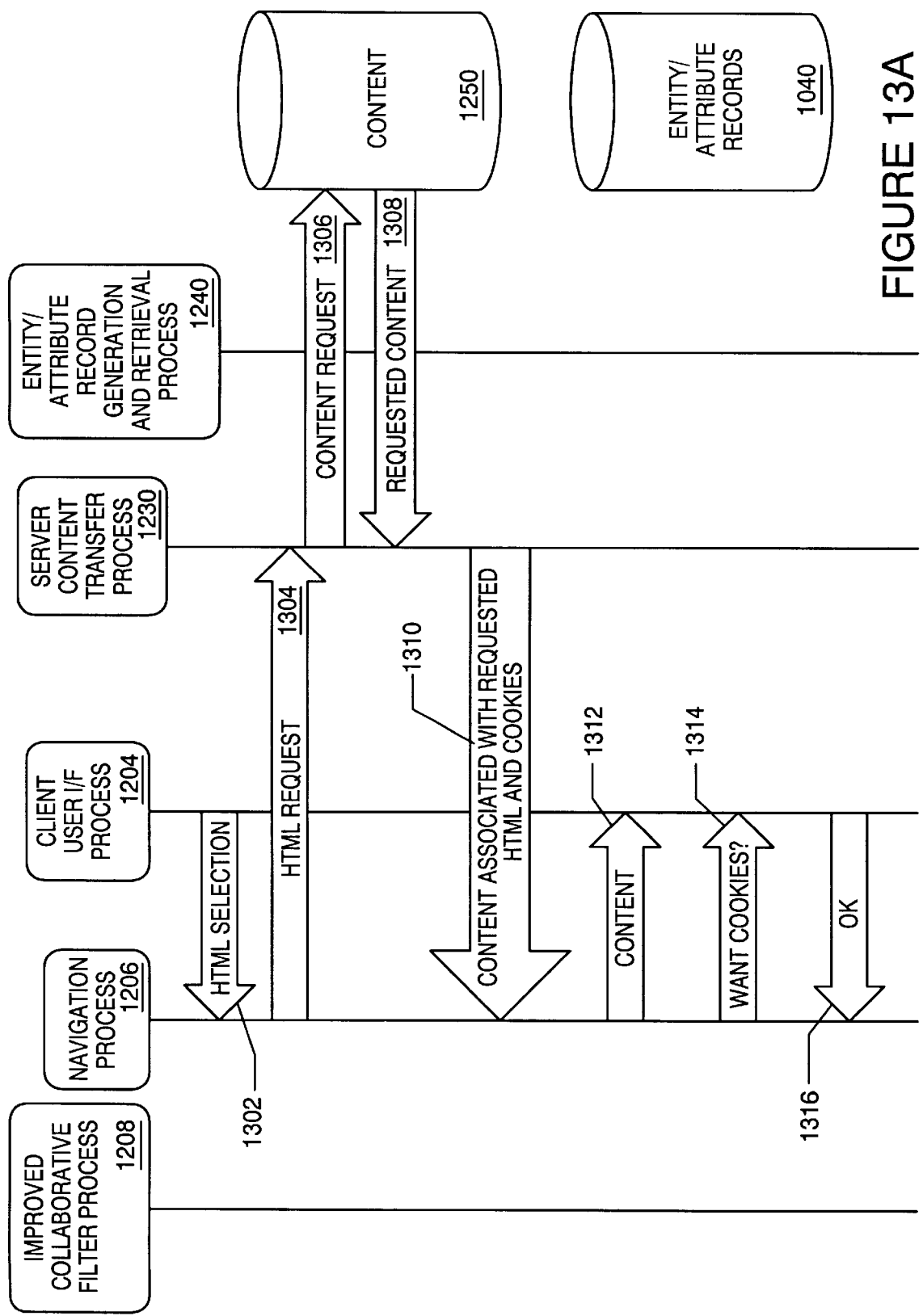
FIG. 13A is a data flow diagram which illustrates the initial provision of entity identification to a client on the Internet.
Figure 13B:
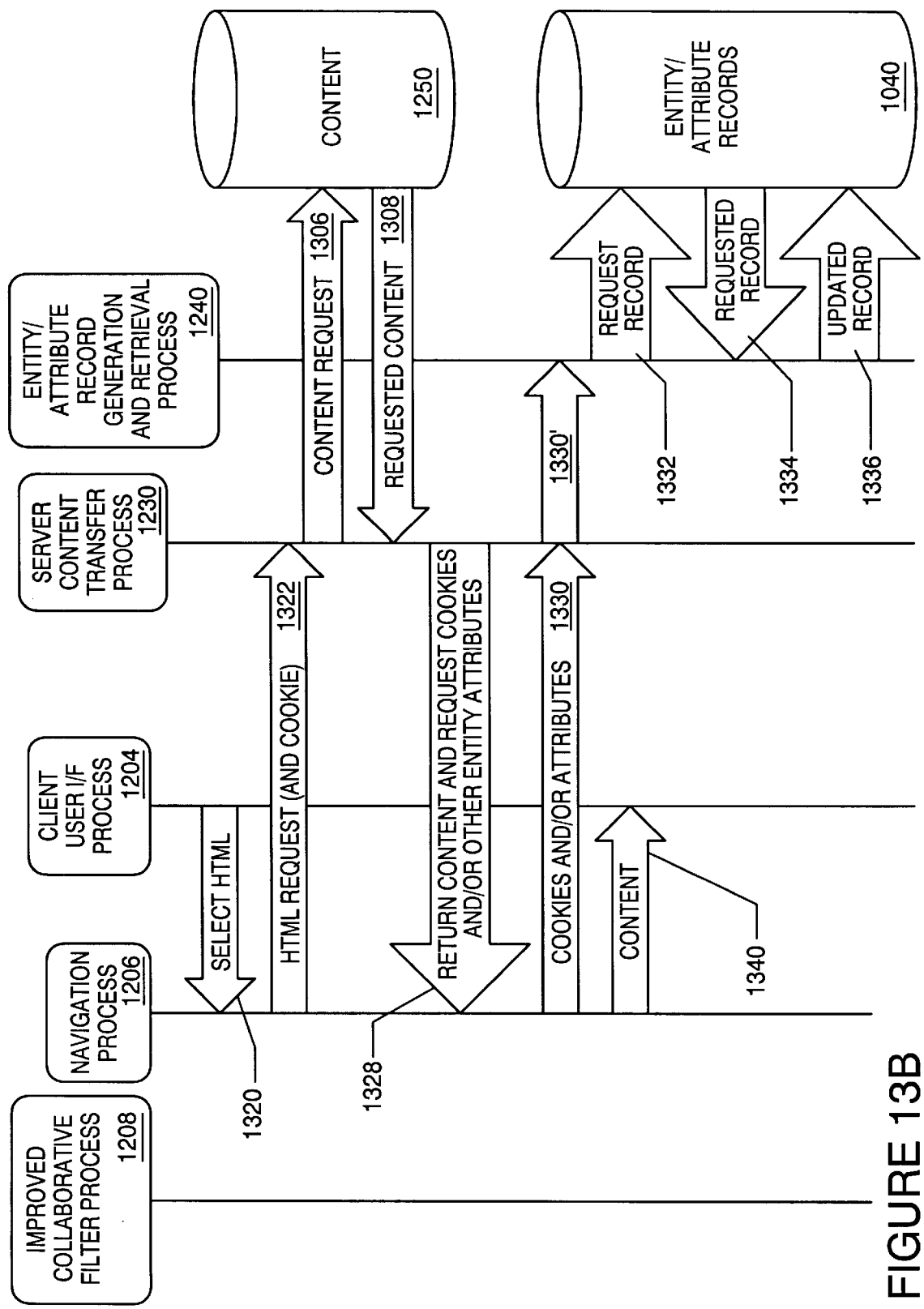
FIG. 13B is a data flow diagram which illustrates how a database of entity/attributes records is built by an Internet server.
Figure 13C:
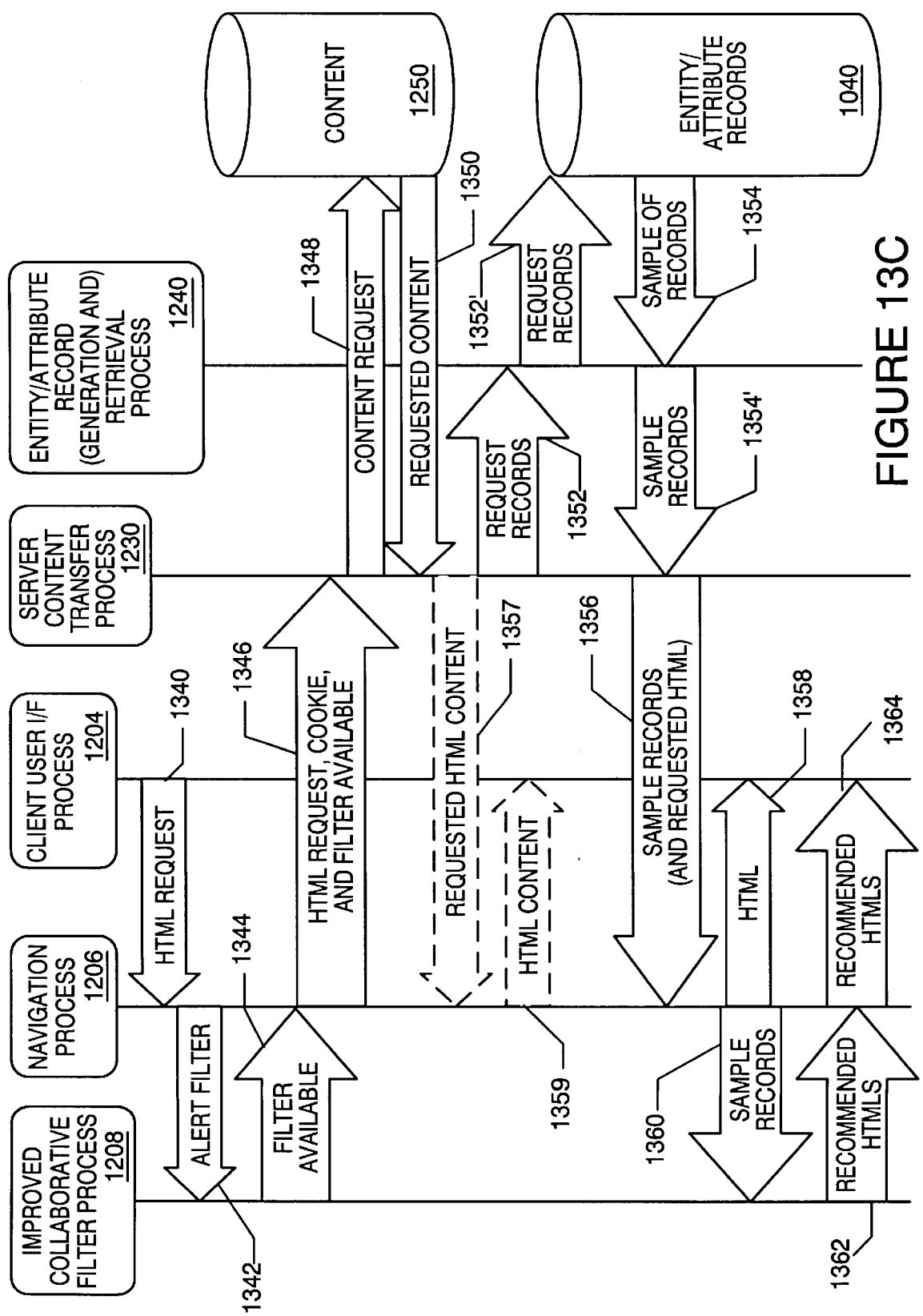
FIG. 13C is a data flow diagram which illustrates the operation of the present invention as implemented on the Internet.

As alluded to above, the present invention may be implemented in a network (e.g., the Internet) having a client (e.g., a personal computer with an Internet browser application such as Microsoft Explorer™) and a server (e.g., an Internet server). A high level example of an architecture for implementing the present invention in such an environment 1000 is illustrated in FIG. 10. An exemplary user interface 1100 for implementing the present invention on an Internet browser application is illustrated in FIG. 11. The processes for implementing the present invention on an Internet browser application are illustrated in FIG. 12. Finally, FIGS. 13A, 13B, and 13C, illustrate the data flow used to (i) provide a client with an entity identification means, (ii) build an entity/attribute database, and (iii) predict and present HTML pages, within a web site, which may be of interest to a user, respectively.

FIG. 10 is a high level block diagram of a network environment 1000 in which the methods and apparatus of the present invention may operate. The environment 1000 includes, inter alia, a client (e.g., a personal computer) 1002 which may communicate data via a network (e.g., the Internet) 1006, and a server (e.g., a personal computer) 1004 which may also communicate data via the network 1006.

The client 1002 may include processor(s) 1022, storage device(s) 1024, and input/output interface(s) 1026, which may share a system bus 1028. The storage device(s) 1024 may store program instructions for implementing at least a portion of the process of the present invention. At least a portion of the process of the present invention may be effected when the processor(s) 1022 executes the stored program instructions. The input/output interface(s) 1026 permit communication with the network 1006, for example via an ISDN terminal adapter. The input/output interface(s) 1026 further functions to condition inputs provided via an input device(s) 1020 (e.g., a keyboard, mouse, and/or other man-machine interface) and to condition outputs provided to an output device(s) 1021 (e.g., a video display, audio speakers, etc.).

Similarly, the server (e.g., a personal computer) 1004 may include a include processor(s) 1032, storage device(s) 1034, and input/output interface(s) 1036, which may share a system bus 1038. The storage device(s) 1034 may store program instructions for implementing at least a portion of the process of the present invention. At least a portion of the process of the present invention may be effected when the processor(s) 1032 executes the stored program instructions. The input/output interface(s) 1036 permits communication with the network 1006, for example via a modem bank. The input/output interface(s) 1036 (e.g., a Small Computer System Interface (or "SCSI") protocol unit) may also permit records, such as entity/attribute records, to be written to and read from a database stored on a storage device (e.g., a magnetic or optical disk) 1040.

The network 1006 may include, inter alia, bridges, routers, switching systems, etc., to forward data to an addressed (e.g., in accordance with TCP/IP (Transmission Control Protocol/Internet Protocol)) destination.

FIG. 12 is a process diagram which illustrates the operation of the methods and apparatus of the present invention in the network environment 1000 of FIG. 10. More specifically, the client 1002 may include a browser process (or more generally, a browser) 1202 which, in turn, includes a user interface process (or more generally, a user interface) 1204, a navigation process (or more generally, a navigator) 1206, and an improved collaborative filter process (or more generally, a collaborative filter) 1208. The user interface process 1204 may generate a graphical user interface which is presented to a user via the output device(s) 1021. The navigation process 1206 interacts with the user interface process 1204 to allow a user to access various content. The improved collaborative filter process 1208 determines where the user has been (e.g., content that the user has requested, downloaded, and/or rendered) from the navigation process 1206 and presents suggested content to the user via the user interface process 1204 (perhaps by way of the navigation process 1206). Each of these processes may be part of an Internet browser application stored in an area of the storage device(s) 1024 and carried out by the processor(s) 1022.

Referring to FIG. 11, the user interface process 1204 may be used to generate a graphical user interface 1100 to be displayed on a video display unit. As shown in FIG. 11, the graphical user interface 1100 may display the content of an HTML page in an area 1104. The graphical user interface 1100 may further include an address line 1102 which describes the location (e.g., "http:/www.microsoft.com/NT") of the HTML page being viewed in area 1104, a history display area 1122 and a suggestions display area 1112. More specifically, the history display area 1122 sets forth where the client entity 1002 has been (or what content the client entity 1002 has requested, downloaded, and/or rendered) within an Internet web site (or, alternatively, areas visited or content consumed in general). In this example, the client entity 1002 has been to a JAVA HTML page 1124a, an MS OFFICE HTML page 1124b, and an EXCEL HTML page 1126, which, as inferred by the indent, was accessed via the MS OFFICE HTML page 1124b. The suggestions display area 1112 lists, and/or provides hyper-text links to, HTML pages or content which the improved collaborative filter process 1208 predicts that the client 1002 entity may want to render (or consume). As one familiar with the Internet knows, a hyper-text link is special text (i) which is linked with an Internet address which corresponds to an HTML page or content associated with the hyper-text link and (ii) which, when activated (e.g., by a double mouse click), connects the client entity 1002 to the new Internet address. The pointer icon 1116 may be moved about the display 1100 via an input device (e.g., a mouse or trackball) and may be used, inter alia, to activate a hyper-text link.

Finally, in addition to, or instead of, the history screen area 1122, an attribute screen area 1132 may be provided in which implicitly determined or explicitly entered attributes of the client entity 1002 may be displayed, entered, and/or edited. In this instance, the attribute screen area 1132 notes that the entity (user) is a 29 year old, German male.

The input/output interface process(es) (or more generally, an input/output interface(s)) 1210 may include a stacked layer of communications protocols, layers of which may be carried out when the processor(s) 1022 executes program instructions which may be stored in an area of the storage device(s) 1024, and other layers of which may be carried out by the input/output interface(s) 1026.

The networking process (or more generally, a network) 1220 is carried out by routers, bridges, and/or switching systems in order to forward data to an addressed location in a way known to those skilled in the art. In this particular application, the networking process 1220 can, inter alia, transfer requests for content from the client 1002 to the server 1004, and transfer the requested content from the server 1004 back to the requesting client 1002. The networking process 1220 can also forward other types of data, which will be discussed in more detail below with reference to FIGS. 13A through 13C, to an addressed location.

The server 1004 may include a content transfer process (or more generally, a content transfer facility) 1230 and an entity/attribute record generation and retrieval process (or more generally, an entity/attribute record generator and retriever) 1240. The content transfer process 1230 operates to (i) accept incoming requests, (ii) translate, if necessary, the incoming request to a query of the content database 1250, (iii) receive the requested content, and (iv) transfer the requested content back to the requesting entity. As will be described in more detail below, the content transfer process 1230 also conveys information of the requesting entity and the requested content to the entity/attribute record generation and retrieval process 1240.

The entity/attribute record generation and retrieval process 1240 operates to (i) accept entity and content information, (ii) create new, or update existing, entity/attribute records based on the accepted information, (iii) store entity/attribute records to the database 1040, and (iv) retrieve entity/attribute records from the database 1040. The entity/attribute record generation and retrieval process 1240 may also operate to perform maintenance operations on the database 1040, such as purging stale records, reordering records, etc.

Both the content transfer process 1230 and the entity/attribute record generation and retrieval process 1240 may be stored as program instructions in an area of the storage device(s) 1034 and carried out by the processor(s) 1032.

A few preliminary operations should be performed before the improved collaborative filter process 1208 may be carried out in the context of the environment 1000 of FIG. 10. More specifically, the client 1002 (and/or the server 1004) should first have means for identifying the client 1002 as a particular entity. FIG. 13A is a data flow diagram which illustrates the initial provision of entity identification to a client on the Internet. Second, the entity/attribute database should be generated. FIG. 13B is a data flow diagram which illustrates how a database of entity/attributes records is built by an Internet server. The way in which the entity/attribute database is generated is not crucial for the operation of the improved collaborative filter process 1208; it may be compiled off-site, compiled by a third party, purchased or rented, compiled based on survey data, etc. Once these two preliminary operations are performed, the improved collaborative filter process 1208 may be executed. FIG. 13C is a data flow diagram which illustrates the operation of the present invention as implemented on the Internet. In FIGS. 13A through 13C, the input/output interface process(es) 1210 and the networking process 1220 are not shown because the data flow through these processes may occur in a conventional manner (e.g., via standard communications protocols), which is understood by those skilled in the art.

Referring now to FIG. 13A which, to reiterate, is a data flow diagram which illustrates the initial provision of entity identification to a client 1002 on the Internet, a user first selects a specific HTML page or content via the client user interface process 1204. Referring back to FIG. 11, this selection may be made by typing an Internet address on the address line 1102 or by activating (e.g., by double clicking) a hyper-text link. This selection 1302 is relayed to the navigation process 1206 which, in response, forms an HTML request 1304 and transmits this request to the server content transfer process 1230. The content transfer process 1230 formulates a content request 1306 to the database of stored content 1250 in response to the HTML request 1304. The requested content 1308 is then returned to the server content transfer process 1230.

The server content transfer process 1230 then adds a data structure to the content to permit the server 1004 to later recognize (but not necessarily identify) the client 1002. More specifically, the data structure permits the server 1004 to distinguish different clients 1002. As is known to those familiar with the Internet, this data structure may be a "cookie." A cookie includes a name value and may further include an expiration date value, a domain value, and a path value. Thus, the content associated with the requested HTML page and the cookie 1310 are transferred from the server content transfer process 1230 to the navigation process 1206 (or to the browser process 1202 in general).

The navigation process (or browser process 1202 in general) provides the content 1312 to the user interface process 1204 and may present a query 1314 to the user interface process 1204 to determine whether or not the client 1002 wants to save the cookie. If the browser process 1202 already includes a default value or setting which automatically decides the fate of the cookie, the message 1314 is not generated. Assuming that the user wants to save the cookie (i.e., whether or not the cookie is to be saved), the user interface process 1204 so informs the navigation process 1206 (or the browser process 1202 in general) with message 1316. The cookie is then saved in an appropriate area of the storage device(s) 1024 of the client 1002.

Referring now to FIG. 13B which, to reiterate, is a data flow diagram which illustrates how a database of entity/attributes records may be built by an Internet server 1004, a user first selects a specific HTML page or content at the client user interface process 1204. Again, this selection may be made by typing an Internet address on the address line 1102 or by activating (e.g., by double clicking) a hyper-text link. This selection 1320 is relayed to the navigation process 1206 which, in response, forms an HTML request 1322 and transmits this request to the server content transfer process 1230. The content transfer process 1230 formulates a content request 1324 to the database of stored content 1250 in response to the HTML request 1322. The requested content 1326 is then returned to the server content transfer process 1230.

The server content transfer process 1230 then assembles the requested content, together with a cookie and/or a request for cookies and/or a request for client attributes, and returns the resulting data 1328 to the navigation process 1206 (or to the browser process 1202). The content 1340 may then be provided to the user interface process 1204 for presentation to the user via an output device 1021. Before, after, or concurrently with the transfer of the content, the navigation process 1206 (or the browser process 1202 in general) may return its appropriate cookie and/or attributes in data transfer 1330 to the server content transfer process. Note that the browser process 1202 of the client 1002 may have included an appropriate cookie in the original HTML request 1322. In a dumb mode, the client 1002 can include all of its cookies in the HTML request 1322. If, however, the cookies stored by the client 1002 include domain and path values, only the cookie corresponding to the HTML request are provided. If the cookie or cookies are provided with the original HTML request 1322, the transfer of cookies and/or entity attributes in data transfers 1328 and 1330 are either (a) not needed or (b) may be limited to requesting and returning client attributes.

In any event, the server content transfer process 1230 provides the cookie(s) and/or client attributes 1330' to the entity/attribute record generation and retrieval process 1240. Recall from FIG. 1A that a record 102 may be identified by an entity 106 and has a number of attributes 104. The entity/attribute record generation and retrieval process 1240 will either (a) update an existing record 102 or (b) create a new record 102, depending upon whether or not a record corresponding to the entity (as identified by the cookie) exists. More specifically, the entity/attribute record generation and retrieval process 1240 dispatches a record request 1332 to the entity/attribute record database 1040. Alternatively, the record request 1332 may be dispatched to an entity table to see if the entity 106 exists within the database 1040. If a record 102 having an entity value 106 identified by the cookie exists, the requested record 102 is returned in data transfer 1334. The entity/attribute record generation and retrieval process 1240 then updates the attributes of the record 102, if necessary, and returns the updated record 102' to the database 1040 in data transfer 1336. For example, referring to the database of FIG. 1B, if the client 1002, which was identified as user$_2$ 156b by its cookie, visited the e-mail HTML page 154b, the second attribute 154b of the record 152b would be updated to reflect this visit (or content consumption). Otherwise, the entity/attribute record generation and retrieval process 1240 will create a new record for the new client entity 1002.

Now that the two preliminary operations have been performed—namely (i) the client has means (e.g., stored cookie) for identifying it as a particular entity, and (ii) the entity/attribute database has been generated—the environment 1000 in which the present invention is—employed, may use the present invention for collaborative filtering. FIG. 13C is a data flow diagram which illustrates the operation of the present invention as implemented on the Internet. First, a user selects a specific HTML page or content at the client user interface process 1204. Again, this selection may be made by typing an Internet address on the address line 1102 or by activating (e.g., by double clicking) a hyper-text link. This selection 1340 is relayed to the navigation process 1206. In response, the navigation process 1206 transmits an alert message 1342 to the improved collaborative filter process 1208 to determine whether the process is available. Assuming that the browser has the improved collaborative filter process 1208, a filter available message 1344 is returned to the navigation process 1206. Alternatively, a setting flag may be used to determine whether or not the browser process 1202 includes the improved collaborative filter process 1208.

In any event, if the improved collaborative filter process 1208 is available, the navigation process 1206 assembles a message 1346 including a HTML request and a flag or message indicating that the improved collaborative filter process 1208 is available. Recall from FIG. 13B that this message 1346 may include a cookie. The navigation process 1206 addresses the message 1346 to the server content transfer process 1230. The content transfer process 1230 formulates a content request 1348 to the database of stored content 1250 in response to the HTML request 1346. The requested content 1350 is then returned to the server content transfer process 1230. The server content transfer process 1230 may then transfer the requested HTML content to the navigation process 1206 in data transfer 1357. If the transfer of the HTML content occurs at this time, it will be sent from the navigation process 1206 to the client user interface process 1204 in data transfer 1359. Otherwise, as discussed below, the requested HTML content will be returned to the navigation process 1206 later.

Before, after, or concurrently with the content request 1348, the server content transfer process 1230, recognizing that the client has an improved collaborative filter available, sends a request 1352 for records 102 to the entity/attribute record (generation and) retrieval process 1240. As alluded to above, if the entity/attribute database 1040 is generated outside of the system 1000, the process 1240 will obviously not need to generate the records 102; although it may be used to update records 102. In any event, the entity/attribute record (generation and) retrieval process 1240 sends the request 1352' for records 102 to the entity/attribute database 1040. In response, all of the records or a sample of the records 1354 are sent back to the entity/attribute record (generation and) retrieval process 1240. This information 1354 is then forwarded to the server content transfer process 1230 in data transfer 1354'. To reiterate, in some instances, only a sample of all of the records are needed. In an application similar to the one illustrated in FIG. 1B in which the entities are computers and the attributes are HTML pages of an Internet web site, a one (1) megabyte file with 15,000 entities 156 (or 15,000 records 152) was considered an adequate sample size.

The server content transfer process 1230 returns the sample records (and the requested HTML content if not returned earlier in data transfer 1357) to the navigation process 1206 of the server 1002 in data transfer 1356. Naturally, the server content transfer process 1230 may return the HTML content and the sample records to the navigation process 1206 of the server 1002 in any temporal order. For example, the HTML content may be downloaded first (see, e.g., transfer 1357) so that the user of the client 1002 will quickly see the requested content (e.g., in display area 1104). The download of the sample records and subsequent processing, discussed below, may occur while the user of the client 1002 is viewing the requested content. In any event, if the navigation process 1206 has not already provided the HTML content to the client user interface process 1024, it does so with data transfer 1358.

The navigation process 1206 will also provide the sample records to the improved collaborative filter process in data transfer 1360. These sample records are processed, as discussed above with reference to FIG. 3 or FIG. 15 and predictions (in this case, HTML content which the user of the client 1002 is likely to want) are made by the improved collaborative filter process 1208 and provided to the navigation process 1206 in data transfer 1362. The navigation process 1206 may forward these predictions (e.g., recommended HTMLs) to the client user interface process 1204 in data transfer 1364. The client user interface process 1204 may bring these suggested HTMLs to the user's attention, for example, in the display portion 1112 of the graphical user interface 1100 of FIG. 11.

Naturally, referring back to FIG. 2, the improved collaborative filter engine (or process) 202 may be located anywhere within the network 1000, not necessarily at the client 1002. Similarly, the entity/attribute data record retriever 206 and database of entity/attribute data records 208 may be located elsewhere in the network 1000, not necessarily at the server 1004. Basically, these elements should be located to optimize the underlying application. Similarly, the network need not be the Internet, but rather, may be an Intranet or another network configuration. Indeed, as should be apparent from FIG. 2, the present invention may be employed at a single location, in a non-distributed manner. Various modifications of the apparatus and methods of the present invention, as well as environments in which the present invention may operate will be apparent to those skilled in the art.

What is claimed is:

1. A method for operating a machine to generate a determination of a degree to which (i) a new entity having at least one attribute with an associated attribute value, and (ii) one entity selected from a group of entities, each entity of the group of entities having at least one attribute with an associated attribute value, match, the method comprising steps of:

a) accepting, by the machine, information relating to the new entity, the entities of the group of entities, and the attributes and attribute values of the new entity and the entities of the group of entities;

b) for each of the at least one attribute of each entity of the group of entities, adjusting, with the machine, the attribute value associated therewith based on a frequency of the at least one attribute throughout the entities of the group of entities to thereby generate an adjusted attribute value; and c) determining, with the machine, a degree to which (i) the new entity and (ii) the one entity match based on the attribute value associated with each of the at least one attribute of the new entity and the adjusted attribute value of each of the at least one attribute of the one entity.

2. The method of claim 1 wherein the step of adjusting the attribute value associated with each of the at least one attribute of each of the entities of the group of entities includes sub-steps of:

i) for each of the at least one attribute, over all entities of the group of entities, determining, with the machine, a number of times an attribute value exists for the at least one attribute to generate an attribute frequency value; and ii) for each entity of the group of entities and for each of the at least one attribute, adjusting, with the machine, the attribute value of the at least one attribute such that the adjusted attribute value decreases as the attribute frequency value increases.

3. The method of claim 2 wherein the attribute value is divided by the attribute frequency value to form the adjusted attribute value.

4. The method of claim 2 wherein the adjusted attribute value is an inverse function of the attribute frequency value.

5. The method of claim 1 wherein the step of adjusting, for each of the at least one attribute of each entity of the group of entities, the attribute value associated therewith includes sub-steps of:

i) for each of the at least one attribute, over all entities of the group of entities, determining, with the machine, the number of times an attribute value of the at least one attribute belongs to a predetermined set of values to generate an attribute frequency value; and ii) for each entity of the group of entities and for each of the at least one attribute, adjusting, with the machine, the attribute value of the at least one attribute such that the adjusted attribute value decreases as the attribute frequency value increases, wherein the at least one attribute is a value attribute.

6. The method of claim 1 wherein the step of adjusting, for each of the at least one attribute of each entity of the group of entities, the attribute value associated therewith includes sub-steps of:

i) over each of the at least one attribute, over all entities of the group of entities, determining, with the machine, a running sum of an attribute value of the at least one attribute to generate an attribute frequency value; and ii) for each entity of the group of entities and for each of the at least one attribute, adjusting, with the machine, the attribute value of the at least one attribute such that the adjusted attribute frequency value decreases as the attribute frequency value increases, wherein the at least one attribute is a value attribute.

7. The method of claim 1 wherein the step of determining a degree to which (i) the new entity and (ii) the one entity match, includes a sub-step of:

i) for each of the at least one attribute, if the attribute value of the at least one attribute of the new entity matches the attribute value of the at least one attribute of the one entity, then adding, with the machine, the adjusted attribute value of the at least one attribute of the one entity to a running sum, wherein the degree to which (i) the new entity and (ii) the one entity match is based on a final value of the running sum over each of the at least one attribute.

8. The method of claim 1 wherein the step of determining a degree to which the new entity and the one entity match includes a step of determining a similarity between the new entity and the one entity based on the attribute value associated with each of the at least one attribute of the new entity and the adjusted attribute value of each of the at least one attribute of the one entity.

9. The method of claim 8 wherein the step of determining a similarity between the new entity and the one entity includes sub-steps of:

i) for each of the at least one attribute of the new entity, determining, with the machine, a normalized attribute value associated with the at least one attribute value; and ii) determining, with the machine, a similarity between the new entity and the one entity based on each of the at least one normalized attribute value associated with each of the at least one attribute of the new entity and the each of the at least one adjusted attribute value of each of the at least one attribute of the one entity.

10. The method of claim 9 wherein the step of, for each of the at least one attribute of the new entity, determining a normalized attribute value associated with the at least one attribute value includes sub-steps of:
   i) for each of the at least one attribute of the new entity, determining, with the machine, an adjusted attribute value;
   ii) determining, with the machine, a square root of a sum of squares of the at least one adjusted attribute value associated with the at least one attribute of the new entity; and
   iii) for each of the at least one attribute of the new entity, dividing, with the machine, an associated adjusted attribute value by the square root.

11. The method of claim 8 wherein the step of adjusting, for each of the at least one attribute of each entity of the group of entities, the attribute value associated therewith includes sub-steps of:
   i) for each of the at least one attribute, over all entities of the group of entities, determining, with the machine, a number of times an attribute value exists for the at least one attribute to generate an attribute frequency value; and
   ii) adjusting, with the machine, each of the at least one attribute such that the adjusted attribute decreases as the attribute frequency value increases.

12. The method of claim 11 wherein the sub-step of adjusting each of the at least one attribute includes further steps of:
   iii) determining, with the machine, a total number of entities of the group of entities;
   iv) for each of the at least one attribute, dividing, with the machine, the total number of entities by the attribute frequency value to form a division value; and
   v) for each of the at least one attribute, adjusting, with the machine, the attribute such that the adjusted attribute is a function of the division value.

13. The method of claim 12 wherein the function is a logarithmic function.

14. The method of claim 8 wherein the step of adjusting, for each of the at least one attribute of each entity of the group of entities, the attribute value associated therewith includes sub-steps of:
   i) for each of the at least one attribute, over all entities of the group of entities, determining, with the machine, a number of times an attribute value of the at least one attribute belongs to a predetermined set of values to generate an attribute frequency value; and
   ii) adjusting, with the machine, each of the at least one attribute such that the adjusted attribute decreases as the attribute frequency value increases,
   wherein each of the at least one attribute is a value attribute.

15. The method of claim 8 wherein the step of adjusting, for each of the at least one attribute of each entity of the group of entities, the attribute value associated therewith includes sub-steps of:
   i) over each of the at least one attribute, over all entities of the group of entities, determining, with the machine, a running sum of an attribute value of the at least one attribute to generate an attribute frequency value; and
   ii) adjusting, with the machine, each of the at least one attribute such that the adjusted attribute decreases as the attribute frequency value increases,
   wherein each of the at least one attribute is a value attribute.

16. The method of claim 1 wherein the step of determining a degree to which the new and one entities match includes a step of determining a correlation between the new and one entities based on the attribute value associated with each of the at least one attribute of the new entity and the adjusted attribute value of each of the at least one attribute of the one entity.

17. A method for operating a machine to generate a prediction of an attribute value of at least one attribute of a new entity based on at least one attribute value of at least one attribute of a group of entities, the method comprising steps of:
   a) accepting, by the machine, information relating to the new entity, the group of entities and the attributes and attribute values of the new entity and the group of entities;
   b) for each of the at least one attribute of each entity of the group of entities, adjusting, with the machine, the attribute value associated therewith based on a frequency of the at least one attribute over all entities of the group of entities, to generate an adjusted attribute value;
   c) for each entity of the group of entities, determining, with the machine, a degree to which (i) the entity and (ii) the new entity match based on the adjusted attribute value of each of the at least one attribute of the entity and based on the attribute value associated with each of the at least one attribute of the new entity; and
   d) predicting, with the machine, an attribute value of at least one of the at least one attribute of the new entity based on the degree to which (i) the entities of the group of entities and (ii) the new entity match and based on the at least one adjusted attribute value associated with the at least one attribute of the entities of the group of entities.

18. The method of claim 17 wherein the step of adjusting the attribute value associated with each of the at least one attribute of each of the entities of the group of entities includes sub-steps of:
   i) for each of the at least one attribute, over all entities of the group of entities, determining, with the machine, a number of times an attribute value exists for the at least one attribute to generate an attribute frequency value; and
   ii) for each entity of the group of entities and for each of the at least one attribute, adjusting, with the machine, the attribute value of the at least one attribute such that the adjusted attribute value decreases as the attribute frequency value increases.

19. The method of claim 18 wherein the attribute value is divided by the attribute frequency value to form the adjusted attribute value.

20. The method of claim 18 wherein the adjusted attribute value is an inverse function of the attribute frequency value.

21. The method of claim 17 wherein the step of adjusting, for each of the at least one attribute of each entity of the group of entities, the attribute value associated therewith includes sub-steps of:
   i) for each of the at least one attribute, over all entities of the group of entities, determining, with the machine, the number of times an attribute value of the at least one attribute belongs to a predetermined set of values to generate an attribute frequency value; and ii) for each entity of the group of entities and for each of the at least one attribute, adjusting, with the machine, the attribute value of the at least one attribute such that the adjusted attributed value decreases as the attribute frequency value increases, wherein the at least one attribute is a value attribute.

22. The method of claim 17 wherein the step of adjusting, for each of the at least one attribute of each entity of the group of entities, the attribute value associated therewith includes sub-steps of:

i) over each of the at least one attribute, over all entities of the group of entities, determining, with the machine, a running sum of an attribute value of the at least one attribute to generate an attribute frequency value; and ii) for each entity of the group of entities and for each of the at least one attribute, adjusting, with the machine, the attribute value of the at least one attribute such that the adjusted attribute value decreases as the attribute frequency value increases, wherein the at least one attribute is a value attribute.

23. The method of claim 17 wherein the step of determining a degree to which (i) the new entity and (ii) the one entity match includes a sub-step of:

i) for each of the at least one attribute, if the attribute value of the at least one attribute of the new entity matches the attribute value of the at least one attribute of the one entity, then adding, with the machine, the adjusted attribute value of the at least one attribute of the one entity to a running sum, wherein the degree to which (i) the new entity and (ii) the one entity match is based on a final value of the running sum over each of the at least one attributes.

24. The method of claim 17 wherein the step of predicting an attribute value of at least one of the at least one attribute of the new entity includes a sub-step of:

i) over all entities of the group of entities, summing, with the machine, a product of the degree to which (i) the new entity and (ii) the entity match and the adjusted attribute value of the entity to generate a predicted attribute value.

25. The method of claim 17 wherein the predicted attribute value of the at least one of the at least one attribute of the new entity represents a prediction of a degree to which the new entity will want to render particular content.

26. A method for operating a machine to generate a prediction of an attribute value of at least one attribute of a new entity based on at least one attribute value of at least one attribute of a group of entities, the method comprising steps of:

a) accepting, by the machine, information relating to the new entity, the group of entities, and the attributes and attribute values of the new entity and the group of entities;

b) for each of the at least one attribute of each entity of the group of entities, adjusting, with the machine, the attribute value associated therewith based on a frequency of the at least one attribute throughout the entities of the group of entities to thereby generate an adjusted attribute value;

c) for each of the at least one attribute of the new entity, determining, with the machine, a normalized attribute value associated with the at least one attribute value;

d) determining, with the machine, a similarity between the new entity and the one entity based on each of the at least one normalized attribute value associated with each of the at least one attribute of the new entity and each of the at least one adjusted attribute value of the at least one attribute of the one entity;

e) determining, with the machine, a case weight for each entity of the group of entities based on the similarity and a square root of a sum, over all of the at least one attribute, of the adjusted attribute value squared;

f) summing, with the machine, the case weights of each entity of the group of entities to generate a total case weight;

g) for each of the at least one attribute of each of the entities of the group of entities, determining, with the machine, a new attribute value based on the attribute value of the at least one attribute of the entity and the case weight of the entity;

h) for each of the at least one attribute, summing, with the machine, over all of the entities of the group of entities, the new attribute values to generate a new attribute value sum; and i) predicting, with the machine, an attribute value of at least one of the at least one attribute of the new entity based on the new attribute value sum and the total case weight.

27. The method of claim 26 wherein the step of adjusting, for each of the at least one attribute of each entity of the group of entities, the attribute value associated therewith includes sub-steps of:

i) for each of the at least one attribute, over all entities of the group of entities, determining, with the machine, a number of times an attribute value exists for the at least one attribute to generate an attribute frequency value; and ii) adjusting, with the machine, each of the at least one attribute, such that the adjusted attribute decreases as the attribute frequency value increases.

28. The method of claim 27 wherein the sub-step of adjusting each of the at least one attribute includes further steps of:

iii) determining, with the machine, a total number of entities of the group of entities;

iv) for each of the at least one attribute, dividing, with the machine, the total number of entities by the attribute frequency value to form a division value; and v) for each of the at least one attribute, adjusting, with the machine, the attribute such that the adjusted attribute is a function of the division value.

29. The method of claim 28 wherein the function is a logarithmic function.

30. The method of claim 28 wherein the step of adjusting, for each of the at least one attribute of each entity of the group of entities, the attribute value associated therewith includes sub-steps of:

i) for each of the at least one attribute, over all entities of the group of entities, determining, with the machine, a number of times an attribute value of the at least one attribute belongs to a predetermined set of values to generate an attribute frequency value; and ii) adjusting, with the machine, each of the at least one attribute such that the adjusted attribute decreases as the attribute frequency value increases, wherein each of the at least one attribute is a value attribute.

31. The method of claim 28 wherein the step of adjusting, for each of the at least one attribute of each entity of the group of entities, the attribute value associated therewith includes sub-steps of:

i) over each of the at least one attribute, over all entities of the group of entities, determining, with the machine, a running sum of an attribute value of the at least one attribute to generate an attribute frequency value; and ii) adjusting, with the machine, each of the at least one attribute such that the adjusted attribute decreases as the attribute frequency value increases, wherein each of the at least one attribute is a value attribute.

32. The method of claim 28 wherein the step of, for each of the at least one attribute of the new entity, determining a normalized attribute value associated with the at least one attribute value includes sub-steps of:

i) for each of the at least one attribute of the new entity, determining, with the machine, an adjusted attribute value;

ii) determining, with the machine, a square root of a sum of squares of the at least one adjusted attribute value associated with the at least one attribute of the new entity; and iii) for each of the at least one attribute of the new entity, dividing, with the machine, an associated adjusted attribute value by the square root.

33. The method of claim 28 wherein the step of determining, for each of the at least one attribute of the entities of the group of entities, a new attribute value includes a sub-step of:

i) multiplying, with the machine, the attribute value of the at least one attribute and the case weight of the entity.

34. The method of claim 28 wherein the step of predicting the attribute value of at least one of the at least one attribute of the new entity includes a sub-step of:

i) dividing, with the machine, the new attribute value sum by the total case weight.

35. An apparatus for predicting, based on records of information relating attribute values to attributes of known entities, a value of at least one attribute of a new entity, the new entity having at least one other attribute having an associated attribute value, the apparatus comprising:

a) a retriever for retrieving the records; and b) a collaborative filter engine for predicting the value of the at least one attribute of the new entity based on attribute values of attributes of the known entities in the records and the attribute value associated with the at least one other attribute of the new entity, wherein the prediction of the collaborative filter engine considers an inverse of a frequency of the attribute in the records of the known entities.

36. The apparatus of claim 35 wherein the collaborative filter engine:

a) for each of the attribute values of the attributes of the known entities, adjusts the attribute value based on the frequency of the attribute, to generate adjusted attribute values;

b) for each entity of the known entities, determines a degree to which (i) the entity and (ii) the new entity match based on the adjusted attribute values of the entity and the attribute value associated with the at least one other attribute of the new entity; and c) predicts the attribute value of the at least one attribute of the new entity based on the degree to which (i) the known entities and (ii) the new entity match and based on the adjusted attribute values of the attributes of the known entities.

37. The apparatus of claim 36 wherein the collaborative filter engine adjusts the attribute values associated with the at least one attribute of each of the known entities by:

i) for each of the at least one attribute, over all of the known entities, determining a number of times an attribute value exists for the at least one attribute to generate an attribute frequency value; and ii) for each of the known entities and for each of the at least one attribute, adjusting the attribute value of the at least one attribute such that the adjusted attribute value decreases as the attribute frequency value increases.

38. The apparatus of claim 37 wherein the attribute value is divided by the attribute frequency value to form the adjusted attribute value.

39. The apparatus of claim 37 wherein the adjusted attribute value is an inverse function of the attribute frequency value.

40. The apparatus of claim 36 wherein the collaborative filter engine adjusts, for each of the at least one attribute of each of the known entities, the attribute value associated therewith by:

i) for each of the at least one attribute, over all of the known entities, determining the number of times an attribute value of the at least one attribute belongs to a predetermined set of values to generate an attribute frequency value; and ii) for each of the known entities and for each of the at least one attribute, adjusting the attribute value of the at least one attribute such that the adjusted attribute value decreases as the attribute frequency value increases, wherein the at least one attribute is a value attribute.

41. The apparatus of claim 36 wherein the collaborative filter engine adjusts, for each of the at least one attribute of each of the known entities, the attribute value associated therewith by:

i) over each of the at least one attribute, over all of the known entities, determining a running sum of an attribute value of the at least one attribute to generate an attribute frequency value; and ii) for each of the known entities and for each of the at least one attribute, adjusting the attribute value of the at least one attribute such that the adjusted attribute value decreases as the attribute frequency value increases, wherein the at least one attribute is a value attribute.

42. The apparatus of claim 36 wherein the collaborative filter engine determines a degree to which (i) the new entity and (ii) the one entity match by:

i) for each of the at least one attribute, if the attribute value of the at least one attribute of the new entity matches the attribute value of the at least one attribute of the one entity, then adding the adjusted attribute value of the at least one attribute of the one entity to a running sum, wherein the degree to which (i) the new entity and (ii) the one entity match is based on a final value of the running sum over each of the at least one attributes.

43. The apparatus of claim 36 wherein the collaborative filter engine predicts an attribute value of at least one of the at least one attribute of the new entity by:

i) over all of the known entities, summing a product of the degree to which (i) the new entity and (ii) the entity match and the adjusted attribute value of the entity to generate a predicted attribute value.

44. The apparatus of claim 36 wherein the predicted attribute value of the at least one of the at least one attribute of the new entity represents a prediction of a degree to which the new entity will want to consume particular content.

45. The apparatus of claim 35 wherein the collaborative filter engine (a) adjusts, for each of the at least one attribute of each of the known entities, the attribute value associated therewith based on the frequency of the at least one attribute throughout the known entities to thereby generate an adjusted attribute value; (b) for each of the at least one attribute of the new entity, determines a normalized attribute value associated with the at least one attribute value; (c) determines a similarity between the new entity and the one entity based on each of the at least one normalized attribute value associated with each of the at least one attribute of the new entity and each of the at least one adjusted attribute value of the at least one attribute of the one entity; (d) determines a case weight for each entity of the known entities based on the similarity and a square root of a sum, over all of the at least one attribute, of the adjusted attribute value squared; (e) sums the case weights of each of the known entities to generate a total case weight; f) for each of the at least one attribute of each of the known entities, determines a new attribute value based on the attribute value of the at least one attribute of the entity and the case weight of the entity; (g) for each of the at least one attribute, sums, over all of the known entities, the new attribute values to generate a new attribute value sum; and (h) predicts an attribute value of at least one of the at least one attribute of the new entity based on the new attribute value sum and the total case weight.

46. The apparatus of claim 45 wherein the collaborative filter engine adjusts, for each of the at least one attribute of each entity of the known entities, the attribute values associated therewith by:
   i) for each of the at least one attribute, over all of the known entities, determining a number of times an attribute value exists for the at least one attribute to generate an attribute frequency value; and
   ii) adjusting each of the at least one attribute such that the adjusted attribute decreases as the attribute frequency value increases.

47. The method of claim 46 wherein the sub-step of adjusting each of the at least one attribute includes further steps of:
   iii) determining a total number of the known entities;
   iv) for each of the at least one attribute, dividing the total number of the known entities by the attribute frequency value to form a division value; and
   v) for each of the at least one attribute, adjusting the attribute value such that the adjusted attribute value is a function of the division value.

48. The method of claim 47 wherein the function is a logarithmic function.

49. The apparatus of claim 46 wherein the collaborative filter engine adjusts, for each of the at least one attribute of each of the known entities, the attribute value associated therewith by:
   i) over each of the at least one attribute, over all of the known entities, determining a running sum of an attribute value of the at least one attribute to generate an attribute frequency value; and
   ii) adjusting each of the at least one attribute such that the adjusted attribute decreases as the attribute frequency value increases,
   wherein each of the at least one attribute is a value attribute.

50. The apparatus of claim 45 wherein the collaborative filter engine adjusts, for each of the at least one attribute of each of the known entities, the attribute value associated therewith by:
   i) for each of the at least one attribute, over all of the known entities, determining the number of times an attribute value of the at least one attribute falls within a predetermined range to generate an attribute frequency value; and
   ii) adjusting each of the at least one attribute such that the adjusted attribute decreases as the attribute frequency value increases,
   wherein each of the at least one attribute is a value attribute.

51. The apparatus of claim 45 wherein the improved collaborative filter, for each of the at least one attribute of the new entity, determines a normalized attribute value associated with the at least one attribute value by:
   i) for each of the at least one attribute of the new entity, determining an adjusted attribute value;
   ii) determining a square root of a sum of squares of the at least one adjusted attribute value associated with the at least one attribute of the new entity; and
   iii) for each of the at least one attribute of the new entity, dividing an associated adjusted attribute value by the square root.

52. The apparatus of claim 35 wherein, for each of the at least one attribute of the known entities, the collaborative filter determines a new attribute value by multiplying the attribute value of the at least one attribute and the case weight of the entity.

53. The apparatus of claim 35 wherein the collaborative filter process predicts the attribute value of at least one of the at least one attribute of the new entity by dividing the new attribute value sum by the total case weight.

54. The apparatus of claim 35 wherein the retriever for retrieving the records is located at a server, and wherein the collaborative filter engine is located at a client and further comprising:
   d) a network for permitting communication of data between the client and the server.

55. The apparatus of claim 54 wherein the client includes
   A) a processor,
   B) a storage device,
   C) an input/output interface,
   D) a system bus used by the processor, the storage device of the client and the input/output interface,
   E) an input device coupled with the input/output interface, and
   F) an output device coupled with the input/output interface.

56. The apparatus of claim 55 wherein the client effects a browser process and an input/output interface process.

57. The apparatus of claim 56 wherein the browser process is effected by the processor executing instructions.

58. The apparatus of claim 56 wherein the browser process includes a navigation process, a user interface process, and a collaborative filter process, and wherein the collaborative filter engine is the processor executing instructions for effecting the collaborative filter process.

59. The apparatus of claim 58 wherein the user interface process of the browser process effects a graphical user interface on the output device to provide a display having a content display area and a content suggestion area.

60. The apparatus of claim 59 wherein the predicted attribute value of the at least one attribute represents content that the client may wish to consume.

61. The apparatus of claim 60 wherein the content suggestion area includes a hyper-text link to the content that the client may wish to consume.

62. The apparatus of claim 54 wherein the network is the Internet.

63. The apparatus of claim 54 wherein the client is identified as an entity with a cookie.

64. The apparatus of claim 54 wherein the client includes an input/output interface and a browser having a collaborative filter, a navigator, and a user interface, and wherein the server includes a content transfer facility and an entity/attribute record retriever.

65. The apparatus of claim 64 wherein when a user, via the user interface, submits a content request to the navigator:

i) the navigator will submit a request for the content, an identification of the client, and an indication of collaborative filtering capability of the content transfer facility of the server;

ii) the content transfer facility of the server will submit a request for the content;

iii) the content transfer facility of the server will submit a request to the entity/attribute record retriever for records;

iv) the entity/attribute record retriever will return a sample of records to the content transfer facility;

v) the content transfer facility of the server will return the requested content and the sample of records to the navigator of the client;

vi) the navigator of the client will provide the content of the user interface;

vii) the navigator of the client will provide the sample records to the collaborative; and viii) the collaborative filter will provide suggested content to the user interface.

66. A machine-readable medium having machine-executable instructions which, when executed by the machine, perform a method for operating a machine to generate a determination of a degree to which (i) a new entity having at least one attribute with an associated attribute value, and (ii) one entity selected from a group of entities, each entity of the group of entities having at least one attribute with an associated attribute value, match, the method comprising steps of:

a) accepting, by the machine, information relating to the new entity, the entities of the group of entities, and the attributes and attribute values of the new entity and the entities of the group of entities;

b) for each of the at least one attribute of each entity of the group of entities, adjusting, with the machine, the attribute value associated therewith based on a frequency of the at least one attribute throughout the entities of the group of entities to thereby generate an adjusted attribute value; and c) determining, with the machine, a degree to which (i) the new entity and (ii) the one entity match based on the attribute value associated with each of the at least one attribute of the new entity and the adjusted attribute value of each of the at least one attribute of the one entity.

67. A method comprising a step of communicating machine-executable instructions which, when executed by the machine, perform a method for operating a machine to generate a determination of a degree to which (i) a new entity having at least one attribute with an associated attribute value, and (ii) one entity selected from a group of entities, each entity of the group of entities having at least one attribute with an associated attribute value, match, the method comprising steps of:

a) accepting, by the machine, information relating to the new entity, the entities of the group of entities, and the attributes and attribute values of the new entity and the entities of the group of entities;

b) for each of the at least one attribute of each entity of the group of entities, adjusting, with the machine, the attribute value associated therewith based on a frequency of the at least one attribute throughout the entities of the group of entities to thereby generate an adjusted attribute value;

c) determining, with the machine, a degree to which (i) the new entity and (ii) the one entity match based on the attribute value associated with each of the at least one attribute of the new entity and the adjusted attribute value of each of the at least one attribute of the one entity.

\* \* \* \* \*

UNITED STATES PATENT AND TRADEMARK OFFICE
CERTIFICATE OF CORRECTION

PATENT NO : 6,018,738
DATED : January 25, 2000
INVENTOR(S) : John S. BREESE, Carl M. KADIE It is certified that error appears in the above-identified patent and that said Letters Patent are hereby corrected as shown below:

Title page, item [73],      Change "Microsft" to --Microsoft--;

In the drawing:

Sheet 28 of drawings      Change second instance of "Figure 17E" to --Figure 17F--;

Column 2, line 32      Change "$I_2 \equiv$" to --$I_2 =$--;

Column 4, line 62      Before "FIGS. 3A-C" insert --FIG. 3 shows the interconnection of FIGS. 3A-3C.--;

line 65      Before "FIGS. 4A-B" insert --FIG. 4 shows the interconnection of FIGS. 4A and 4B.--;

Column 14, line 15      Change "(users)" to --(users$_1$)--;

Column 15, line 20      Change "$156_c$" to --$156_5$";

UNITED STATES PATENT AND TRADEMARK OFFICE
CERTIFICATE OF CORRECTION

PATENT NO : 6,018,738
DATED : January 25, 2000
INVENTOR(S): John S. BREESE, Carl M. KADIE It is certified that error appears in the above-identified patent and that said Letters Patent are hereby corrected as shown below:

| | | |
|---|---|---|
| Column 19, | line 23 | Change "ATTRIBITE" to --ATTRIBUTE--; |
| | line 62 | Change "ATTRIBITE" to --ATTRIBUTE--; |
| Column 24, | line 60 | Change "change" to --chance--; and |
| Column 26, | line 12 | Change "include a include" to --include a--. |

Signed and Sealed this

Seventeenth Day of April, 2001

Attest:

NICHOLAS P. GODICI

Attesting Officer

Acting Director of the United States Patent and Trademark Office